(12) United States Patent
Somekh et al.

(10) Patent No.: US 7,420,960 B2
(45) Date of Patent: Sep. 2, 2008

(54) MODEM RELAY OVER PACKET BASED NETWORK

(75) Inventors: Oren Somekh, Emek-Israel (IL); Abraham Fisher, Haifa (IL); Udi Dahan, Maalot (IL); Gil Graiber, Kfar-Vradim (IL)

(73) Assignee: Surf Communication Solutions Ltd.

( * ) Notice: Subject to any disclaimer, the term of this patent is extended or adjusted under 35 U.S.C. 154(b) by 1001 days.

(21) Appl. No.: 10/296,009

(22) PCT Filed: May 21, 2001

(86) PCT No.: PCT/IL01/00455

§ 371 (c)(1),
(2), (4) Date: Nov. 20, 2002

(87) PCT Pub. No.: WO01/91371

PCT Pub. Date: Nov. 29, 2001

(65) Prior Publication Data

US 2003/0123466 A1 Jul. 3, 2003

(51) Int. Cl.
*H04L 12/66* (2006.01)

(52) U.S. Cl. .................. 370/352; 370/356; 370/401

(58) Field of Classification Search ......... 370/352–354, 370/356, 278, 282, 395.5, 395.61, 401; 375/222
See application file for complete search history.

(56) References Cited

U.S. PATENT DOCUMENTS

| | | |
|---|---|---|
| 5,546,388 A | 8/1996 | Lin |
| RE35,740 E | 3/1998 | Piasecki et al. |
| 5,790,641 A | 8/1998 | Chan et al. |
| 5,970,088 A * | 10/1999 | Chen ..................... 375/222 |
| 6,044,107 A | 3/2000 | Gatherer et al. |
| 6,069,879 A | 5/2000 | Chatter |
| 6,301,229 B1 | 10/2001 | Araujo et al. |

(Continued)

FOREIGN PATENT DOCUMENTS

WO          WO 99/39530          1/1999

(Continued)

OTHER PUBLICATIONS

Surf Communication Solutions Ltd., Comparison Between Possible Procedures For Real-Time Voice Band Modem Communication Over Packet Networks (MoIP), Nov. 9-10, pp. 1-4.

(Continued)

*Primary Examiner*—Quoc D Tran
(74) *Attorney, Agent, or Firm*—Factor Patent Attorneys; Yaakov Schatz

(57) ABSTRACT

A method of performing a negotiation session on a modem connection. The method includes receiving a plurality of negotiation signals from the source modem, by a first gateway, forwarding at least some of the received negotiation signals from the first gateway to a second gateway, over a packet based network, receiving, by the first gateway, responses to the forwarded negotiation signals from the second gateway, forwarding the responses from the second gateway to the source modem, by the first gateway, and transmitting from the first gateway to the source modem, response signals to at least some of the received negotiation signals, without receiving a response to the at least some of the signals from the second gateway.

34 Claims, 22 Drawing Sheets

U.S. PATENT DOCUMENTS

| | | | |
|---|---|---|---|
| 6,360,075 | B1 | 3/2002 | Fischer et al. |
| 6,434,169 | B1 * | 8/2002 | Verreault ................... 370/522 |
| 6,446,232 | B1 | 9/2002 | Chan et al. |
| 6,522,640 | B2 | 2/2003 | Liebenow |
| 6,560,197 | B1 | 5/2003 | LeVieux et al. |
| 6,646,998 | B1 | 11/2003 | Räsänen |
| 6,667,986 | B1 | 12/2003 | Sullivan et al. |
| 6,711,704 | B1 | 3/2004 | Tezuka |
| 6,757,250 | B1 * | 6/2004 | Fayad et al. .............. 370/235.1 |
| 6,898,181 | B1 * | 5/2005 | Rasanen .................... 375/222 |
| 6,934,325 | B2 | 8/2005 | Maytal |
| 7,355,735 | B1 * | 4/2008 | Sivan et al. ................ 358/1.15 |
| 2002/0082047 | A1 | 6/2002 | Souissi et al. |
| 2002/0133528 | A1 | 9/2002 | Zolti et al. |

FOREIGN PATENT DOCUMENTS

| | | |
|---|---|---|
| WO | WO 99/38351 | 7/1999 |
| WO | WO 99/38352 | 7/1999 |
| WO | WO 99/40685 | 8/1999 |
| WO | WO 00/11843 | 3/2000 |
| WO | WO 01/01654 | 1/2001 |
| WO | WO 01/60008 | 2/2001 |
| WO | WO 01/35228 | 11/2001 |

OTHER PUBLICATIONS

"A Digital Modem and Analogue Modem Pair for Use on the Public Switched Telephone Network (PSTN) at Data Signalling Rates of Up To 56 000 BIT/S Downstream and Up To 33 600 BIT/S Upstream"; ITU-T V.90; Sep. 1998; pp. 1-50.

"Procedures for Starting Sessions of Data Transmission Over the Public Switched Telephone Network"; ITU-T V.8; Feb. 1998; pp. 1-13.

"Procedures for Real Time Group 3 Facsimile Communications Over IP-networks" ITU-T Recommendation T.38, Jun. 1998, pp. 1-30, XP002163782.

"A Modem Operating at Data Signalling Rates of Up To 33 600 BIT/S For Use on the General Switched Telephone Network and On Leased Point-To-Point 2-wire Telephone-Type Circuits"; ITU-T Recommendation V.34; Oct. 1996, XP002082229. pp. 1-4, 25-54.

Yu S -For, et al.; "A Multimedia Gateway for Phone-Fax and MIME Mail"; Computer Communications; vol. 20; No. 8; Aug. 25, 1997; XP004126715; pp. 615-627.

* cited by examiner

MODEM RELAY OVER PACKET BASED NETWORK

RELATED APPLICATIONS

The present application is a U.S. national application of PCT/TL01/00455, filed on May 21, 2001. This application is also related to PCT application PCT/IL00/00288, filed on May 21, 2000, PCT/IL00/00492, filed on Aug. 13, 2000, PCT/IL00/00657, filed on Oct. 17, 2000, the disclosures of all of which are incorporated herein by reference.

FIELD OF THE INVENTION

The present invention relates to communication systems and in particular to systems which utilize modems.

BACKGROUND OF THE INVENTION

Traditional telephone networks comprise switched networks, e.g., the public switching telephone network (PSTN) and ISDN lines, in which a physical link path is established between the end users of a call. The voice signals of the call are passed, generally in a time domain multiplexed (TDM) manner, on the physical link path. On the other hand, data networks, such as the Internet, are generally packet based networks.

Due to the wide availability of switched network lines, these lines are commonly used to access packet based networks. Data connections passed on switched network lines are referred to as voice band modem (VBM) connections. At opposite ends of a VBM connection, modems translate data signals into voice signals and translate voice signals from the telephone network into data signals. The tasks of the modems are generally divided into a plurality of layers. From a top down view, a first layer performs data compression (DC) tasks. In transmission, the DC layer receives data bits and provides compressed data bits. In reception, the DC layer receives compressed data bits and provides uncompressed data bits. The compression is used to conserve bandwidth and is optional. The data compression is performed, for example, in accordance with the V.44 or V.42bis ITU recommendation or the MNP5 standard.

A second layer, referred to as an error correction (EC) layer, performs tasks which are generally divided into two modules, a link access procedure for modem (LAPM) module, and a high level data link control (HDLC) module. In transmission, the tasks of the LAPM module receive a stream of compressed bits (if compression is used), break the stream into frames and add to each frame a type, sequence number and an acknowledgment field. In reception, the LAPM tasks acknowledge the receipt of the frames and send the transmitting modem indications on the amount of unused space in the buffer of the receiving modem.

The tasks of the HDLC module, in transmission, add an error correction field (e.g., CRC) to the transmitted frames and pad the frame with flags (e.g., 0x7E bytes), according to the transmission rate of the modem, such that the number of bits transmitted in each time interval is constant. In reception, the HDLC module removes padding flags and the error correction field and discards frames with an erroneous CRC.

A third layer, referred to as a data pump (DP) layer, performs modulation and demodulation, i.e., converts data bits into voice symbols and vice versa.

Data transmitted on a VBM connection is generally handled in accordance with the DC layer, EC layer and DP layer by the transmitting modem and by the DP layer, EC layer and DC layer by the receiving modem. Thus, the same layers are applied at both end modems of the VBM connection, although the receiving modem substantially reverses the operations of the transmitting modem.

Although most modems perform the tasks of all three layers described above, the term modem covers apparatus which performs DP tasks even if the other tasks are not performed by the apparatus.

VBM connections may be established between client modems, which are connected to a PSTN through twisted pairs, between server modems which are connected directly to the infrastructure of the PSTN, or between a server modem and a client modem. The various connections may be established in accordance with various standards, such as the V.22, V.32, V.34, V.90, V.91 and V.92 ITU recommendations.

In establishing a VBM connection, a pair of modems, on opposite ends of the line, perform a negotiation procedure in which the modems test the line and determine operation parameters, e.g., a data rate and/or protocol according to which data will be transferred over the connection. Generally the negotiation procedure includes a plurality of stages, such as one or more DP, EC and/or DC stages. Generally, the DP negotiation stages include four negotiation stages, referred to also as phases 1-4, which include a protocol selection stage (e.g., according to the V.8 protocol), and negotiation stages for training the DP, selection of symbol and/or bit rates and determination of a round trip delay. The EC and DC negotiation stages include, for example, an EC protocol negotiation (V.42 or MNP5) stage and an ECDC parameter negotiation stage (e.g., selection of a compression format).

The negotiation stages are performed in accordance with protocols which state which signals are to be transmitted at what times. Some of the signals must be transmitted within a short interval from the reception of a control signal from the other party to the negotiation. Therefore, negotiating modems are generally connected over channels which have a round trip delay beneath a required threshold.

After the negotiation stages, a data transfer stage is performed at which the modems modulate and demodulate the data packets they are provided and pass the modulated signals over the connection. During both the negotiation stage and the data transfer stage, signals are transmitted on the connection in both directions at the same time, in an operation mode referred to as full duplex. Generally, the pair of modems includes a call modem which initiates the formation of the connection and an answer modem which responds to the initiative of the call modem.

During the data transfer stage, the modems employ provisions to cancel far-echo effects. In addition, the EC layer in each of the modems verifies, as described above, that all the data transmitted was properly received and if necessary requires re-transmissions. For these tasks, the modems generally measure the round trip delay (RTD) of signals transmitted between them during the negotiation stage of VBM connections, for example during the second phase of the negotiation stage of the V.34 protocol. Similar methods to those described in the V.34 for determining the RTD are described in other protocols, such as the V.90.

According to the V.34 protocol, at a specific time, the answer modem initiates a phase reversal of a signal A it transmits. The call modem responds with a phase reversal in a B signal it transmits, 40 msec after detecting the phase reversal in the A signal. Thereafter, the answer modem responds with a second phase reversal, 40 msec after detection of the phase reversal in the B signal. Accordingly, the call and answer modems independently calculate the RTD of the connection.

The telephone network is also used for fax connections. In fax connections, image data is modulated onto voice signals, which are transmitted over switched networks together with control information. Before transmission of signals, fax connections include a test stage in which the cap abilities of the connection are determined. The signals on the fax connection, both during the test stage and during the data transmission, are transmitted in only one direction in an operation mode referred to as half duplex. That is, at any time only one end unit fax machine transmits signals on the connection.

Existing PSTN hardware cannot support the increasing demand for all types of communication services, and therefore additional hardware is added to the PSTN instead of, or in addition to, the current hardware of the PSTN. In many cases, packet based networks are cheaper to install and maintain than switched networks. Therefore, telephony providers are adding many packet based lines and/or networks to their infrastructure, especially to their long distance infrastructure.

An exemplary hybrid telephone connection includes two switched segments which connect end units, e.g., telephone sets, to respective gateways. The gateways, on the other hand, are connected through a packet based network. The gateways receive streams of signals from the respective end units, pack the streams, for example in a pulse code modulation (PCM) format into packets and pass the packets over the packet based network to the other gateway. The other gateway unpacks the packets into a stream of signals which is forwarded to the other end unit.

The travel time of packets through the packet based network may vary for different packets of a single connection. Therefore, the gateways maintain jitter buffers which delay the packet they receive over the packet based network for a short period allowing the gateway to organize the packets in their original order. When packets are not received within the short delay, the gateways generate filler signals to replace the data in the delayed packet. If only a small percentage of packets are delayed beyond the allowed period (or are otherwise lost), telephone conversations are passed with sufficient quality such that the loss of packets is substantially unnoticed.

In some cases, fax signals are handled by gateways in the same way voice signals are handled. However, the loss of a relatively small percent of the modulated signals is sufficient to prevent demodulation of the signals. Therefore, in some gateways, when the gateway receives fax signals, the gateway demodulates the signals and passes them to the other gateway in a predetermined packet format, for example as described in the T.38 ITU-T recommendation, "Procedures for real-time Group 3 facsimile communication over IP networks", the disclosure of which is incorporated herein by reference. Gateways generally identify the fax signals using methods such as described, for example, in U.S. Pat. No. RE35,740, the disclosure of which is incorporated herein by reference. The other gateway extracts the Fax data from the packets and re-modulates the Fax data for transmission to its respective end-unit.

It is noted that most VBM connections are local connections to Internet service providers (ISP), which provide gateway services to packet-based networks. Nonetheless, there are cases when it is desired to create long distance modem connections, for example, for remote access (RAS) applications.

SUMMARY OF THE INVENTION

An aspect of some embodiments of the present invention relates to forming a connection between two end modems over a hybrid link path, which includes at least one non-VBM segment. Such connection between two end modems is referred to herein as a MoIP (modem over IP) connection. Gateways at opposite ends of the non-VBM segment demodulate signals received from VBM segments and modulate signals transmitted on to the VBM segments.

In some embodiments of the invention, the MoIP connection includes a single packet based segment and a pair of switched link paths which connect the modems to the packet based segment. In some embodiments of the invention, gateways on the edges of the packet based segments include modems which conduct separate VBM connections with the end modems establishing the MoIP connection.

In some embodiments of the invention, the gateway modems perform full termination of the signals transmitted on their respective VBM connections. The full termination includes data pump (DP) modulation and demodulation, error correction, flow control, data compression and, when necessary, requesting retransmission of data not properly received. In these embodiments, the VBM connections may operate independent of each other, allowing the parameters (e.g., data rate, modem standard) of the VBM connections to be different for the different VBM connections. Between the gateways, on the packet based networks, the gateways optionally perform flow control. Alternatively or additionally, the gateways use an acknowledgment scheme, redundancy transmissions and/or a forward correction scheme in order to minimize transmission errors. Further alternatively, higher protocol levels are trusted to ensure proper reception of the transmitted data.

In other embodiments of the invention, the gateways perform partial termination, i.e., they perform data pump termination and partial or complete error correction (EC) termination but do not perform data compression termination, on their respective VBM connections. Also in these embodiments, the VBM connections may operate at different rates and/or in accordance with different protocols. In addition, there may not be any need to mirror retrain or other events occurring on one of the connections to the other connection. In some of these embodiments, however, at least some of the parameters of the connections are correlated, so as to minimize the time difference between the transmission of the same data segment on the different VBM connections. Optionally, the entrance to the data phase of the VBM connections is synchronized between the connections, for example by at least partially correlating the data pump training signals on the VBM connections. Alternatively or additionally, compression parameters exchanged at the beginning of the data phase are passed between the gateways, such that both the VBM connections agree on the same compression parameters. Transmitting the signals on the packet based network in their compressed form reduces the bandwidth utilization of the packet based network. In addition, not performing DC termination substantially reduces power consumption and the memory consumption of the gateways.

In still other embodiments of the invention, the gateways perform only DP termination and do not perform error correction and data compression (ECDC) termination on their respective VBM connections. The bits received by the gateways are transferred intact to the other gateway and error correction and data compression are optionally managed by the end modems of the MoIP connection. Not performing error detection and data compression by the gateways substantially reduces the delay of the signals on the MoIP connection, without affecting the transmission speed.

In some embodiments of the invention, the VBM connections between the gateways and their respective end units are correlated such that they operate in accordance with the same modem protocol and at the same data rate. Optionally, the gateways transmit to each other control packets, which include information they use in determining the modem protocol and/or data rates they plan to use on their VBM connection. In some embodiments of the invention, during negotiation stages of the MoIP connection, the gateways send stalling signals, referred to as spoofing signals, to their respective end modems until they receive input from the other gateway on the modem and link capabilities of the VBM connection established by the other gateway. The stalling signals delay the progression of the negotiation procedure without causing the termination of the connection.

In an embodiment of the invention, during a V.8 connection which requires reception of two consecutive identical packets in order to proceed, the specific series of packets used to stall the connection includes a series of valid packets, which should be currently transmitted according to the standard, in which no two consecutive packets have identical values.

Alternatively or additionally, the gateways lengthen the transmission time of one or more of the signals they transmit according to the standard they are using. For example, in the V.8 standard, instead of transmitting the JM signal immediately upon receiving a correct CM signal, the gateway continues to transmit the ANSam signal until it receives from the other gateway the information it needs in order to transmit the JM signal.

In some embodiments of the invention, rather than transmitting a series of packets which stalls the connection, a packet with probable values is transmitted, continuing the negotiation procedure. If, upon receiving information from the other connection, the values of the transmitted packet are found not to conform to the other modem connection, a retrain is initiated and the negotiation process is re-started using the received information from the other modem connection.

In some embodiments of the invention, when a MoIP connection carries filler bits which do not represent information, the filler bits are not passed on the packet based segment. Optionally, the gateways fill in the missing, filler bits based on control signals they receive from the other gateway and/or responsive to not receiving bits at the data rate of the connection.

An aspect of some embodiments of the present invention relates to a time-deception modem which causes a peer modem, with which it forms a VBM connection, to calculate a round trip delay (RTD) value different from the delay between the two modems, in order to improve the quality of the performance of the connection. Optionally, the peer modem is not aware of the deceptive actions of the time-deception modem.

In some embodiments of the invention, a VBM connection is a portion of a modem over IP (MoIP) connection. A typical MoIP connection is formed of two VBM connections which connect a call and an answer modem to two gateways which, in turn, are connected over an IP network. In some embodiments of the invention, one or both the gateways include time-deception modems which cause the call and/or answer modems to calculate an RTD value which estimates the round trip time over the entire MoIP connection rather than over the VBM connection to which the time-deception modem is directly connected.

In some embodiments of the invention, the time-deception modem delays the transmission of a phase reversed signal for a correction period, in addition to the 40 msec from receiving the phase reversal from the peer modem, prescribed in the V.34 protocol. In some embodiments of the invention, the correction period comprises an earlier measured round trip delay period of the IP network connecting the two gateways and optionally a predetermined RTD for VBM connections, which represents the RTD of the remote VBM connection of the MoIP connection. Alternatively, the time-deception modem mirrors the phase reversal by transmitting an appropriate message to the other gateway, and delays the transmission of its response, phase reversed, signal until a response to the mirrored phase reversal is received.

An aspect of some embodiments of the present invention relates to distributing the tasks of a remote access server for VBM connections between two or more units which are located in different geographical locations. Optionally, the two or more units are located in geographical locations which are separated by hundreds or thousands of meters or even hundreds or thousands of kilometers. In some embodiments of the invention, the two or more units include a front end unit which performs the data pump (DP) tasks and optionally one or more other tasks, e.g., error correction (EC) tasks, and an upper layer unit which performs data compression (DC) tasks and optionally one or more other tasks, e.g., tasks not performed by the front end unit. Using this task distribution, the signals transmitted between the front end unit and the upper layer unit are already compressed, such that additional compression and decompression tasks, which are generally computationally intensive, are not required in the front end unit. The fact that the signals transmitted between the front end unit and the upper layer unit are compressed, is true even if one of the compressions of the DC modem layer and the PPP protocol are not used, as may be standardized in the future.

Performing the tasks of the remote access server (RAS) in a plurality of locations allows greater freedom in laying out apparatus of the RAS. For example, in some cases it is desired that modem connections be terminated as close as possible to the respective client modems, in order to conserve expensive switched telephone lines. In such cases, in accordance with embodiments of the invention, front end units which perform only some of the tasks of a modem RAS are positioned at a plurality of locations close to the client modems while the remaining tasks are performed by an upper layer unit at a central location. Thus, the volume and maintenance costs of the apparatus at the plurality of front end locations is reduced as they perform only some of the tasks. In addition, centralizing the handling of some of the tasks reduces the cost of the apparatus performing these tasks, as the utilization rate of apparatus at a central location is generally higher.

In some embodiments of the invention, distributing the tasks of a RAS may be used for Internet data off loading (IDOL). The off-loading units include only front end units (as described above) of a distributed RAS. The remaining tasks are performed by an upper layer unit (as described above) employed in an interface box of an Internet service provider (ISP).

In some embodiments of the invention, distributing the tasks of a RAS is performed by an Internet service provider, in order to provide signal termination close to the client modems on the one hand and concentration of the upper layer tasks on the other hand.

In some embodiments of the invention, the distribution of the tasks between the two or more units is adjusted dynamically. Optionally, at a specific time, the task distribution between the units for substantially all the handled connections, or for all the newly accepted connections, is the same. Alternatively, the task distribution for different connections may be different for different tasks.

Optionally, the task distribution is adjusted dynamically responsive to the load on the two or more units. For example, when a front end unit is close to its maximal capacity, the distribution is such as to require minimal computation power from the front end unit. When on the other hand, the load on the upper layer unit is high, the front end optionally takes upon itself a larger portion of the tasks.

An aspect of some embodiments of the present invention relates to distributing the tasks of a modem between two or more units which communicate through a packet based network, e.g., a wide area network (WAN), a metropolitan area network (MAN) and/or a local area network (LAN). Optionally, the packet based network comprises an IP network, a frame relay network and/or an ATM network.

An aspect of some embodiments of the present invention relates to a front end unit of a distributed modem that may operate with a plurality of different upper layer units. In some embodiments of the invention, in forming a connection, the front end unit is coupled with one of a plurality of upper layer units, for example, according to the telephone number dialed. Optionally, a single front end unit handles a plurality of VBM connections concurrently, which connections pass through different upper layer units.

An aspect of some embodiments of the present invention relates to managing a VBM connection with uneven layers of handling on the opposite sides of the connection. On a first end of the connection, the data pump tasks are performed with a set of one or more additional modem tasks while on a second end a different set including fewer modem tasks (optionally no tasks beyond the data pump tasks), is performed. The second end of the connection optionally comprises a gateway which forwards signals from the VBM connection over a non-VBM connection (e.g., a packet based connection) to an additional unit which is capable of handling partially terminated VBM signals. The additional unit may complete the termination of the partially terminated signals (i.e., perform the layer tasks performed by the first end but not by the second end) or may perform the same tasks as performed by the second end, in reverse, in order to transmit the signals over another VBM connection. In some embodiments of the invention, the second end of the VBM connection handles both connections for which the termination is completed by the additional unit and connections for which the additional unit reverses the tasks performed by the second end of the VBM connection. Optionally, the second end performs substantially the same tasks regardless of the tasks performed by the additional apparatus.

There is therefore provided in accordance with an embodiment of the invention, a method of performing a negotiation session on a modem connection, comprising receiving a plurality of negotiation signals from the source modem, by a first gateway, forwarding at least some of the received negotiation signals from the first gateway to a second gateway, over a packet based network, receiving, by the first gateway, responses to the forwarded negotiation signals from the second gateway, forwarding the responses from the second gateway to the source modem, by the first gateway, and transmitting from the first gateway to the source modem, response signals to at least some of the received negotiation signals, without receiving a response to the at least some of the signals from the second gateway.

Optionally, forwarding the responses from the second gateway to the first modem comprises forwarding at least some of the responses without altering their information content.

Optionally, forwarding the responses from the second gateway to the first modem comprises forwarding at least some of the responses with an altered information content.

Optionally, transmitting response signals from the first gateway to the source modem comprises transmitting at least some of the response signals without forwarding the signals to which the response signals respond to the second gateway. Optionally, in response to at least some of the negotiation signals from the source modem, the first gateway both transmits response signals to the source modem and forwards the negotiation signals to the second gateway. Optionally, transmitting response signals from the first gateway to the source modem comprises transmitting at least some of the response signals after forwarding the signals to which the response signals respond to the second gateway but before receiving a response thereto. Optionally, in response to at least some of the negotiation signals from the source modem, the first gateway both transmits response signals to the source modem, which include guess values of one or more parameters and forwards response signals from the second gateway which include final values of the one or more parameters.

Optionally, the method includes initiating a retrain by the first gateway between transmitting the response signals to the first modem and forwarding the response signals from the second gateway. Optionally, the first gateway both transmits response signals to the source modem and forwards the negotiation signals to the second gateway substantially concurrently.

Optionally, the signals to which the first gateway responds to the source modem comprise DP negotiation signals. Optionally, the signals which the first gateway forwards to the second gateway comprise EC negotiation signals. Optionally, the signals which the first gateway forwards to the second gateway comprise signals for calculation of the round trip delay of the modem connection. Optionally, forwarding the negotiation signals to the second gateway comprises forwarding substantially the same bit content. Alternatively, forwarding the negotiation signals to the second gateway comprises forwarding only a partial portion of at least one of the received signals.

Optionally, forwarding the negotiation signals to the second gateway comprises forwarding over a network path which has a round trip delay greater than the maximal time defined for responding to at least one of the negotiation signals from the source modem.

There is further provided in accordance with an embodiment of the invention, a communication gateway, comprising a switched network interface adapted to receive a plurality of negotiation signals from a source modem, an addressable network interface adapted to forward negotiation signals to a remote gateway; and a controller adapted to forward through the addressable network interface substantially the entire bit content of at least some of, but not all, the negotiation signals received through the switched network interface, during a specific connection.

Optionally, the addressable network interface comprises a packet based network interface.

There is further provided in accordance with an embodiment of the invention, a communication gateway, comprising a switched network interface adapted to receive a plurality of negotiation signals from a source modem, an addressable network interface adapted to forward negotiation signals to a remote gateway; and a controller adapted to forward through the addressable network interface at least some of, but not all, the negotiation signals received through the switched network interface during a specific connection and which is adapted to respond through the switched network interface to at least some of, but not all, the negotiation signals received through the switched network interface during the specific connection.

Optionally, the controller is adapted to forward through the addressable network interface substantially the entire bit content of at least some of the negotiation signals received through the switched network interface.

Optionally, the controller is adapted to forward through the addressable network interface a portion including less than the entire bit content of at least some of the negotiation signals received through the switched network interface.

There is further provided in accordance with an embodiment of the invention, a method of performing a non-facsimile modem negotiation session on a modem connection by a gateway, comprising:

receiving negotiation signals of a plurality of stages from a source modem, by the gateway; and transmitting response signals, by the gateway, responsive to the received negotiation signals, when so required by the protocols governing the stages, to the source modem, wherein at least some of the response signals of a first group of at least one of the stages are generated by the gateway, and wherein all the response signals of a second group of at least one of the stages are received by the gateway from a separate unit.

Optionally, substantially all the response signals of at least one of the stages are generated by the gateway. Optionally, substantially all the response signals of at least one of the stages are generated by the gateway without relation to information received from units other than the source modem. Optionally, transmitting response signals of the second group comprises transmitting the negotiation signals as if they are data signals.

Optionally, the second group of stages comprises at least one ECDC negotiation stage.

Optionally, the first group of stages comprises at least one DP negotiation stage.

Optionally, the separate unit comprises a remote unit.

There is further provided in accordance with an embodiment of the invention, a method of handling signals passing on a modem connection, by a gateway which connects a packet based segment and a switched segment of the connection, comprising listening to signals passing on the connection, identifying on the connection a modem identification signal which notifies that the connection is going to carry modem signals, operating in a first state, in which signals are transferred from the switched segment to the packet based segment without performing demodulation, after the identifying of the modem identification signal; and operating in a second state, in which signals transferred from the switched segment to the packet based segment are demodulated, after operating in the first state.

Optionally, the method includes deciphering the contents of at least one of the signals passing on the connection, while the gateway operates in the first state. Optionally, the method includes moving from the first state to the second state responsive to the contents of at least one of the deciphered signals. Optionally, moving from the first state to the second state comprises moving at a point determined responsive to the identified signals.

Optionally, moving from the first state to the second state comprises moving after completion of a V.8 negotiation phase.

Optionally, the method includes moving from the first state to the second state a predetermined time from the beginning of the connection.

Optionally, the deciphered signals comprise signals in accordance with the V.8 protocol.

There is further provided in accordance with an embodiment of the invention, a method of handling signals passing on a modem connection, by a gateway which connects a packet based segment and a switched segment of the connection, comprising:

operating in a first state, in which signals are transferred from the switched segment to the packet based segment without performing demodulation, after the identifying of the modem identification signal; and deciphering the contents of at least one of the signals passing on the connection, while the gateway operates in the first state.

Optionally, deciphering the contents of at least one of the signals comprises deciphering the contents of a signal in accordance with the V.8 protocol.

Optionally, the method includes determining whether to operate in a second state, in which signals transferred from the switched segment to the packet based segment are demodulated, responsive to the deciphered signals.

Optionally, the method includes moving to the second state if the deciphered signals indicate the use of a protocol supported by the gateway for transfer of data on the connection.

There is further provided in accordance with an embodiment of the invention, a gateway, comprising:

a switched network interface adapted to receive modem signals;

an addressable network interface adapted to forward signals to a remote gateway;

an encapsulation unit adapted to forward through the addressable network interface, without demodulation, at least some of the modem signals received by the switched network interface; and a demodulation unit adapted to demodulate and forward through the addressable network interface, at least some of the modem signals received by the switched network interface. Optionally, the encapsulation unit is adapted to forward modem signals received during a protocol selection negotiation stage. Optionally, the encapsulation unit is adapted to forward modem signals as PCM samples.

Optionally, the demodulation unit is adapted to forward modem signals received after the completion of a protocol selection negotiation stage.

There is further provided in accordance with an embodiment of the invention, a method of establishing a modem connection over a hybrid network path, comprising:

selecting at least two gateways to perform format conversion of signals transmitted between segments of the modem connection over the hybrid network path; and performing a negotiation session between the selected at least two gateways, so as to select a format of signals transmitted between the selected gateways.

Optionally, performing the negotiation session comprises determining whether the signals transmitted between the gateways are compressed in accordance with a modem-compression protocol.

There is further provided in accordance with an embodiment of the invention, a method of transmitting non-facsimile data signals between a source modem and a destination modem, comprising transmitting the data signals from the source modem, over a first switched network path, to a first gateway, demodulating the data signals at the first gateway, transmitting at least some of the demodulated data signals from the first gateway to a second gateway, over a packet based network, modulating the data signals at the second gateway, and transmitting the modulated data signals from the second gateway over a second switched network path to the destination modem.

Optionally, transmitting the data signals from the first gateway to the second gateway comprises transmitting compressed data signals, which are compressed according to a modem compression format. Optionally, the source modem compresses the signals and the first gateway transfers the signals without decompression.

Optionally, transmitting the data signals comprises transmitting signals compressed according to the V.44 protocol.

Optionally, transmitting the data signals from the first gateway to the second gateway comprises transmitting the data signals along with any modem error correction fields received from the source modem.

Optionally, transmitting the data signals from the first gateway to the second gateway comprises transmitting the data signals along with any modem filler bits received from the source modem.

Optionally, transmitting the data signals from the first gateway to the second gateway comprises transmitting the data signals along with any LAPM acknowledgment fields received from the source modem.

Optionally, the method includes performing one or more LAPM tasks on the demodulated signals, by the first gateway, before transmitting the signals to the second gateway. Optionally, the method includes performing one or more HDLC tasks on the demodulated signals, by the first gateway, before transmitting the signals to the second gateway. Optionally, the signals are transmitted on the first switched network path to the first gateway at the same rate as the signals are transmitted from the second gateway on the second switched network path.

Optionally, the signals are transmitted on the first switched network path to the first gateway at a different rate than the signals are transmitted from the second gateway on the second switched network path.

Optionally, transmitting at least some of the data signals over a packet based network comprises transmitting over an IP network. Optionally, transmitting at least some of the data signals over a packet based network comprises transmitting over a connection which does not provide delivery confirmation. Optionally, transmitting at least some of the data signals over a packet based network comprises transmitting over a connection which provides delivery confirmation. Optionally, transmitting at least some of the data signals over a packet based network comprises transmitting over an ATM network. Optionally, transmitting at least some of the data signals over a packet based network comprises transmitting over an addressable network. Optionally, transmitting at least some of the demodulated data signals comprises determining, by the first gateway, whether the data signals received from the first modem have an information content and not transmitting at least some of the signals determined not to have an information content.

Optionally, the method includes transmitting data signals from the destination modem, over the second switched network path, to the second gateway, demodulating the data signals at the second gateway, transmitting at least some of the demodulated data signals from the second gateway to the first gateway, over the packet based network, modulating the data signals at the first gateway, and transmitting the modulated data signals from the first gateway to the source modem.

Optionally, the signals transmitted on the second switched network path to the second gateway are transmitted at the same rate as the signals are transmitted from the first gateway on the first switched network path to the source modem.

Optionally, the signals are transmitted on the second switched network from and to the destination modem, concurrently. Optionally, the first and second switched network paths carry the same bit content of signals. Optionally, the signals transmitted on the first and second switched paths carry the same information. Optionally, the transmitted signals comprise IP packets and wherein the IP packets transmitted on the first and second switched paths carry identical IP headers. Optionally, the source and destination modems comprise server modems.

Optionally, the source and destination modems comprise client modems.

Optionally, one of the source and destination modems comprises a client modem and the other of the source and destination modems comprises a server modem.

Optionally, the data signals are received by the destination modem in a maimer which does not allow determination of whether the signals were passed on the packet based network path or were passed on a single switched path.

Optionally, transmitting the packets over the packet based network to the second gateway comprises regulating the delay of the packets provided to the second gateway.

There is further provided in accordance with an embodiment of the invention, a method of transmitting data signals between a source modem and a destination modem, comprising transmitting the data signals from the source modem, over a first switched network path, to a first gateway, demodulating the data signals at the first gateway, transmitting at least some of the demodulated data signals from the first gateway to a second gateway, remote from the first gateway, over an intermediate path, modulating the data signals at the second gateway; and transmitting the modulated data signals from the second gateway over a second switched network path to the destination modem.

Optionally, the first and second gateways are not in the same room. Optionally, the first and second gateways are distanced from each other by at least 100 meters. Optionally, the first and second gateways are distanced from each other by at least 10 kilometers. Optionally, the intermediate path comprises a path on an addressable network, a packet based network and/or a DCME network. Optionally, transmitting at least some of the demodulated data signals from the first gateway to the second gateway comprises transmitting encrypted signals.

There is further provided in accordance with an embodiment of the invention, a gateway for transferring voice band modem, non-facsimile, signals between a switched network and a packet based network, comprising a switched network interface adapted to transmit and receive modulated modem signals on a switched network path, a data pump adapted to modulate signals transmitted by the switched network interface and demodulate signals received by the switched network interface, a packet interface adapted to transmit and receive signals on a packet based network connection; and a controller adapted to establish a connection between a switched network path and a packet based network connection, before data signals are transmitted on the switched network path, and to forward at least some of the data signals passing on the logical connection between the packet interface and the data pump.

Optionally, the gateway does not perform modem compression or decompression on the data signals passing on the logical connection. Optionally, the packet interface is adapted to encapsulate data signals it transmits in packets having IP headers which are not related to possible IP headers included in the demodulated signals. Optionally, the controller forwards substantially all the data signals passing on the logical connection, between the packet interface and the switched network interface.

Optionally, the controller does not forward data signals which do not carry information.

Optionally, the gateway does not perform modem flow control tasks on the data signals passing on the logical connection. Optionally, the gateway does not perform modem error correction tasks on the data signals passing on the logical connection. Optionally, the gateway does not remove filler bits from the data signals passing on the logical connection. Optionally, the modem is adapted to apply error correction tasks to data signals passing on the logical connection. Optionally, the data pump modulates and demodulates data signals substantially concurrently.

There is further provided in accordance with an embodiment of the invention, a system for transmission of modem, non-facsimile, signals over a packet based network, comprising a first gateway adapted to receive data signals from a first modem, to demodulate the received data signals and to transmit the demodulated data signals over a packet based network and a second gateway adapted to receive the data signals transmitted from the first gateway over the packet based network, to modulate the signals and to transmit the data signals to a second modem. Optionally, the first gateway is adapted to receive data signals from the second gateway, concurrently with the transmission of data signals to the second gateway.

Optionally, the first gateway is adapted to transmit the demodulated signals to the second gateway without decompressing the signals. Optionally, the first gateway is adapted to transmit the demodulated signals along with one or more fields of an EC modem layer with which the signals were received from the first modem.

There is further provided in accordance with an embodiment of the invention, a method of correlating parameters of a plurality of voice band modem (VBM) connections, comprising beginning a negotiation stage of a first VBM connection, beginning a negotiation stage of a second VBM connection, receiving values of one or more parameters of the second connection by an end unit of the first connection, and completing the negotiation stage of the first connection based on the one or more parameters of the second connection. Optionally, the method includes transmitting stalling signals on the first connection by the end unit of the first connection until the values of the one or more parameters of the second connection are received by the end unit.

Optionally, transmitting stalling signals comprises lengthening the transmission of a control signal beyond a necessary transmission time of the control signal. Optionally, lengthening the transmission of the control signal beyond its normal transmission time comprises transmitting the control signal after the reception of a signal which normally causes the termination of the transmission of the control signal. Optionally, the negotiation stage comprises a data pump negotiation stage and/or an error correction negotiation stage.

Optionally, the method includes transmitting one or more control signals with guess values during the negotiation stage and wherein completing the negotiation stage comprises retransmitting the one or more control signals with values based on the one or more parameters of the second connection. Optionally, the method includes retraining the first connection before completing the negotiation stage.

There is further provided in accordance with an embodiment of the invention, a method of calculating a round trip delay of signals on a modem connection, comprising transmitting a first time measurement signal from a first modem to a second modem, transmitting a second time measurement signal from the second modem to the first modem, at an interval after the reception of the first time measurement signal by the second modem, and calculating, by the first modem, a round trip delay value as the period between transmitting the first time measurement signal and receiving the second time measurement signal, minus a delay period which is substantially different from the interval.

Optionally, the first and second modems are connected through a network segment which segment is a portion of a composite connection including at least one additional network segment and wherein calculating the round trip delay comprises calculating the round trip delay of the composite connection. Optionally, the at least one additional network segment comprises a switched network segment and a packet based network segment and wherein transmitting the second time measurement signal comprises transmitting the second signal after an interval which is a sum of the delay period, a round trip delay value of the switched network segment and a round trip delay value of the packet based network segment.

Optionally, the round trip delay value of the packet based network segment comprises a value measured during the modem connection before receiving the first time measurement signal by the second modem. Optionally, the round trip delay value of the switched network segment comprises a predetermined estimate value. Optionally, the predetermined estimate value comprises a maximal round trip delay value of substantially all switched network segments which may appear in a path between the first and second modems. Optionally, transmitting a second time measurement signal comprises transmitting a third time measurement signal on the at least one additional network segment, receiving a response thereto and transmitting the second time measurement signal after receiving the response.

BRIEF DESCRIPTION OF FIGURES

Particular non-limiting embodiments of the invention will be described with reference to the following description of embodiments in conjunction with the figures. Identical structures, elements or parts which appear in more than one figure are preferably labeled with a same or similar number in all the figures in which they appear, in which.

DETAILED DESCRIPTION OF EMBODIMENTS

Figure 1:
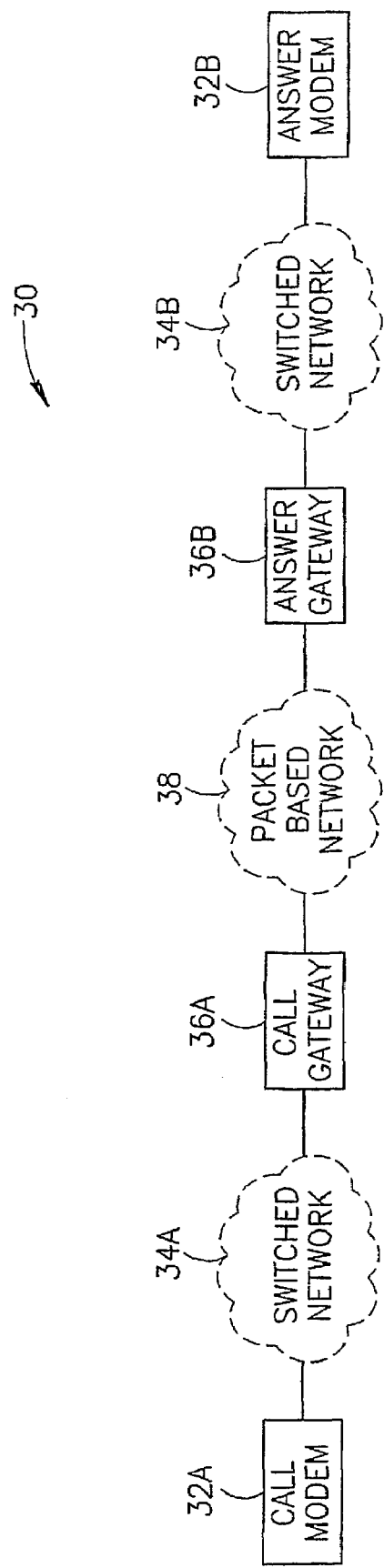
FIG. 1 is a schematic illustration of a hybrid modem connection useful in illustrating an embodiment of the present invention.

FIG. 1 is a schematic illustration of a MoIP connection 30, in accordance with an embodiment of the present invention. A call modem 32A establishes a connection with an answer modem 32B, which connection is formed of three segments in series. In some embodiments of the invention, modems 32A and 32B are both server modems or both digital modems. Alternatively, one of modems 32A and 32B is a client modem and the other modem is a server modem.

A first segment of the MoIP connection passes on a switched network 34A between call modem 32A and a call gateway 36A. A second segment connects call gateway 36A and an answer gateway 36B through a packet based network 38. A third segment connects answer gateway 36B and answer modem 32B on a switched network 34B. In some embodiments of the invention, the first and third segments carry the same data signals, although they may carry different control signals. That is, if the data signals transmitted between modems 32A and 32B comprise, for example, IP packets, the headers of the IP packets on the first and third segments are identical, e.g., the TTL field has the same value. Alternatively, the first and third segments carry the same bits which contain information, although filler data signals which do not carry information may be sent differently on the different segments.

In some embodiments of the invention, packet based network 38 has at least a predetermined quality of service (QoS) level, i.e., a relatively low packet loss rate, delay and/or jitter, in order to provide acceptable communication levels of service. Alternatively or additionally, one or more redundancy methods, such as duplicate transmission of some or all of the packets and/or use of a forward error correction code are used to enhance the reliability of network 38.

In some embodiments of the invention, packet based network 38 comprises a multipoint network which connects three or more communication networks. In some embodiments of the invention, gateways 36A and 36B are not included in a single casing or in the same room. Furthermore, gateways 36A and 36B may be distanced by hundreds, thousands or tens of thousands of meters or even tens of kilometers or even more, for example when packet based network 38 passes through a satellite or other outer space transmission unit. In some embodiments of the invention, the round trip transmission time of signals on packet based network 38 between gateways 36A and 36B is greater than the shortest response time defined for modem negotiation signals in a protocol used to transmit signals between modems. It is noted that the distance between gateways 36A and 36B may affect the specific embodiments (of those described below) used, due to the affect of the distance on the round trip delay of signals between modems 32A and 32B.

Optionally, packet based network 38 comprises an IP network. Alternatively or additionally, packet based network 38 comprises a cell base network, such as an asynchronous transfer mode (ATM) network, and/or a frame relay network.

In an embodiment of the present invention, connection 30 is established using connection establishment procedures substantially as used for establishing voice over IP (VoIP) connections, for example, the procedures of the H.323 protocol and/or the session initiation protocol (SIP). In establishing the connection, one or more packet connections of a packet transport protocol (e.g., transmission control protocol (TCP) or user datagram protocol (UDP)) are established on packet based network 38. The connection is optionally established by modems 32A and 32B and gateways 36A and 36B at the initiative of the modems, although other initiators of the connection may also be considered.

Optionally, in forming the connection, call modem 32A transmits a modem identification signal which notifies modem 32B that the connection is a modem connection. A network controller identifies the modem identification signal and accordingly chooses gateways 36A and 36B to belong to the path which handles the connection. Alternatively or additionally, gateways 36A and/or 36B identify the modem identification signal and accordingly set their operation mode. For example, the notification may be based on the telephone number dialed which is included in a list of modem numbers. Alternatively or additionally, gateways 36A and 36B recognize that the connection is a modem connection based on, for example, the 2100 Hz signal which is transmitted at the beginning of the use of the connection.

In some embodiments of the invention, call modem 32A and/or answer modem 32B are standard modems which are not altered in order to perform the present invention. Furthermore, in some embodiments, call modem 32A and answer modem 32B do not know whether they are connected directly over a switched line or through gateways 36A and 36B.

Call modem 32A and/or answer modem 32B may be connected to switched network 34B through any switched lines, analog or digital.

Figure 2:
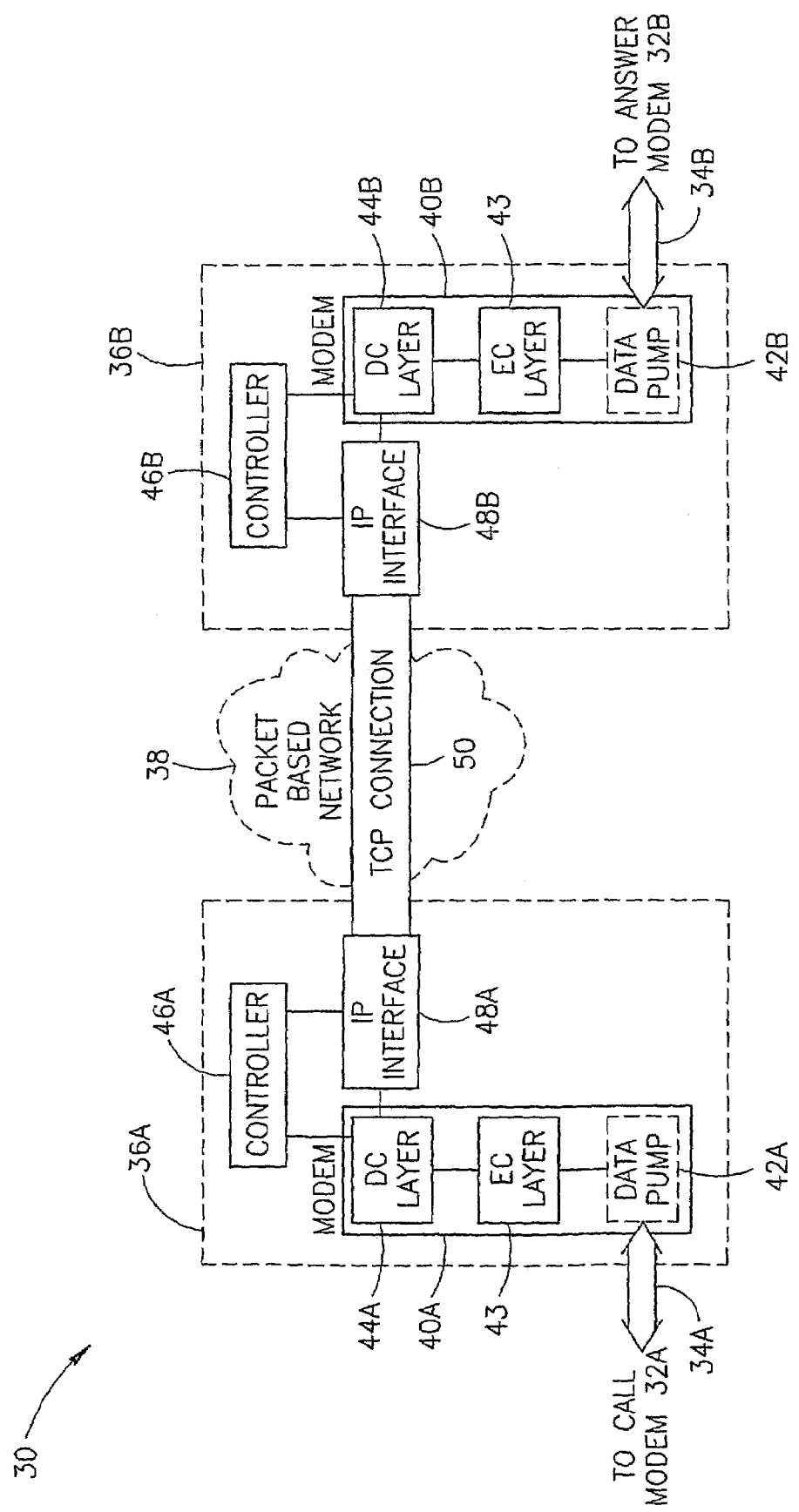
FIG. 2 is a schematic block diagram of gateways in a composite modem connection, in accordance with an embodiment of the present invention.

FIG. 2 is a schematic block diagram of gateways 36A and 36B and the connection between them, in accordance with an embodiment of the present invention. Gateways 36A and 36B include gateway modems 40A and 40B which communicate with modems 32A and 32B over switched networks 34A and 34B, respectively. Gateway modems 40 include data pumps 42 which modulate and demodulate the signals passed on switched networks 34A and 34B, error correction (EC) layers 43 and data compression (DC) layers 44. Error correction layers 43 add CRC fields to transmitted data, check that data is received correctly, request retransmission of bits which were not received correctly and manage flow control. Data compression layers 44 perform compression and decompression of the signals transmitted on switched networks 34. Each of gateways 36 also includes an IP interface 48 (marked 48A, 48B) which communicates with the interface 48 in the other gateway through packet based network 38. As is known in the art, each packet transmitted over packet based network 38 comprises a header which identifies the connection to which it belongs. Thus, IP interface 48 may receive packets belonging to a plurality of different connections 30 and sort them out according to their headers.

In some embodiments of the invention, IP interfaces 48A and 48B communicate over a connection of a delivery confirming protocol, such as over a TCP connection 50 established within packet based network 38. Alternatively, a connection of a non-delivery confirming protocol, such as UDP, is used, optionally with complimentary flow control, forward correction codes and/or complete higher level delivery confirmation. Further alternatively, higher levels at the ends of modems 32A and 32B are trusted to check that no data was lost on packet based network 38.

In some embodiments of the invention, data signals received by either of units DC layer 44 and IP interface 48 are passed directly to the other unit (of DC layer 44 and IP interface 48) within the same gateway, for forwarding to their destination. Control packets or signals, on the other hand, are examined, for example, by a controller 46 which determines which actions are to be performed responsive to the control signals and whether the control signals should be forwarded by the other unit, as described in detail in the following description.

A negotiation stage begins with call modem 32A (FIG. 3) sending a call setup signal (e.g., CI of the V.8) over connection 30 to answer modem 32B. The call setup signal is received by modem 40A of call gateway 36A which responds on switched network 34A according to the predetermined procedures agreed between modems 32A, 32B and 40, e.g., according to one or more of the ITU-T V-series recommendations (for example as described in the V.8 recommendation). In addition, controller 46A sends, through IP interface 48A of call gateway 36A, a control packet to IP interface 48B of answer gateway 36B. Responsive to receiving the control packet, controller 46B of gateway 36B instructs its modem 40B to send a call setup signal to answer modem 32B and continue the procedures of negotiation and training, as is known in the art.

In some embodiments of the invention, the training and negotiating procedures (e.g., the four DP negotiation stages (phases 1-4), ECDC protocol negotiation, ECDC parameter negotiation) of modems 32A and 40A and of modems 32B and 40B are performed independently of each other and the data in control signals passed during the negotiation is not passed over TCP connection 50. Therefore, in these embodiments, the connections between modems 32A and 40A and modem 32B and 40B may be at different rates and even according to different protocols. Optionally, renegotiation and retraining procedures performed on one modem connection do not affect the other modem connection.

In some embodiments of the invention, DC layer 44 includes a buffer which stores the data received from IP interface 48, when it is received at a rate faster than can be sent on the modem connection. Alternatively or additionally, IP interface 48 maintains a buffer for the signals being passed to DC layer 44.

In some embodiments of the invention, only if the negotiating fails, e.g., between modems 32A and 40A, gateway 36A notifies gateway 36B so that it will disconnect the connection between modems 32B and 40B. Likewise, when one of call and answer modems 32A and 32B terminate their modem connection, the respective gateway notifies the other gateway so that it will also terminate the other modem connection. The notification may be performed, for example, by closing the TCP connection 50 between the gateways. In an embodiment of the invention, when one of the modem connections is terminated the other modem connection is immediately terminated. Alternatively, the other modem connection is maintained for a predetermined period in case the terminated connection is promptly reestablished.

Alternatively to performing the training and negotiation procedures separately, one or more of the negotiation stages is correlated between the connections of modems 32A and 40A and of modems 32B and 40B, for example, as described hereinbelow with reference to FIGS. 4, 5A and 5B.

Alternatively, to using a single TCP connection 50 for communication between IP interfaces 48, separate TCP connections are used for control (e.g., setup negotiation signals) and data messages.

In some embodiments of the invention, IP interfaces 48 compress the data signals they transmit and decompress the data signals they receive, in accordance with any compression method, such as methods used on VBM connections. Thus, the bandwidth utilization on packet based network 38 is reduced.

Figure 3:
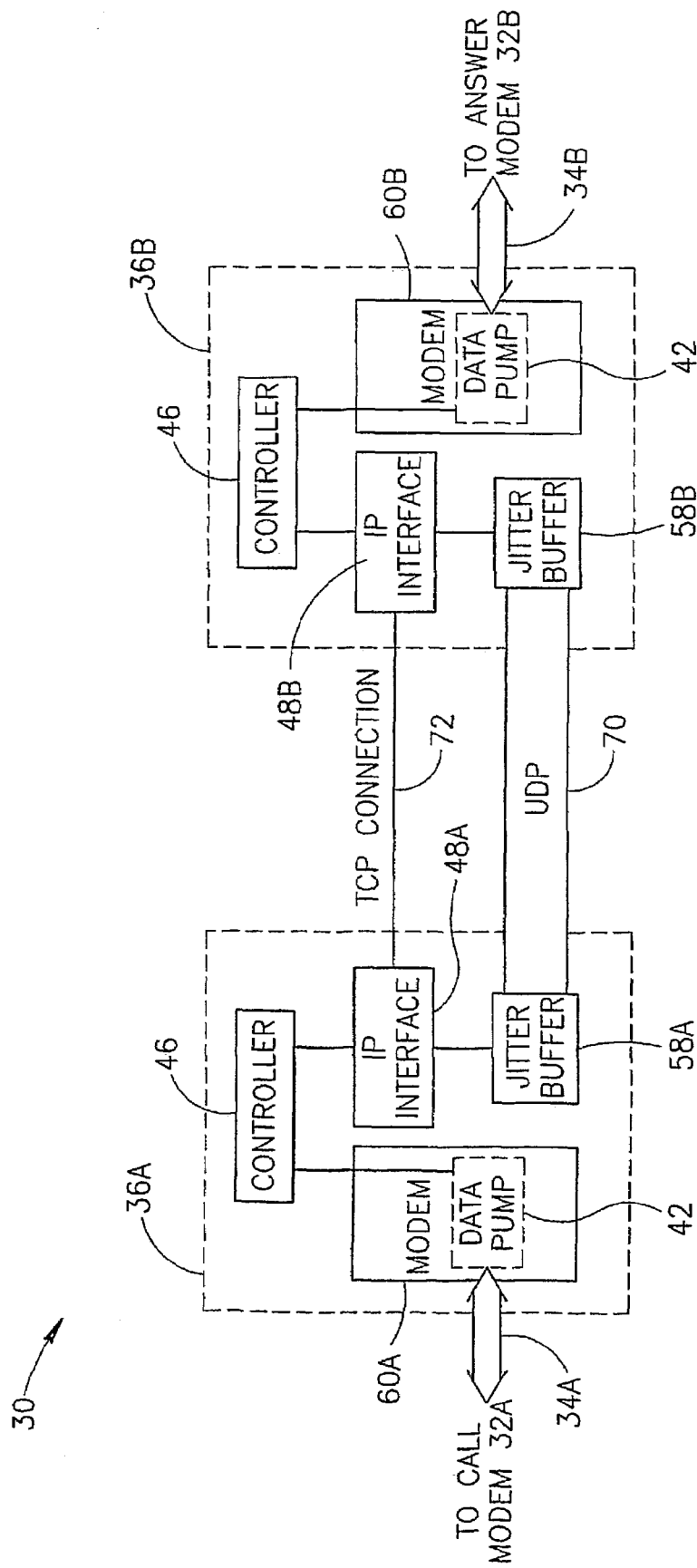
FIG. 3 is a schematic block diagram of gateways in a composite modem connection, in accordance with another embodiment of the present invention.

FIG. 3 is a schematic block diagram of gateways 36A and 36B and the connections between them, in accordance with another embodiment of the present invention. In the embodiment of FIG. 3, gateways 36A and 36B include IP interfaces 48 and controllers 46 similar to that described above, but include modems 60 (marked 60A and 60B) which do not perform error correction and data compression (ECDC) termination. Instead, data signals are passed through gateways 36A and 36B without delay and the EC and DC termination are performed between call and answer modems 32A and 32B. In some embodiments of the invention, IP interfaces 48 exchange signals using one or more connections of a protocol which does not provide delivery confirmation, e.g., UDP. Alternatively or additionally, IP interfaces 48 use one or more methods to increase the reliability of the transmissions on network 38, such as repeated transmission, redundancy codes and/or partial and/or total reception confirmation. The signals passing between IP interfaces 48 may include CRC fields used by end modems 32A and 32B in EC termination and/or are compressed in accordance to data compression methods. Optionally, parameter negotiation and/or protocol negotiation frames which are exchanged at the beginning of the data phase of an MoIP connection are related to by gateways 36A and 36B as regular data signals.

Not performing ECDC by gateways 36, reduces the signal delay over connection 30. In an exemplary embodiment, the transmission time from call modem 32 to answer modem 32B is about 100 msec when ECDC is not performed by gateways 36A and 36B, while when ECDC is performed by the gateways and the TCP protocol is used for transmission between IP interfaces 48, about an additional 250 msec are added to the transmission time, under normal conditions.

Furthermore, not providing ECDC by modems 60 simplifies the modems and reduces their power consumption. It is noted that modem 60 may be part of a modem array. By not performing ECDC by modem 60, the number of connections handled by the modem array is substantially larger than if ECDC is performed.

In an embodiment of the invention, IP interfaces 48 exchange data signals on a UDP connection 70 and control signals on a TCP connection 72. Alternatively, the control signals are exchanged on a UDP connection; either the same connection as used for the data or a separate connection is used. Optionally, some or all of the control messages are transmitted a plurality of times, e.g., three to five times, to ensure that the control messages are received. In some embodiments of the invention, the number of times the control messages are transmitted depends on the importance of the messages.

Modems 60 generally include data pumps 42 which modulate and demodulate the signals which pass through gateways 36A and 36B. In some embodiments of the invention, modem 60 checks the contents of the demodulated signals and transfers data signals directly to IP interface 48 to be sent to the peer gateway through packet based network 38. Demodulated control signals are transferred to controller 46 for handling as is now described.

In some embodiments of the invention, during the negotiation, gateways 36A and 36B ensure that the connections on networks 34A and 34B follow the same protocols and operate at the same upstream rates and the same downstream rates (the upstream and downstream rates are not necessarily the same). Alternatively, gateways 36A and 36B ensure that in the upstream from call modem 32A to answer modem 32B the data rate of the connection from gateway 36B to answer modem 32B is greater than the data rate of the connection from call modem 32A to gateway 36A. In this alternative the downstream from answer modem 32B to call modem 32A, the data rate of the connection from gateway 36A to call modem 32A is greater than the data rate of the connection from answer modem 32B to gateway 36B. This alternative is, however, wasteful in bandwidth and/or in processing resources and requires that modems 32A, 32B and 60 support an asynchronous transmission mode.

In some embodiments of the invention, gateways 36A and 36B include optional jitter buffers 58 which delay the data packets transmitted on UDP connection 70 for a predetermined time in order that substantially all the data packets passed on the UDP connection undergo equal delay. In some embodiments of the invention, jitter buffers 58 are relatively large relative to jitter buffers used for VoIP, such that even if there is a drift in one of the clocks of switched networks 34A or 34B the jitter buffers will not overflow or underflow frequently. Alternatively or additionally, the sizes of jitter buffers 58 are determined based on the current delay and/or loss rate of packet based network 38, using methods known in the art for VoIP.

Figure 4:
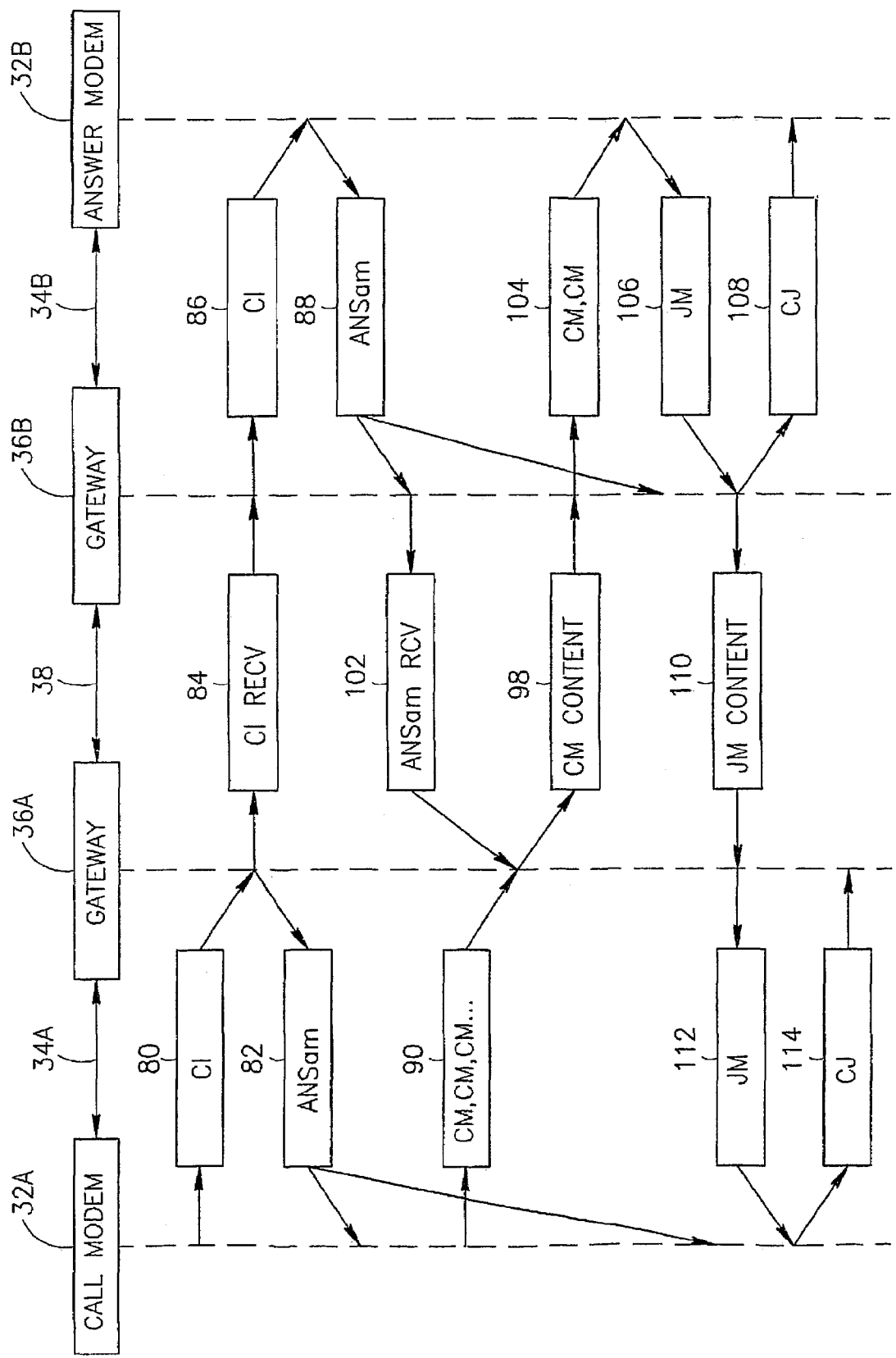
FIG. 4 is a schematic time chart of the operations performed in the first phase of establishing a composite modem connection, in accordance with an embodiment of the present invention.

FIG. 4 is a schematic time chart of the operations performed by call and answer modems 32A and 32B and gateways 36A and 36B of FIG. 3, in the first phase of establishing a connection, in accordance with an embodiment of the present invention. As is known in the art, in initiating a connection according to the V.8 standard, call modem 32A sends, after a second, CI signals 80 along switched network 34A. CI signals are received by modem 60A (FIG. 3) of gateway 36A which responds, as required by the V.8 recommendation, with the ANSam signal 82, as defined by the V.8 standard. Substantially in parallel, IP interface 48A sends a CI-RECV packet 84 to IP interface 38B, over TCP connection 72. CI-RECV packet 84 notifies IP interface 48B that CI signals 80 were received. Upon receiving CI-RECV packet 84, IP interface 48B notifies controller 46B which instructs modem 60B to start sending CI signals 86 to answer modem 32B.

When answer modem 32B detects at least one CI signal 86, it responds with an ANSam signal 88 as defined by the V.8 recommendation. In some embodiments of the invention, modem 60B does not respond to ANSam signal 88 until gateway 36B receives from gateway 36A information on the VBM connection between modem 60A and call modem 32A, as described hereinbelow. Rather, modem 60B continues to transmit CI signal 86 even after ANSam signal 88 is received. According to the V.8 recommendation, modem 32B continues to transmit ANSam signal 88, for up to about 5 seconds, until modem 60B responds to ANSam signal 88.

In some embodiments of the invention, when modem 60B receives ANSam signal 88, an ANSam-RECV packet 102 is sent by IP interface 48B to IP interface 48A.

After receiving ANSam signal 82 from modem 60A, call modem 32A transmits CM signals 90 as defined by the V.8 standard In some embodiments of the invention, modem 60A continues to transmit ANSam signal 82 even after it receives CM signals 90, in order to stall the VBM connection on switched network 34A until gateway 36A receives information on the VBM connection on switched network 34B from gateway 36B as described hereinbelow.

Upon receiving CM signal 90, in some embodiments of the invention, IP interface 48A sends to IP interface 48B a CM-RECV message (not shown) which indicates that a CM signal 90 from call modem 32A was received. Alternatively or additionally, CM signal 90 is passed to controller 46 (FIG. 3) for decoding. When controller 46 finishes decoding the CM signal, call IP interface 32 sends a CM-CONTENT message 98 carrying the contents of the received CM signal 90, to IP interface 48B. In an embodiment of the invention, CM-CONTENT message 98 also includes the capabilities of modem 60A. Alternatively or additionally, CM-CONTENT message 98 includes the standards and/or other capabilities supported by both call modem 32A (as indicated in CM signal 90) and modem 60A When CM-CONTENT message 98 is received by IP interface 48B, its contents are passed to controller 46B which instructs modem 60B as to which contents it should include in the CM signal it transmits. Upon receiving the instructions, modem 60B immediately, or after a predetermined period, begins to transmit a series 104 of identical CM messages containing the contents instructed by controller 46B.

In some embodiments of the invention, the contents of the CM messages in series 104 are based on the common capabilities of modems 60A, 60B, and call modem 32A. Thus, it is assured that the connections on networks 34 follow the same protocol.

When answer modem 32B receives two identical consecutive CM signals from series 104, it responds with JM signals 106 as required by the V.8 recommendation. Responsive to JM signal 106, gateway 36B transmits the CJ signal 108 and the connection between modem 60B and answer modem 32B moves to the second phase of negotiation, as is known in the art.

Substantially in parallel to transmitting CJ signal 108, gateway 36B sends a JM-CONTENT packet 110 which carries the capabilities of answer modem 32B and optionally of modem 60B. In some embodiments of the invention, JM-CONTENT packet 110 has the same format as CM-CONTENT packet 98. Upon receiving JM-CONTENT packet 110, gateway 36A sends a series of identical JM signals 112, based on the information received in JM-CONTENT packet 110 and optionally the capabilities of modem 60A. Thereafter, call modem 32A responds with a CJ signal 114, as is known in the art, and the connection on network 34A moves into the second phase of negotiation as is known in the art.

Further alternatively or additionally, modem 60B does not transmit CI signals 86 immediately upon receiving CI-RECV packet 84. Instead, modem 60B transmits CI signals 86 only after CM-CONTENT packet 98. Alternatively or additionally, modem 60B transmits CI signals 86 after a predetermined delay such that CM-CONTENT packet 98 will be received at about the time when CM signals 104 should be transmitted.

In some embodiments of the invention, CI-RECV packet 84, ANSam_RECV 102, CM_CONTENT 98, JM_CONTENT 110 and/or other packets transmitted over packet based network 38, are substantially in accordance with the definitions of packets in the T.38 recommendation. Alternatively or additionally, any other conventions agreed between gateways 36A and 36B and which are compatible with network 38 are used.

Figure 5A:
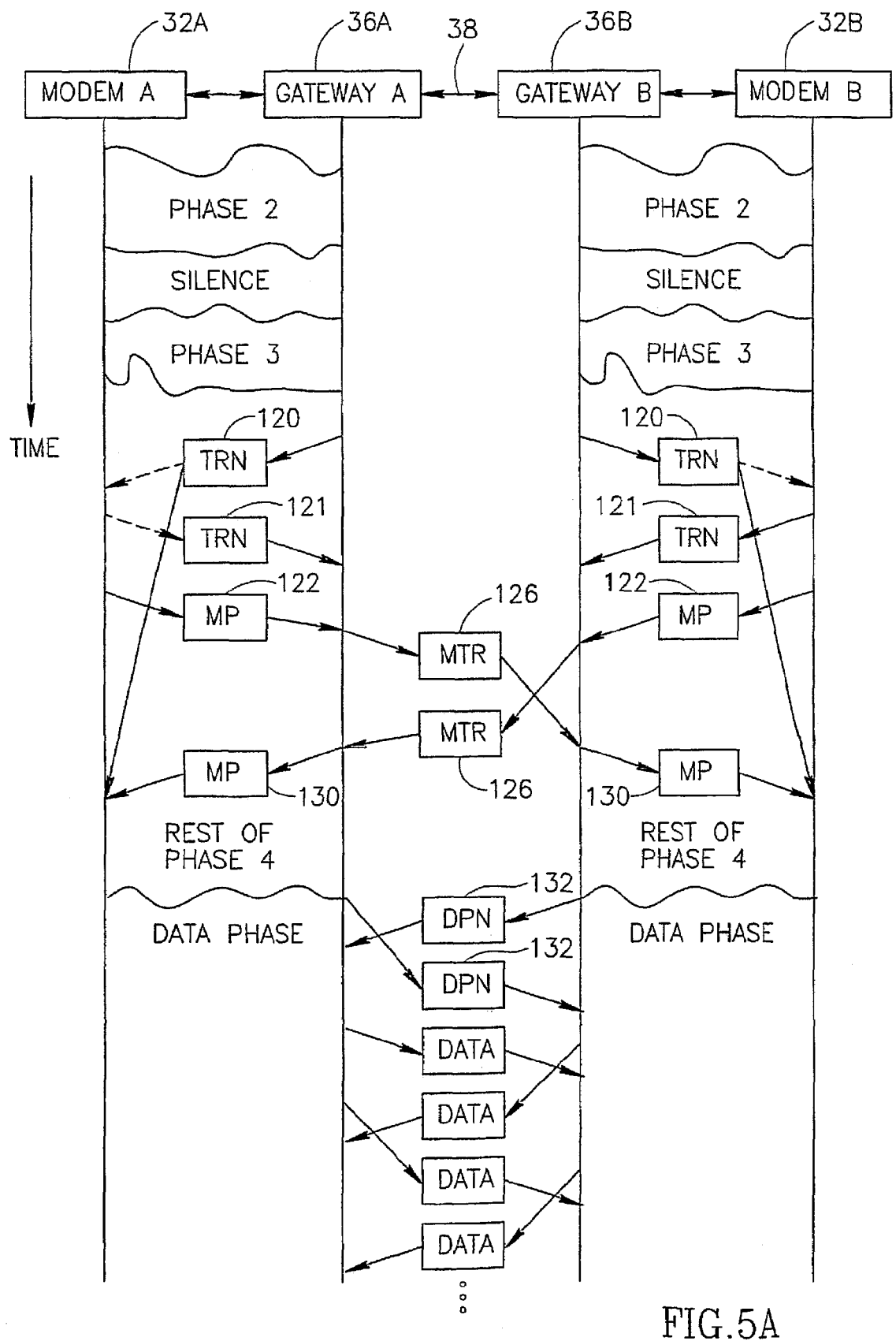
FIG. 5A is a time chart of the operations performed following the first phase of a composite modem connection, in accordance with an embodiment of the present invention.

FIG. 5A is a time chart of the operations performed during the second to fourth phases of a negotiation connection in which the V.34 protocol was chosen in the first phase, in accordance with an embodiment of the present invention. In some embodiments of the invention, each pair of modems 32A and 60A and modems 32B and 60B independently performs phases 2 and 3 of the standard negotiation procedures. Alternatively, gateway modems 60A and 60B perform phase 2 and/or phase 3 negotiations in a manner which differs from the standard. In some embodiments of the invention, gateway modems 60A and 60B perform phase 2 as described hereinbelow with reference to FIGS. 6A and 6B, so that the round trip delay (RTD) calculated by modems 32A and/or 32B will reflect the delay of the entire path between modems 32A and 32B and not only the path between modems 32A and 32B and the respective gateway modems 60A and 60B to which they are directly connected.

In some embodiments of the invention, gateways 36A and/or 36B support all the symbol rates of the V.34 protocol so as to allow maximal symbol rate leeway to end modems 32A and 32B. In some embodiments, the symbol rates used on networks 34A and 34B are determined independent of each other during phase-2, such that the symbol rate used by the connection on network 34A may be different than the connection on network 34B. If the different symbol rates on networks 34A and 34B do not allow the connections on networks 34A and 34B to use the same bit rate, the connections are retrained (i.e., the connections are moved back to phase 2), forcing the connections to agree on a single symbol rate, e.g., the lower of the previously agreed symbol rates on networks 34A and 34B. The chances of the different symbol rates on networks 34A and 34B preventing the connections on networks 34A and 34B from using the same bit rate are relatively slight and therefore in these embodiments, the risk of requiring a retrain is taken in order to allow use of higher bit rates, i.e., above the bit rate of 21,800 which is the maximal bit rate allowed by the 2400 symbol rate in the V.34 protocol.

Alternatively or additionally, gateways 36A and/or 36B deliberately do not identify themselves as supporting symbol rates and/or other phase-2 or phase-3 parameters which may not allow the connections on networks 34A and 34B to reach the same transmission bit rate without changing their symbol rates. In an embodiment of the invention, gateways 36A and/or 36B identify themselves as supporting only the lowest symbol rate, i.e., 2400 symbol/sec. Thus, in case one of networks 34 can only support a bit rate of 2400 or 2600, the other network 34 will be able to establish a connection at the same bit rate.

In some embodiments of the invention, gateways 36A and/or 36B do not generally limit the symbol rates of the connections on networks 34A and 34B. However, if a retrain is required, gateways 36A and/or 36B note the identity (e.g., telephone number) of the modem which requires low bit rates of only 2400 or 2600 and subsequent connections to this modem are performed while forcing use of the 2400 symbol rate. Optionally, the forcing of the use of the 2400 symbol rate is performed only after a predetermined number of connections which required a retrain and/or the time extent of the symbol rate forcing is limited in case the network connection to the modem is improved.

Alternatively, gateways 36A and 36B make sure that the connections on networks 34A and 34B operate with the same symbol rate, using any of the methods described hereinbelow for equalizing the bit rates of the networks.

In the fourth phase, as defined in the V.34 recommendation, modems 32A, 32B, 60A and 60B transmit TRN signals 120 and 121. Thereafter, modems 32A and 32B transmit MP signals 122 which identify the capabilities of the transmitting modems. In some embodiments of the invention, modems 60A and 60B do not immediately transmit MP signals 130 but instead wait until they determine the capabilities of the connection of the other gateway. In order not to leave the connections silent (which may cause disconnection), in some embodiments, modems 60A and 60B continue to transmit the TRN signals 120 until they receive the information required to generate the MP signals.

Upon receiving the MP signals 122 from modems 32A and 32B, respectively, gateways 36A and 36B transmit to each other, over packet based network 38, modem training report (MTR) packets 126. MTR packets 126 identify the capabilities of modems 32A and 32B, respectively, as identified in the MP signals 122 they transmitted. In an embodiment of the invention, MTR packets 126 also identify the capabilities of the modem of the transmitting gateway 36. Upon receiving an MTP packet 126 from the other gateway 36, the gateways (e.g., 36A) stop transmitting the TRN signals 120 and generate and transmit MP signals 130 which identify the common capabilities of the modem 32 to which they are not connected (e.g., 32A) and the modems 60 of the gateways. Thereafter, the negotiation procedures of the connections on networks 34A and 34B are completed independently according to the V.34 recommendation.

The contents of MP signals 130 are chosen such that the operation rates chosen in accordance with the V.34 recommendation are supported by all the modems. Thus, the rates of operation of the connections on networks 34A and 34B are substantially identical. In an embodiment of the invention, the contents of MP signals 130 are chosen as the common capabilities of the generating gateway 36 and the capabilities stated in the MTR packet 126 it receives. It is noted that the term capabilities used throughout the present application includes the capabilities of the modems and of the lines of networks 34A or 34B as determined from the training.

In some embodiments of the invention, gateways 36A and 36B continue to transmit TRN signals 120 until they receive the MTR packet 126 from the other gateway. As the time required to demodulate MP signals 122 and transmit MTR packets 126 is much shorter than the 2000 msec maximum transmission time of TRN signals 120, the prolonged transmission of TRN signals 120 does not violate the V.34 recommendation.

After phase 4 of the data pump (DP) negotiation is completed, modems 32A and 32B optionally perform ECDC protocol negotiation and ECDC parameter negotiation. In some embodiments of the invention, gateways 36A and 36B forward the ECDC negotiation signals they receive as if they are data signals, as described hereinbelow, without relating to the contents of the signals. Thus, the ECDC negotiations are performed directly between modems 32A and 32B and gateways 36A and 36B do not affect the contents of the negotiation signals.

After the ECDC negotiation, modems 32A and 32B transmit to each other data signals at the rates set during the negotiation. In some embodiments of the invention, before beginning to transmit data and/or before the ECDC negotiation, gateways 36 transmit to each other data phase negotiation (DPN) packets 132 notifying that data transmission follows. The data transmitted by modem 32A is received by modem 60A which transfers the data to IP interface 48A for transmission on UDP connection 70. IP interface 48A packages the received signals into packets. In some embodiments of the invention, the length of the data payload of the packets is substantially equal to the processing block size of modems 60 of the gateway. For example, if the transmission rate is 28.8

Kbps and modem 60 processes blocks every 20 msec, the length of the data payload of the packets is 576 bits. In an embodiment of the invention, if the number of data payload bits of a packet is not divisible by eight, padding bits (e.g., '0' bits) are added so that the packet has an integer number of bytes.

In some embodiments of the invention, controller 46 (or any other unit of gateway 36A) examines the contents of the signals passed from modem 60A to IP interface 48A to determine whether the signals include information. Optionally, signals which do not include information, i.e., signals which include filler sequences defined by modem recommendations, such as long sequences of '1' bits or idle ECDC 7E signals, are discarded and are not transmitted by interface 48A over UDP connection 70. This behavior is referred to herein as V.42 idle flag blocking. In some embodiments of the invention, controller 46 replaces the discarded signals by control packets transmitted, for example, on TCP connection 72 which state the number and/or nature of the discarded bits so that gateway 36B can fill in the discarded signals. Alternatively, control signals are not transmitted instead of the discarded signals and gateway 36B fills in the missing signals based on the rates of the modems in connection 30. By discarding signals which do not carry information, the load on packet based network 38 is reduced allowing higher utilization rates of the packet based network.

In some embodiments of the invention, the data packets transmitted by IP interface 48A are delayed by jitter buffer 58B such that nearly all the signals reach IP interface 48B after a fixed delay. In an embodiment of the invention, signals which do not reach IP interface 48B within the fixed delay are discarded and are considered lost in packet based network 38. In some embodiments of the invention, the fixed delay compelled by jitter buffer 58 is substantially the maximum delay which does not cause the total delay between modems 32A and 32B to go beyond the maximal delay allowed by the protocol governing the transmission on connection 30. Alternatively, the fixed delay is set substantially in accordance with any of the methods known in the art regarding VoIP and/or Fax over IP (FoIP). In some embodiments of the invention, the fixed delay compelled by jitter buffer 58 is set dynamically based on the rate of packet loss in packet based network 38.

The signals in the data packets received by IP interface 48B are passed to modem 60B which transmits the signals to answer modem 32B. In some embodiments of the invention, when fewer signals than required for the rate of transmission of connection 30 are received, gateway 36B generates filler bits as defined in modem recommendations. In some embodiments of the invention, the filler bits are generated at least partially based on control packets transmitted from gateway 36A.

In some embodiments of the invention, the transmission of signals from modem 32B to modem 32A is substantially as described above regarding the transmission in the other direction. Alternatively, different transmission options are used for the different directions. For example, the discarding of signals may be performed in only one direction according to the load on packet based network 38.

In some embodiments of the invention, the data transmitted between gateways 36 is encrypted in order to prevent eavesdroppers from understanding the contents of the transmitted data. The encryption is especially useful when packet based network 38 is not completely controlled by individuals who are obliged to adhere to high standards of secrecy.

In some embodiments of the invention, whenever a retrain, re-negotiate and/or terminate event occurs in one of the modem connections on switched networks 34A or 34B, the gateway participating in the modem connection in which the event occurred sends a notification packet identifying the event to the other gateway. Responsive to the notification packet, the other gateway initiates the same event in the other modem connection.

Figure 5B:
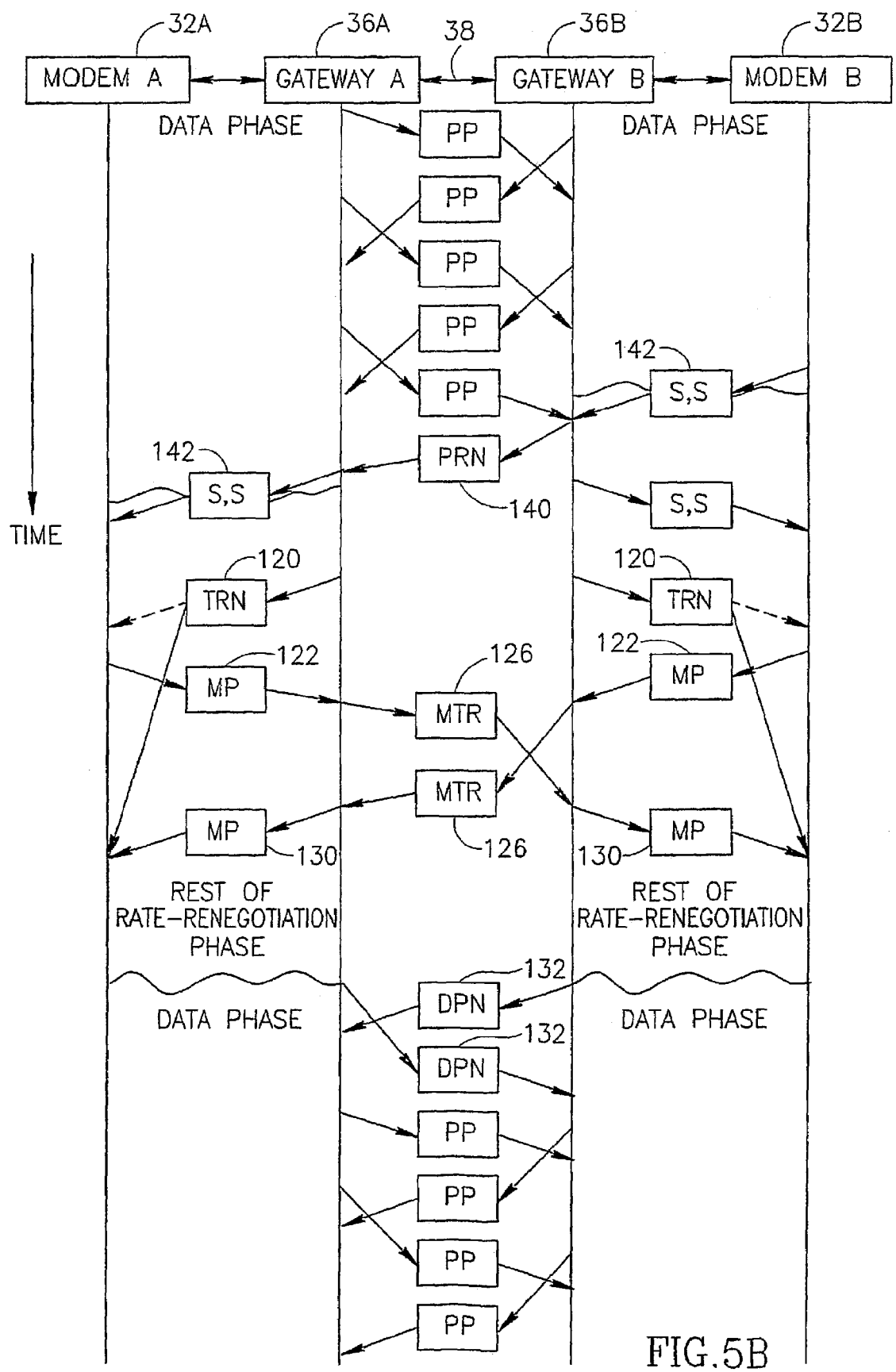
FIG. 5B is a time chart of the operations performed during a re-negotiation event, in accordance with an embodiment of the present invention.

FIG. 5B is a time chart of the operations performed during a re-negotiation event, in accordance with an embodiment of the present invention. When a re-negotiation is initiated by modem 32B, gateway 36B receives the S,$\overline{S}$ signals 142 which signal the re-negotiation event in the V.34 recommendation. Upon receiving S,$\overline{S}$ signals 142, gateway 36B transmits a re-negotiation packet (PRN) 140 to gateway 36A, which immediately initiates a re-negotiation on its connection with modem 32A. The connections between modem 32A and gateway 36A and between modem 32B and gateway 36B both return to the beginning of phase 4, transmitting TRN messages 120 and 121 and then MP messages 122, as described hereinabove.

The termination procedure of the V.34 recommendation includes transmitting MP signals which state zero rates. In some embodiments of the invention, the information in these MP signals is transmitted to the other gateway 36 in an MTR packet 126. Alternatively, as the information in the MP signal is not required by the other gateway 36, a down signal packet that merely indicates the termination event is sent to the other gateway.

Figure 6A:
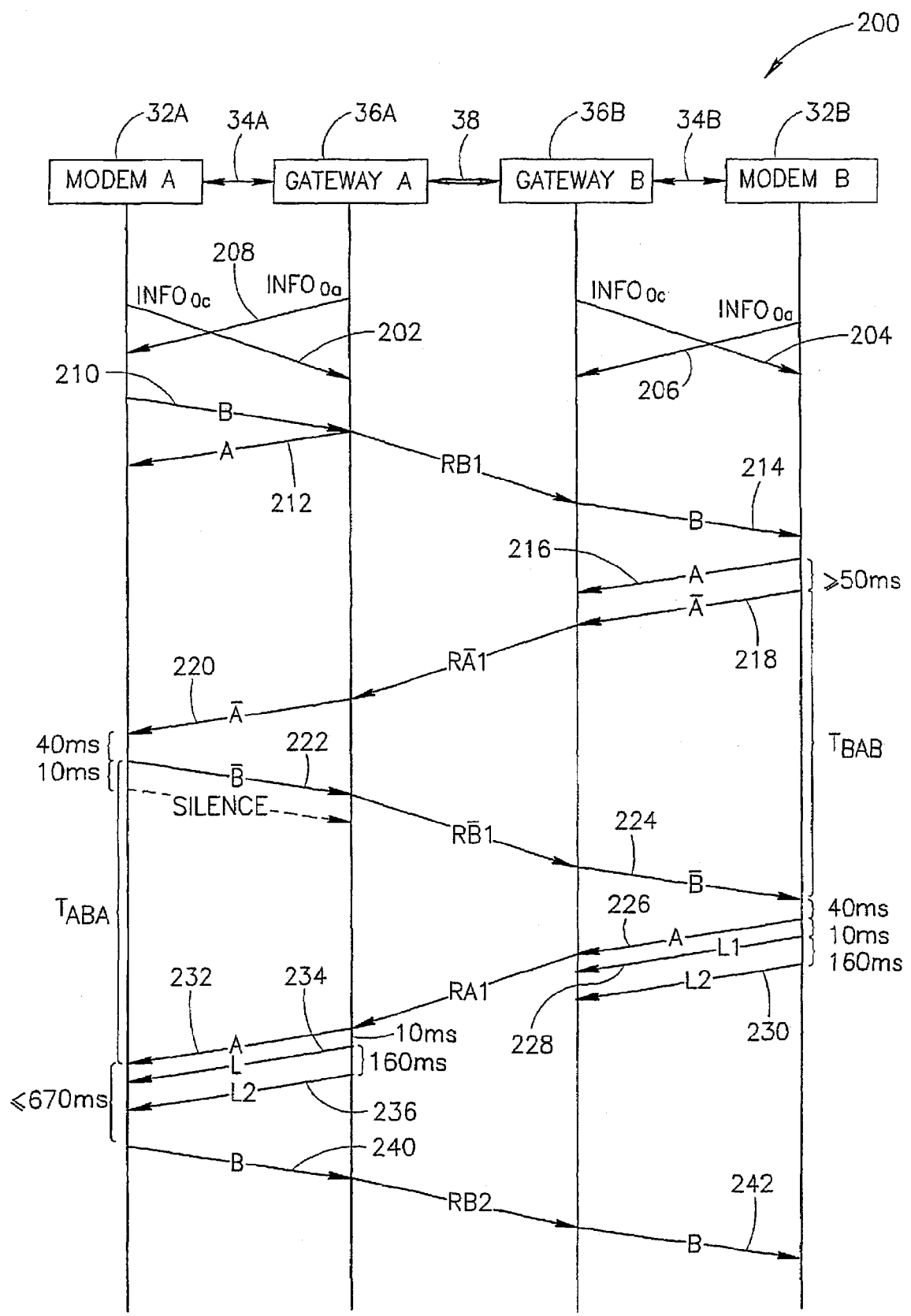
FIGS. 6A and 6B are a time chart of the operations performed during a second phase of a V.34 negotiation connection, in accordance with an embodiment of the present invention.
Figure 6B:
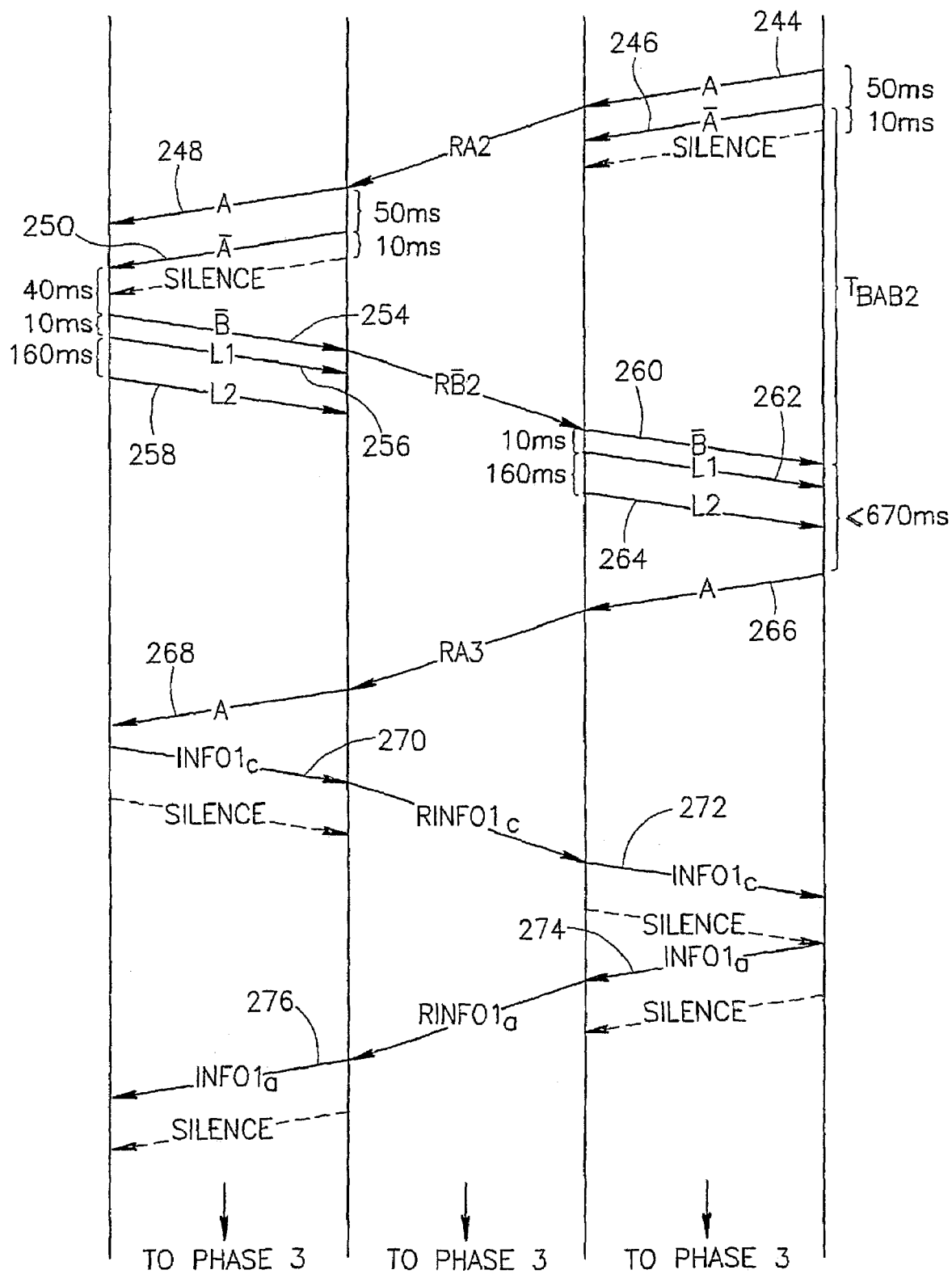

FIGS. 6A and 6B are a time chart 200 of the operations performed during the second phase of a V.34 negotiation connection, in accordance with some embodiments of the present invention. Generally, the method illustrated by FIGS. 6A and 6B is performed by gateways 36 to cause modems 32A and 32B to determine round trip delay (RTD) values corresponding to the entire path between the modems, i.e., including packet based network 38. Modems 32A and 32B generally use the determined RTD values in a time out mechanism of the error correction (EC) in determining when to request a retrain. Thus, the method of FIGS. 6A and 6B is generally used with gateways 36 which include modems 60 which do not perform error correction (EC), as shown in FIG. 3.

As shown in FIG. 6A, at the beginning of phase 2, call modem 32A and the modem of gateway 36B transmit INFO0c signals (202 and 204) one switched networks 34A and 34B, respectively. Likewise, answer modem 32B and the modem of gateway 36A transmit INFO0a signals (206 and 208) on the respective switched networks 34A and 34B. After completing the transmission of INFO0c signal 202, modem 32A begins transmitting the B signal (210), which as all the other signals mentioned herein is defined in the V.34 protocol. When gateway 36A receives signal B 210, it optionally checks if the recovery mechanism of the INFO signals 202 and 208 was finalized. If the recovery mechanism was finalized, gateway 36A responds by transmitting signal A (212) on network 34A and in addition transmits a notification packet (RB1) reporting the reception of signal B 210, to gateway 36B. Otherwise, gateway 36A waits for the recovery mechanism to be finalized before transmitting notification packet (RB1). Upon receiving packet RB1, gateway 36B begins transmitting signal B (214) on network 34B, if the recovery mechanism of the INFO signals 204 and 206 was finalized. In some embodiments of the invention, if the recovery mechanism of the INFO signals 204 and 206 was not finalized gateway 36B waits for the finalization before it transmits B signal 214. Alternatively, gateway 36B begins transmitting signal B (214) after completing the transmission of INFO0c signal 204, irrespective of the reception of the RB1 packet.

Optionally, in this alternative, the RB1 packet is not transmitted. As is known in the art, modem 32B responds with signal A (216) to the received signal B (214). After a predetermined time of at least 50 msec, modem 32B reverses the phase of the A signal 216 it transmits and thus transmits an $\overline{A}$ signal (218). Responsive to receiving the $\overline{A}$ signal 218, gateway 36B transmits an R$\overline{A}$1 packet to gateway 36A notifying that $\overline{A}$ signal 218 was received. Upon receiving the R$\overline{A}$1 notification packet, gateway 36A reverses the phase of the A signal 212 it is transmitting, thus transmitting an $\overline{A}$ signal 220.

As is defined by the V.34 protocol, 40 msec after receiving $\overline{A}$ signal 220 modem 32A begins transmitting a $\overline{B}$ signal 222. When gateway 36A receives $\overline{B}$ signal 222, it transmits a R$\overline{B}$1 packet to gateway 36B, indicating that $\overline{B}$ signal 222 was received. Responsive to the R$\overline{B}$1 packet, gateway 36B transits to modem 32B a $\overline{B}$ signal 224. When modem 32B receives $\overline{B}$ signal 224 it responds to the received $\overline{B}$ signal 224 by waiting 40 msec and transmitting A signal 226 for 10 msec, transmitting an L1 signal 228 for 160 msec and then transmitting an L2 signal 230. In addition, modem 32B calculates a first round trip delay value (RTD) by subtracting 40 msec from the time $T_{BAB}$ between when it transmitted $\overline{A}$ signal 218 and when it received $\overline{B}$ signal 224. It is noted that gateway 36B does not respond with $\overline{B}$ signal 224 40 msec after receiving $\overline{A}$ signal 218 but rather waits until it receives the R$\overline{B}$1 packet. Thus, the RTD calculated by modem 32B covers the entire round trip between modems 32B and 32A rather than between modem 32B and gateway 36B.

In some embodiments of the invention, when gateway 36B receives A signal 226 it does not reverse the phase of the $\overline{B}$ signal 224 it transmits, as prescribed by the V.34 recommendation, but rather continues to transmit $\overline{B}$ signal 224 without change. Instead, gateway 36B transmits to gateway 36A an RA1 packet which indicates the reception of A signal 226. When gateway 36A receives the RA1 packet, gateway 36A transmits to modem 32A an A signal 232 for 10 msec, followed by an L1 signal 234 for 160 msec and an L2 signal 236.

In addition, modem 32A calculates a round trip delay value (RTD) by subtracting 40 msec from the time $T_{ABA}$ between when it transmitted $\overline{B}$ signal 222 and when it received A signal 232. It is noted that gateway 36A does not respond with A signal 232 40 msec after receiving $\overline{B}$ signal 222 but rather waits until it receives the RA1 packet. Thus, the RTD calculated by modem 32A covers the entire round trip between modems 32A and 32B rather than between modem 32A and gateway 36A.

Within 670 msec from receiving A signal 232, modem 32A transmits a second B signal 240. In some embodiments of the invention, when gateway 36A receives B signal 240, it transmits a RB2 packet which indicates the reception of B signal 240, to gateway 36B. Optionally, when gateway 36B receives the RB2 packet it transmits a second B signal 242 to modem 32B. Alternatively, gateway 36B transmits the second B signal 242 according to its internal timing, independent of the reception of the RB2 packet which optionally is not transmitted. Further alternatively, when possible, i.e., less than 670 msec passed between receiving A signal 226 and receiving the RB2 packet, B signal 242 is transmitted only after B signal 242 is received. If, however, it is not possible to wait that long, i.e., 670 msec passed since receiving A signal 226 and the RB2 packet was not received, B signal 242 is transmitted without waiting for the RB2 packet.

Turning to FIG. 6B, after B signal 242 is received by modem 32B, modem 32B transmits a third A signal 244 for 50 msec, an $\overline{A}$ signal 246 for 10 msec and then remains silent. In some embodiments of the invention, when gateway 36B receives A signal 244 it transmits a reception indication packet RA2 to gateway 36A. Optionally, gateway 36B additionally transmits an R$\overline{A}$2 packet (not shown), when it receives $\overline{A}$ signal 246. Responsive to receiving the RA2 packet, gateway 36A transmits an A signal 248 for 50 msec, an $\overline{A}$ signal 250 for 10 msec and then remains silent. As defined by the V.34 protocol, 40 msec after receiving $\overline{A}$ signal 250, modem 32A transmits a $\overline{B}$ signal 254 for 10 msec, an L1 signal 256 for 160 ms and then transmits an L2 signal 258. Responsive to receiving $\overline{B}$ signal 254, gateway 36A transmits a reception packet RB2 packet to gateway 36B. Responsive to receiving reception packet R$\overline{B}$2, gateway 36B transmits to modem 32B a $\overline{B}$ signal 260 for 10 msec, an L1 signal 262 for 160 msec and an L2 signal 264. In addition, modem 32B calculates a second RTD value by subtracting 40 msec from the time $T_{BAB2}$ between when it transmitted $\overline{A}$ signal 246 and when it received $\overline{B}$ signal 260.

Within 670 msec from receiving $\overline{B}$ signal 260, modem 32B transmits a fourth A signal 266 to gateway 36B. Responsive to receiving $\overline{B}$ signal 260, gateway 36B transmits a reception packet R$\overline{A}$3 to gateway 36A which in turn transmits an A signal 268 to modem 32A. Alternatively, packet RA3 is not transmitted and/or A signal 268 is transmitted independent of the time at which A signal 266 is transmitted. In an exemplary embodiment of the invention, A signal 268 is transmitted by gateway 36A a predetermined number of msec after receiving L2 signal 258. The predetermined number of msec may be a fixed number, for example between 300-500 msec or may be a function of the round trip delay (RTD) of signals on network 38. Optionally, gateway 36A determines the RTD of signals on network 38 by subtracting a correction factor from the time between transmitting the R$\overline{B}$1 packet and receiving the RA1 packet. The correction factor is possibly equal to 40 msec added to an estimate of the RTD of signals on switched networks 34.

Further alternatively, A signal 268 is transmitted within the required 670 msec of the V.34 protocol, if possible after receiving the RA3 packet.

Responsive to A signal 268, modem 32A transmits, to gateway 36A, an INFO1c signal 270 as required by the V.34 protocol. Responsive to INFO1c signal 270, gateway 36A transmits a reception packet RINFO1c, which indicates the reception of INFO1c signal 270 to gateway 36B. In this embodiment, the reception packet RINFO1c does not include the data of INFO1c signal 270. Responsive to reception packet RINFO1c, gateway 36B transmits to modem 32B an INFO1c signal 272. As required by the V.34 protocol, modem 32B responds to INFO1c signal 272 with an INFO1a signal 274. Responsive to INFO1a signal 274, gateway 36B transmits a reception packet INFO1a to gateway 36A. Responsive to reception packet RINFO1a, gateway 36A transmits to modem 32A an INFO1a signal 276.

Alternatively, gateway 36A responds to INFO$_{1c}$ signal 270 with INFO1a signal 276 substantially immediately, i.e., without relation to the timing of the signals on network 34B. In this alternative, the RINFO1c and RINFO1a packets are optionally not transmitted.

Further alternatively, the RINFO1c packet includes at least some of the data in INFO1c signal 270 and/or the RINFO1a packet includes at least some of the data in INFO1a signal 274. In some embodiments of the invention, the contents of the RINFO1c packet are used in generating NFO1c signal 272 and/or the contents of the RINFO1a packet are used in generating INFO1a signal 276. For example, the RINFO1a packet may include the symbol rate used on network 34B and gateway 36a uses the information from the RINFO1a packet to make sure, if possible, that the symbol rates on networks 34A and 34B are equal.

In some embodiments of the invention, the above described reception notification packets (e.g., RA1, RA2, RA3, R$\overline{A}$1, R$\overline{A}$2, RB1, RB2, R$\overline{B}$1, R$\overline{B}$2, RINFO1c and RINFO1a) transmitted on packet based network 38, may be in substantially any format, for example in a format similar to the definitions of packets in the T.38 recommendation. In some embodiments of the invention, some or all of the reception notification packets, particularly those which are required for time measurements, are transmitted a multiplicity of times to reduce the chances of problems due to packet loss. In some embodiments of the invention, the number of times each reception notification packet is transmitted is determined as a function of the loss rate of network 38, such that the chances that all the copies of a specific packet will be lost is beneath a predetermined value.

In some embodiments of the invention in which gateways 36A and/or 36B apply a buffer delay $T_{jitter}$ for jitter prevention to data signals they receive, the same delay $T_{jitter}$ is applied also to the reception notification packets. Alternatively the $T_{jitter}$ delay is applied only to reception notification packets which are involved in a transmission path whose time is measured, e.g., R$\overline{A}$1 and R$\overline{B}$1. Alternatively to delaying the reception notification packets, gateways 36A and/or 36B wait a time $T_{jitter}$ between receiving the reception notification packets and transmitting respective switched network signals (for example, $\overline{A}$ signal 220, $\overline{B}$ signal 224) which are transmitted responsive to receiving the packets.

Alternatively to using the procedure of FIG. 6 which requires transmission of reception indication packets between gateways 36A and 36B, each of gateways 36A and 36B delays the transmission of timing signals for an estimated delay period in addition to the delay period prescribed by the relevant protocol, e.g., 40 msec in the V.34. In some embodiments of the invention, the delay period comprises a sum of the round trip delay of network 38 and of an estimate of the delay period of the remote switched network, i.e., the network 34A or 34B to which the gateway is not directly connected.

In some embodiments of the invention, before and/or at the beginning of phase 2, the round trip delay of packets on the network 38 included in the current MoIP connection 30, is measured. Optionally, the round trip delay is measured by transmitting an echo request packet (e.g., an ICMP echo request) from one of the gateways 36 to the other and measuring the time between transmitting the echo request and receiving the response thereto, from the other gateway. Alternatively or additionally, each of gateways 36A and 36B transmits to the other gateway a packet including a time stamp. The round trip delay of network 38 is then calculated as twice the difference between the reception time and the time stamp in the packet. In some embodiments of the invention, the round trip delay is measured a few times and the highest value is used. Alternatively or additionally, a safety margin is added to the measured RTD value of network 38. Further alternatively or additionally, the RTD of network 38 is kept substantially constant for any specific MoIP connection 30, for example by using jitter buffers and/or by using load regulated packet based networks.

In some embodiments of the invention, gateways 36A and/or 36B use a predetermined value for the estimate of the round trip delay (RTD) of all remote switched networks. It is noted that most MoIP connections include relatively short switched network segments. Furthermore, in most MoIP connections the delay of the switched networks is small relative to the delay of the packet based network 38. Therefore, inaccuracies in the estimate of the round trip delay of the remote switched network 34 are unimportant. Optionally, the estimate of the RTD of remote switched networks is configured by a network manager. Alternatively or additionally, the estimate of the RTD of remote switched networks is periodically determined by gateways 36A and 36B based on periodic measurements. In some embodiments of the invention, the estimate of the RTD of remote switched networks is set as an upper bound on the RTD of switched networks. Alternatively, the average value of the RTD of switched networks, is used.

It is noted that in the absence of far echo effects, as is generally the case in MoIP connections (due to the relatively short distance between modem pairs 32A and 60A and 32B and 60B) incorrect RTD values do not cause distortions, as no echo cancellation is actually performed. Although the above method for adjusting the measured RTD was described with relation to the V.34 protocol, the above method may be implemented for substantially any other voice band modem protocol. Optionally, in protocols which do not measure the RTD, e.g., the V.22 protocol, gateways 36A and 36B cause modems 32A and 32B to use time-out values which take into account worst case times of MoIP connections.

Figure 7:
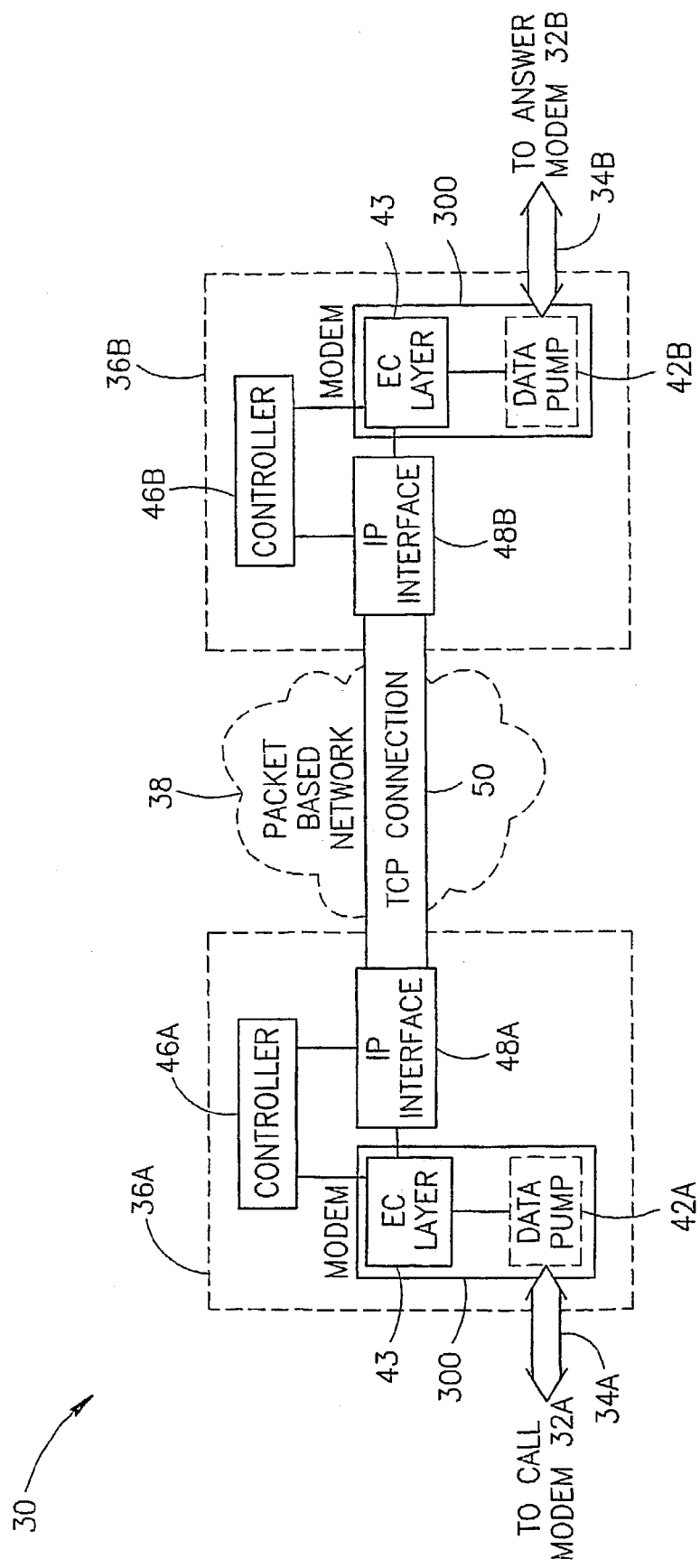
FIG. 7 is a schematic block diagram of gateways on a composite connection, in accordance with another embodiment of the present invention.

FIG. 7 is a schematic block diagram of gateways 36A and 36B and the connections between them, in accordance with another embodiment of the present invention. In the embodiment of FIG. 7, gateways 36A and 36B include IP interfaces 48 and controllers 46 similar to that described above with respect to FIGS. 2 and 3, but include modems 300 which include error correction (EC) units 43 but do not perform data compression (DC) termination. Instead, the DC termination is performed directly between call and answer modems 32A and 32B.

Not providing DC termination by gateways 36 simplifies modems 300 and reduces their power and memory consumption. It is noted that modem 300 may be part of a modem array. By not performing DC by modem 300, the number of connections handled by the modem array may be substantially larger than if DC termination is performed.

In some embodiments of the invention, IP interfaces 48A and 48B communicate over a connection of a delivery confirming protocol, such as over a TCP connection 50 established within packet based network 38. The use of a delivery confirming protocol prevents occurrence of problems in decompression due to loss of data on packet based network 38. Alternatively, a non delivery confirming protocol (e.g., UDP) is used, optionally with forward error correction methods which reduce the chances of errors occurring in the received signals.

In some of the embodiments of the invention in accordance with FIG. 7, the connections on switched networks 34A and 34B may be in accordance with different protocols, rates and/or other parameters. In these embodiments, gateways 36A and 36B do not mirror to each other control signals during one or more negotiation stages of the connections. Thus, the selection of protocols, symbol rates and/or data rates is performed independently for each of switched networks 34A and 34B.

Alternatively, one or more parameters of the connections on switched networks 34A and 34B are correlated, for example using any of the methods described above, in order to minimize the time difference between transmitting the same signals, particularly negotiation signals, on switched networks 34A and 34B. For example, in some embodiments of the invention, the signals of the first phase of the negotiation stage (e.g., the V.8 phase) are mirrored between gateways 36A and 36B as described above with reference to FIG. 4, so that the connections on both networks 34A and 34B follow the same protocol. Having the connections on networks 34A and 34B follow the same protocol limits the time difference between the entering of the data transmission stage on both of networks 34A and 34B.

In some embodiments of the invention, also negotiation signals of further negotiation stages are correlated as described hereinabove with reference to FIGS. 5A and 5B, in order to further limit the time difference between the entering of the data transmission stage on both of networks 34A and 34B. Alternatively, the timing of the signals during one or more of the negotiation stages is correlated without correlating the contents of the signals.

Figure 8:
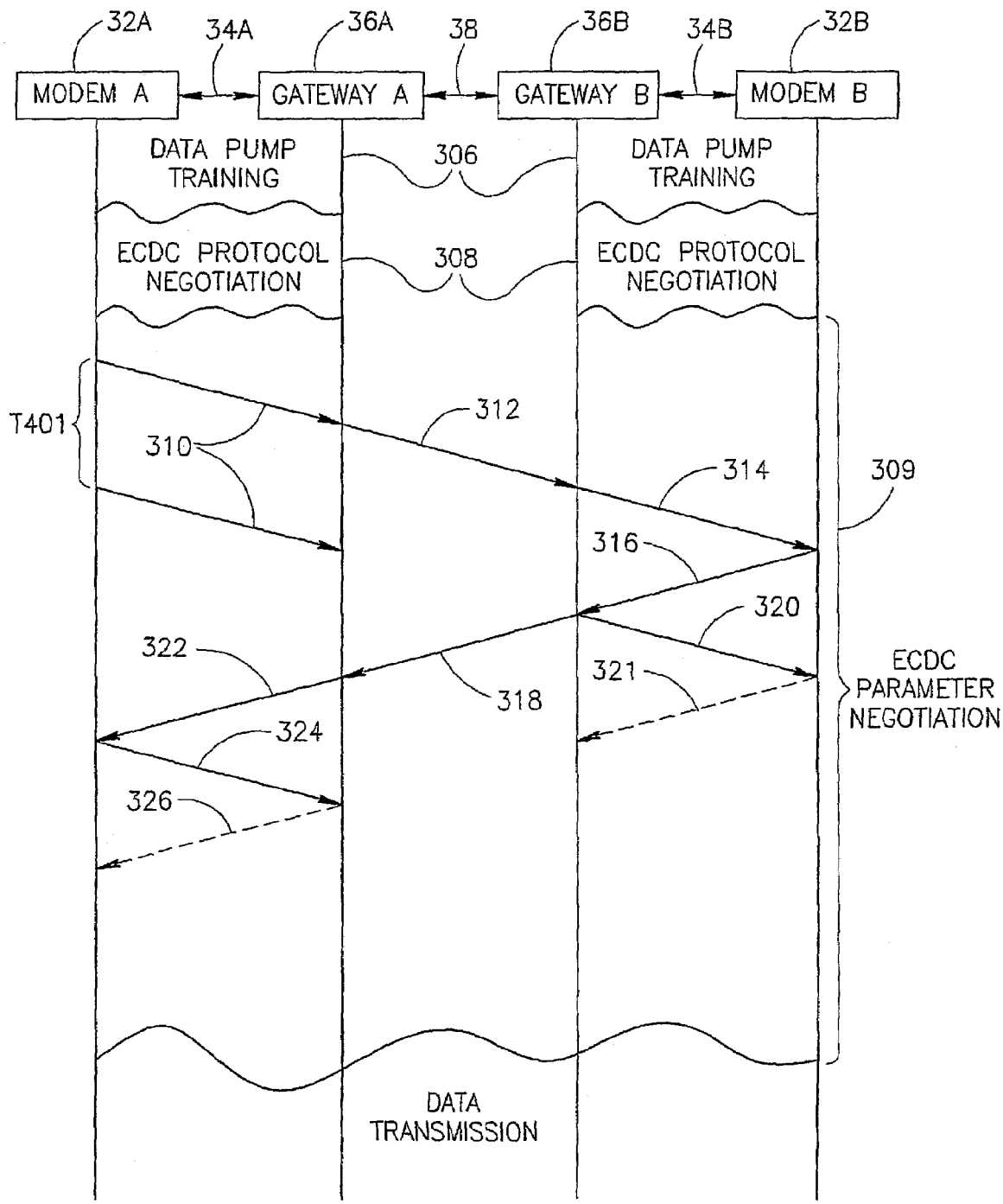
FIG. 8 is a time chart of signals transmitted on a MoIP connection during a compression negotiation stage, in accordance with some embodiments of the present invention.

In some embodiments of the invention, as described, for example, with reference to FIG. 8, ECDC parameter negotiation signals transmitted at the beginning of the data transmission stages are mirrored by gateways 36A and 36B to each other, such that the compression negotiation is performed between modems 32A and 32B.

FIG. 8 is a time chart of the frames transmitted between modems 32A and 32B during an ECDC parameter negotiation stage, in accordance with some embodiments of the present invention. As is known in the art, when the connections between modem 32A and gateway 36A and gateway 36B and modem 32B are established, the modems and gateways perform data pump (DP) training stages 306 (e.g., phases 1-4 of the V.34 recommendation) and then perform an ECDC protocol negotiation stage 308 (e.g., selecting MNP or V.42). DP training stages 306 and protocol negotiation stage 308 may be performed on the connections of networks 34A and 34B separately without exchanging information between gateways 36A and 36B or with partial or complete correlation between the connections, for example as described above with reference to FIGS. 5A and 5B, regarding DP stages 306.

After completing data pump training 306 and ECDC protocol negotiation stage 308, the connections on switched networks 34A and 34B move to an ECDC parameter negotiation stage 309, governed by the protocol selected during the ECDC protocol negotiation 308. It is noted that the compression negotiation stage on networks 34A and 34B are not necessarily governed by the same protocol. Alternatively, gateways 36A and 36B correlate the signals transmitted during ECDC protocol negotiation stage 308 to force both the connections on networks 34A and 34B to select the same ECDC protocol, for example using methods similar to those described above to force the connections to choose the same DP protocol during phase-1.

As is known in the art, at the beginning of ECDC parameter negotiation stage 309, call modem 32A transmits a caller-compression capability frame 310 (e.g., an XID or LR frame) to gateway 36A. Optionally, instead of responding immediately on switched network 34A, gateway 36A transmits a caller compression capability packet 312 containing the data of frame 310 to gateway 36B, and waits for a response thereto before responding to frame 310. After a time-out interval $T_{401}$ call modem 32A may repeat the transmission of its frame 310. Optionally, gateway 36A will continue not to respond to the frame 310. Alternatively, gateway 36A responds (not shown) to the first frame 310, or to the repeated frame 310, with guess values, as described hereinbelow.

In some embodiments of the invention, when gateway 36B receives packet 312 it transmits a caller compression capability frame 314 to modem 32B. Optionally, the contents of compression capability frame 314 depend on the contents of packet 312, as described hereinbelow. In some embodiments of the invention, DC related information in frame 314 is substantially identical to the respective information in frame 310 which caused the transmission of packet 312. When modem 32B receives frame 314 it responds with an answer compression capability frame 316 which identifies the compression parameters of modem 32B. Upon receiving frame 316, gateway 36B transmits an answer compression capability packet 318 including the contents of frame 316 to gateway 36A. In addition, gateway 36B responds to modem 32B with a response frame 320 (e.g., a SABME frame or an LA frame) according to the compression protocol in use. In accordance with some protocols, e.g., the V.42 protocol, modem 32B responds with a response confirmation frame 321 (e.g., a UA frame).

Responsive to receiving answer compression packet 318, gateway 36A optionally transmits an answer compression frame 322 to modem 32A which identifies the compression capabilities of modem 32B, as identified by frame 316 and transferred by packet 318. As is known in the art, modem 32A responds to compression frame 322 with a response frame 324 (e.g., a SABME frame or an LA frame). In accordance with some protocols, gateway 36A responds with a response confirmation frame 326 (e.g., a UA frame).

It is noted that frames 310 and 316 may include also EC related information. Optionally, the EC related information is not transferred in packets 312 and 318 between gateways 36A and 36B and/or does not affect the contents of frames 314 and 322. Alternatively, in some embodiments in which the EC layers of the connections on networks 34A and 34B are correlated some and/or all of the parameters in frames 310 and 316 are transferred between gateways 36A and 36B.

Thereafter, modems 32A and 32B transmit to each other data. Data signals received by gateways 36A and 36B are optionally forwarded to the other gateway in data packets, on a TCP connection 50 (FIG. 7). In some embodiments of the invention, when the flow control (e.g. window size) of TCP connection 50 does not allow transmission of all the data received by a gateway 36 through its modem 300, the gateway 36 (36A or 36B) optionally uses modem flow control methods (e.g., not transmitting acknowledgments) to stop the transmission of data to the gateway over the switched network 34 to which it is connected. Alternatively or additionally, the gateway 36 buffers the data it receives on network 34 until the data may be transmitted on TCP connection 50. When one of the connections on networks 34A and 34B is closed, the gateway 36 attached to the closed connection closes the TCP connection 50 and thus signals to the other gateway 36 to close its modem connection.

In some embodiments of the invention, when during transmission of data a break frame (e.g., a UI frame of the V.42 protocol or an LN frame of the MNP protocol) is received from one of end modems 32A or 32B, the gateway 36 receiving the break frame notifies the other gateway in addition to responding to the break frame as required by the protocol used. Gateways 36 optionally notify each other on reception of a break frame by transmitting a break packet which states the reception of the break frame, the type of the break (e.g., destructive, expedited), an attention sequence number and possibly includes a break length. Optionally, a break length is included in the break packet if the received break frame included a break length field. Alternatively or additionally, a break length is included in the break frame only if the connections on both networks 34A and 34B support the indication of break lengths in their break frames. The gateway receiving the break packet transmits a respective break frame on its modem connection.

Referring in more detail to the contents of caller compression capability frame 314, in some embodiments of the invention, when gateway 36B knows that modem 32B operates in accordance with a different compression protocol than modem 32A, the contents of frame 314 indicate that modem 32A does not support compression. When gateway 36B is not aware of whether modem 32A and 32B use different protocols or when gateway 36B knows that both modems use the same compression protocol, the contents of frame 314 optionally follow the contents of packet 312.

Alternatively or additionally, when gateway 36B knows that modem 321 operates in accordance with a different compression protocol than modem 32A, gateway 36B immediately responds to packet 312 by transmitting packet 318 with indication of no compression, without waiting for reception of frame 316.

Further alternatively or additionally, gateways 36A and 36B exchange packets indicating the protocols selected in ECDC protocol negotiation 308 before beginning ECDC parameter negotiation 309. Optionally, if the protocols used on the connections of networks 34A and 34B are different, ECDC parameter negotiation 309 is performed independently on connections 34A and 34B (i.e., packets 312 are not exchanged between gateways 36A and 36B).

Figure 9A:
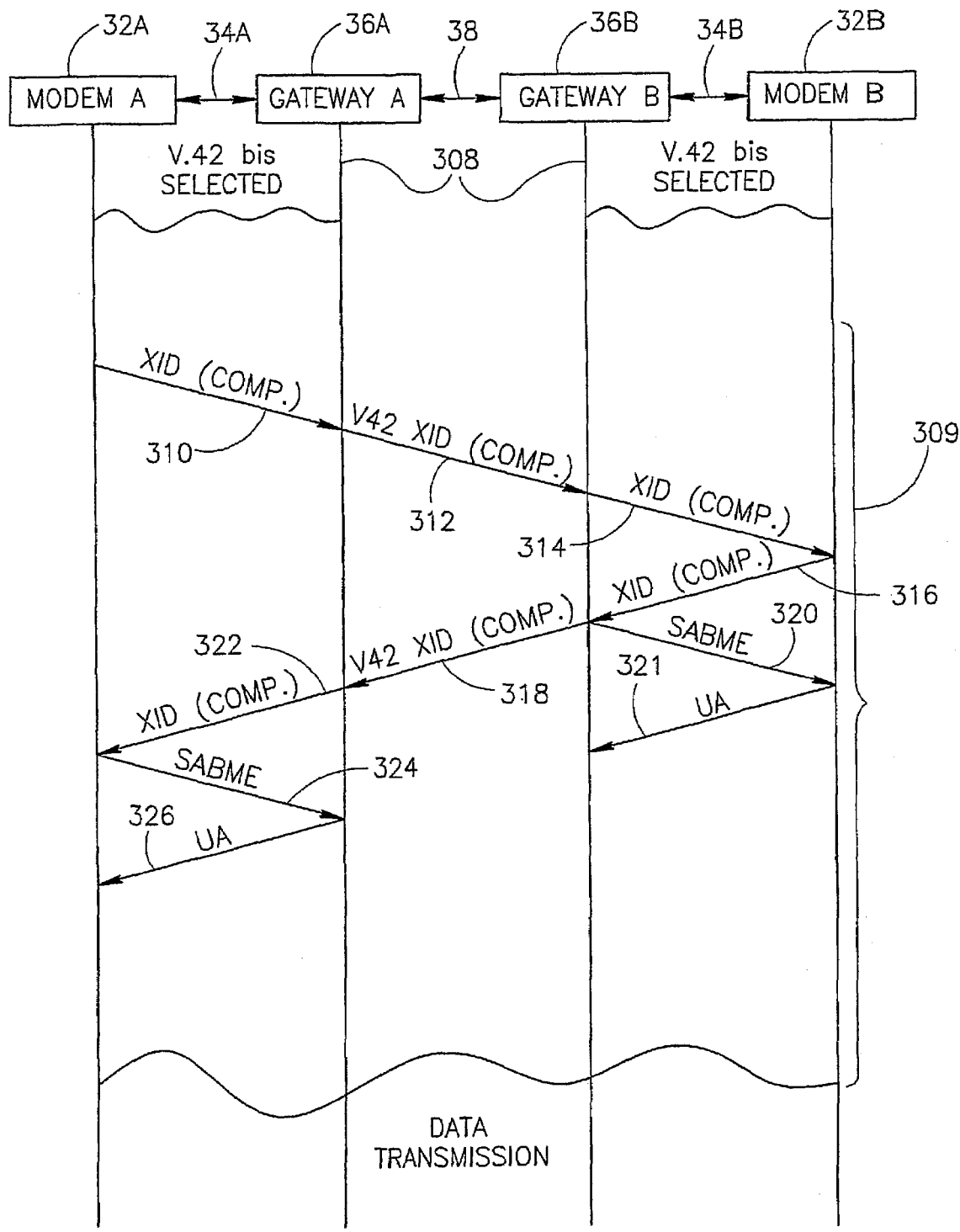
FIGS. 9A, 9B and 9C describe three exemplary scenarios of ECDC parameter negotiation, in accordance with some embodiments of the present invention.
Figure 9B:
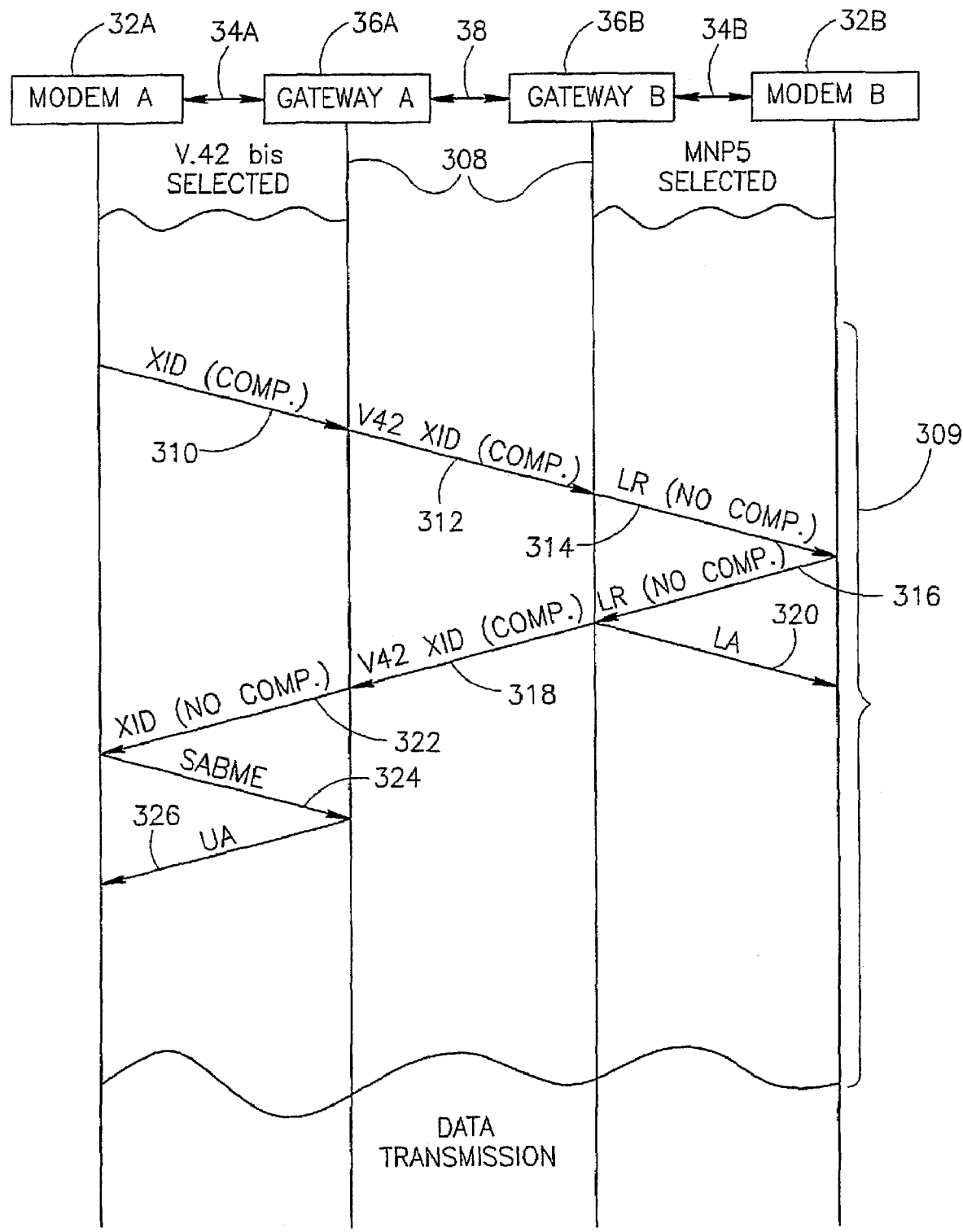
Figure 9C:
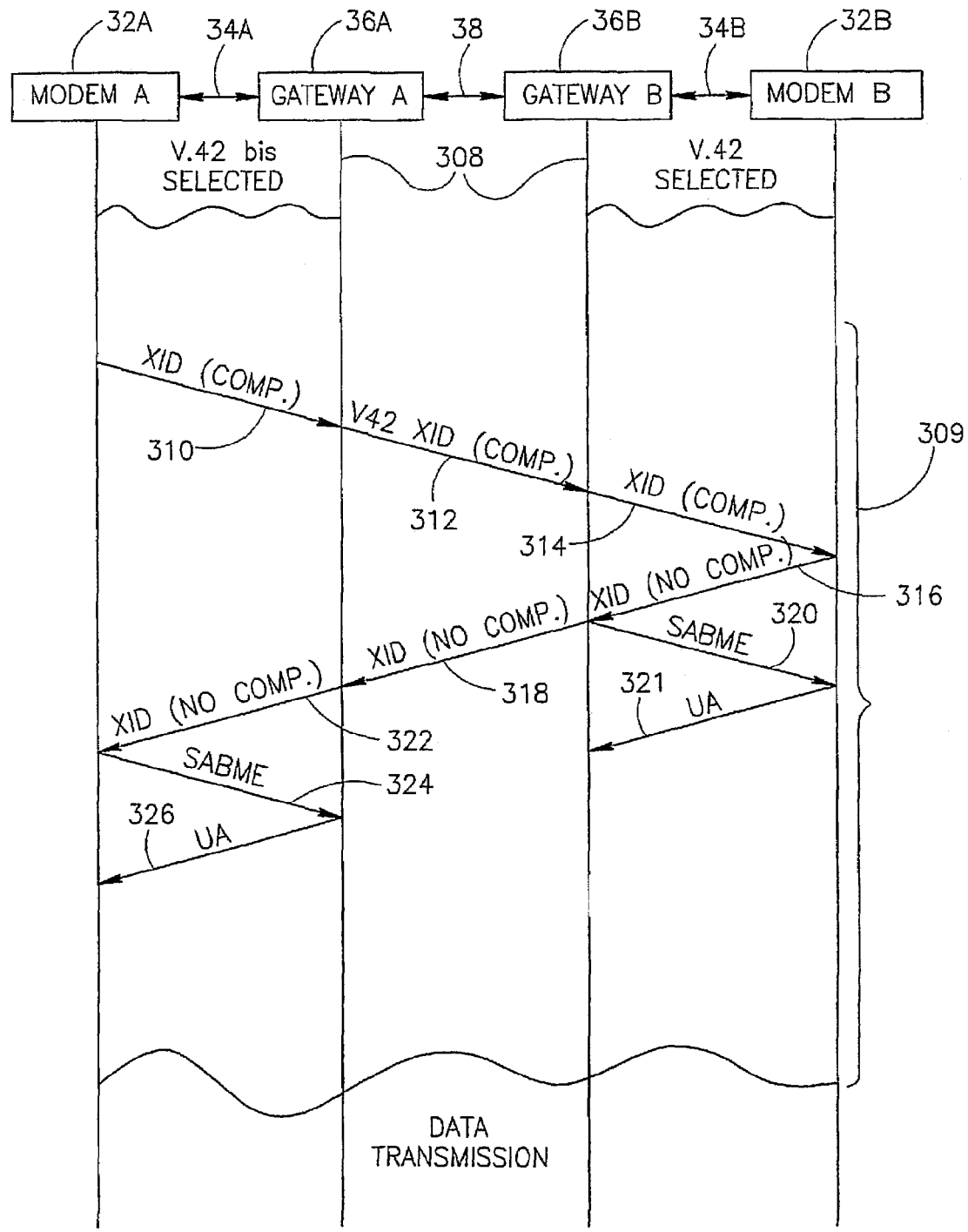

FIGS. 9A, 9B and 9C describe three exemplary scenarios of ECDC parameter negotiation, in accordance with some embodiments of the present invention. In FIG. 9A, both switched network connections select V.42 during ECDC protocol negotiation 308. Frame 310 indicates that modem 32A has V.42 compression capabilities and frame 314 indicates the same. Modem 32B responds with frame 316 which indicates V.42 compression capabilities and therefore the data transmitted between modems 32A and 32B is compressed in accordance with the V.42 protocol.

In FIG. 9B, the connection on switched network 34A selects the V.42 protocol and the connection on switched network 34B selects the MNP protocol during ECDC protocol negotiation 308. In ECDC parameter negotiation 309, modem 32A indicates in frame 310 that it supports compression. However, when gateway 36B receives packet 312 which indicates V.42 compression which is different from the MNP compression used on the connection with modem 32B, it indicates no compression support to answer modem 32B. Therefore, the data transmitted between modems 32A and 32B is not compressed.

In FIG. 9C, both switched network connections select V.42 during ECDC protocol negotiation 308. In ECDC parameter negotiation 309, modem 32A indicates in frame 310 that it supports compression and this information is forwarded to modem 32B in frame 314. Answer modem 32B, however, does not support compression and therefore the data transmitted between modems 32A and 32B is not compressed.

In some embodiments of the invention, when gateway 36B knows that modem 321 does not support compression or does not support the compression methods supported by modem 32A, gateway 36B does not wait for receiving packet 312 in order to transmit frame 314. Instead, gateway 36B transmits frame 314 immediately when it finishes phase 4 of the negotiation stage. Thus, the time required for compression negotiation is reduced.

In some embodiments of the invention, when more than a predetermined time passes between the end of the connection establishment negotiation stage on network 34B and gateway 36B did not yet receive packet 312, gateway 36B repeatedly transmits frame 314 with guess values (or predetermined values) until packet 312 is received, in order to prevent modem 32B from disconnecting the connection due to the long silence interval. As is known in the art, modem 32B will respond with frames 316 to each frame 314 transmitted by gateway 36B. Gateway 36B does not respond to these frames 316 with response frame 320 and does not transmit packets 318 responsive to these frames 316.

In some embodiments of the invention, when gateway 36B finally receives packet 312, it transmits a frame 314 with values taken from packet 312. When gateway 36B receives a frame 316 generated responsive to this frame 314, it transmits packet 318 to gateway 36A and transmits response frame 320 to modem 32B. Optionally, if the values in the received packet 312 are equal to the guess values in repeatedly transmitted frames 314, gateway 36B transmits response frame 320 and packet 318 responsive to receiving packet 312.

When gateway 36B receives packet 312 before the connection establishment negotiation stage on network 34B is completed, gateway 36B optionally waits to the end of the negotiation stage before transmitting frame 314. In some embodiments of the invention, Gateway 36B reports the delay to gateway 36A in a suitable packet, and gateway 36A repeatedly transmits frames 322 with guess values to modem 32A, in order to stall the connection on network 34A. As is known in the art, modem 32A responds to repeatedly transmitted frames 322 with response frames 324. It is noted, however, that since gateway 36A does not confirm the receipt of response frames 324, the connection on network 34A does not proceed.

Optionally, when compression packet 318 is received from gateway 36B, gateway 36A transmits an answer compression capability frame 322 with values taken from the received packet 318. When modem 32A responds with a response frame 324, gateway 32A confirms receipt of the frame 324 by transmitting frame 326 and the connection moves to data transmission. In some embodiments of the invention, if the guess values of repeatedly transmitted frames 322 are equal to the values in packet 318, gateway 36A transmits confirmation frame 326 immediately when packet 318 is received.

Alternatively or additionally to gateway 36B transmitting to gateway 36A a packet which reports the delay due to network 34B being still in the connection establishment negotiation stage, gateway 36A begins transmitting frames 322 with guess values after a predetermined time in which packet 318 was not received.

In some embodiments of the invention, the guess values used in repeatedly transmitted frames 314 and/or 322 are selected randomly and/or are configured at manufacture or installment of gateway 36B and/or 36A. Alternatively or additionally, the guess values used in repeatedly transmitted frames 314 and/or 322 are selected responsive to one or more parameter values exchanged or determined during the negotiation stage of the connection (e.g., the quality of networks 34A and/or 34B) and/or responsive to one or more parameters of the formation of the connection (e.g., the telephone number). Further alternatively or additionally, the guess values used in repeatedly transmitted frames 314 and/or 322 are selected based on actual values received in recently established connection, optionally of previous connections having common characteristics. Further alternatively or additionally, the guess values indicate the maximal possible compression capabilities.

In some embodiments of the invention, packets 312 and 318 have a structure similar to any of the structures described above, and/or similar to that described in the T.38 ITU recommendation. In an exemplary embodiment of the present invention, each packet has a type header which identifies the packet and a content field which carries the remaining portion of the packet. Optionally, the type header identifies whether the packet carries data, a disconnect instruction, and/or a compression capability packet. Possibly, packets which indicate no support of compression have a different type value than packets which indicate support of compression. Optionally the content field has an internal length field which indicates the length of the data. Alternatively or additionally, one or more external headers (e.g., TCP, IP) indicate the length of the data in the content field. Optionally, packets which indicate no support of compression do not contain a content field.

In some embodiments of the invention, gateways 36A and 36B include modems which perform data pump (DP) and the HDLC tasks of the EC tasks and do not perform the DC tasks and the remaining tasks of the EC tasks. Data signals received from modems 32A and 32B by gateways 36A and 36B, respectively, are demodulated by the gateways. Padding flags and the CRC field are removed, by gateways 36A and 36B, from the demodulated data bits, and erroneous frames are discarded. The resulting frames are encapsulated and forwarded to the other gateway (without loss of generality 36B), using any of the encapsulation methods described above. The receiving gateway 36B acknowledges the receipt of the flames (optionally within frames of data signals transmitted to gateway 36A) and exchanges flow control commands (e.g., retransmission requests, buffer full notices) with gateway 36A. Gateway 36B also removes the encapsulation, performs flag padding, adds a CRC, modulates the signals and transmits them to modem 32B.

Gateways 36A and 36B exchange DP control signals with modems 32A and 32B respectively, in accordance with any of the methods described above. Optionally, delay procedures as described above with reference to FIGS. 6A and 6B are used during the stage in which the round trip delay is measured. In addition, HDLC control signals are generated and handled by gateways 36A and 36B locally with their respective modems 32A and 32B. On the other hand, LAPM and DC control signals are forwarded by gateways 36 as data signals, with or without being aware of their being control signals.

It is noted that a single gateway 36 may support a plurality of the different embodiments described above. For example, a gateway may operate without performing error correction (EC) and data compression (DC) for a first group of connections or at a first time (e.g., during work hours), while for other connections or at other times the gateway operates with performing EC and optionally also DC. In some embodiments of the invention, when a connection is established, gateways 36A and 36B negotiate with each other over network 38 the specific embodiment they are to use.

In some embodiments of the invention, gateways 36A and 36B determine whether to act in accordance with one of the MoIP methods described above, and/or according to which of the above MoIP methods to act, responsive to the contents of the signals transmitted at the beginning of the connection.

Figure 10:
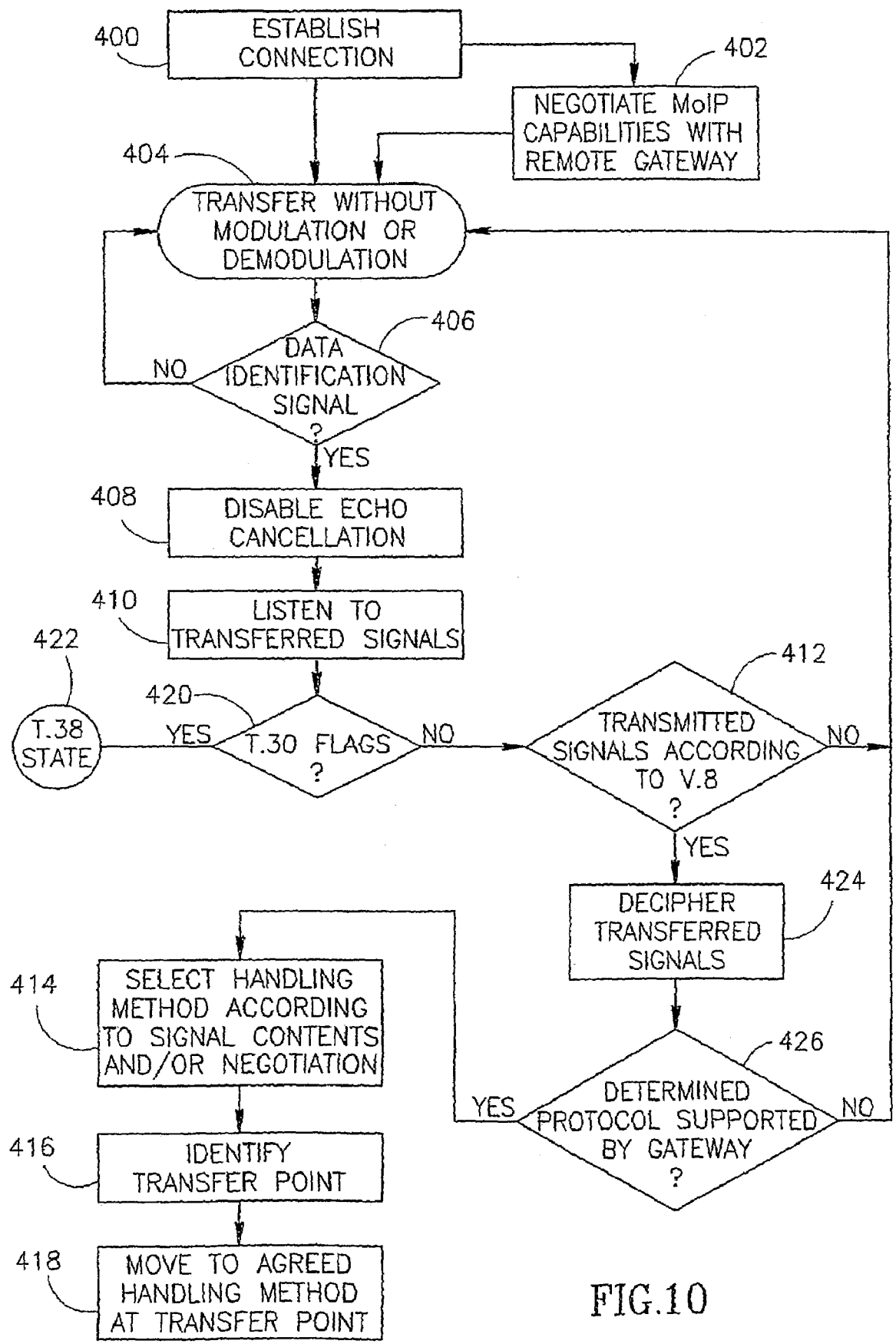
FIG. 10 is a flowchart of the acts performed by a gateway upon establishing a connection, in accordance with an embodiment of the present invention.

FIG. 10 is a flowchart of the acts performed by a gateway 36 upon establishing a connection, in accordance with an embodiment of the present invention. When a new connection is established (400) through gateway 36, the gateway operates in a VoIP state (404), for example as described in the G711 ITU recommendation. In the VoIP state (404) (referred to also as MoIP type 0), signals received from switched networks 34 are converted into packets and are transmitted over packet based network 38 without performing demodulation. In addition, signals received from packet based network 38 are extracted from their packets and are transmitted on switched network 34, without performing modulation of the signals. Optionally, upon establishment of the connection, the gateway transmits negotiation signals over packet based network 38 to the remote gateway 36 which takes part in the established connection. If the remote gateway 36 responds to the negotiation signals, a MoIP negotiation procedure (402) is performed, as described hereinbelow, to determine which MoIP method to use if the connection carries modem signals.

If (406), during transfer of signals, gateway 36 identifies a data identification signal (e.g., a 2100 Hz signal), gateway 36 disables echo cancellation and VAD/CNG (voice activity detection) (408), as is known in the art. In some embodiments of the invention, gateway 36 also begins to listen (410) to the transferred signals in order to determine whether a Fax or modem handling method other than VoIP state (404) is required. If (420) the transferred signals comprise signals of a specific protocol supported by gateway 36, and optionally also by the remote gateway 36, e.g., T.30 flags, gateway 36 moves immediately to a handling state (422) of the specific protocol (e.g., for T.30 flags, as prescribed by the T.38 recommendation). In some embodiments of the invention, if (412) the transferred signals are according to a protocol negotiation procedure (e.g., the V.8 procedure) supported by gateway 36, and optionally also by the remote gateway 36, gateway 36 does not move immediately to a MoIP method as described, for example, with reference to FIG. 4 above. Instead, gateway 36 continues to operate in VoIP state (404), such that the V.8 negotiation is performed between the end modems 32 (FIG. 1), but begins to decipher the transferred signals (424), i.e., determines the bit content of the signals. Gateway 36 optionally deciphers the transmitted signals so as to determine the protocol which will govern the transmission of data signals on the connection.

If (426) the determined protocol for data transmission is supported by gateway 36, and optionally also by the remote gateway 36 (as determined in negotiation 402), gateway 36 selects (414) a handling method (which includes performing modulation and demodulation) to be used for the data transmission protocol. In some embodiments of the invention, the handling method is selected also responsive to other deciphered signals (e.g., the transmission rate of the connection) and/or responsive to results of the previously performed negotiation procedure (402). In an exemplary embodiment of the invention, gateway 36 selects a handling method for the V.34 (full duplex), V.90, V.91 and V.92 protocols from one of the MoIP handling methods described above. Alternatively, the movement to a MoIP state may be performed for other groups of protocols.

If the signals on the connection are not in accordance with a protocol supported by gateway 36 (or optionally the remote gateway 36), or the protocol determined to be used for data transfer is not supported by gateway 36 (or optionally the remote gateway 36), gateway 36 continues to operate in the VoIP state (404). It is noted that if the data signals are transmitted at a very low rate, the signals may pass on the connection at a tolerable quality even though VoIP state 404 is used.

In some embodiments of the invention, selecting (414) the handling method includes selecting a predetermined transfer point in which gateway 36 moves from VoIP state (404) to the selected handling (MOIP) method. In some embodiments of the invention, for the V.34, V.90, V.91 or V.92 protocols, the transfer time is after the end of the V.8 negotiation, i.e., after the CJ signals, in the recess between phase 1 and phase 2 of the protocol negotiation procedure. The end of the V.8 negotiation is optionally used as the transfer point, since there is an interval in which no signals are transmitted on the connection between the end of the V.8 negotiation and the beginning of phase 2 negotiation in accordance with the selected protocol.

Alternatively or additionally, the transfer point is selected as any other sufficiently long recess in which the change of handling will not cause ambiguities on the connection. For example, in some embodiments of the invention, the transfer point is after the second phase of negotiation, such that the symbol rate is determined directly between the end modems 32. Thus, there is no need to perform symbol rate spoofing and/or RTD time correction (as described above with reference to FIGS. 6A and 6B). It is noted, however, that earlier transfer to the selected MoIP method is preferred, as transmission of modem signals in VoIP state (404) may suffer from quality degradation due to packet based network 38.

Gateway 36 optionally continues to decipher the signals passing on the connection until the transfer point is identified (416). Thereafter, gateway 36 begins to operate (418) in accordance with the selected MoIP method, i.e., begins to perform modulation and demodulation on the signals it forwards. In some embodiments of the invention, the movement (418) to the MoIP method is performed without notifying the remote gateway 36 and/or waiting for confirmation from the remote gateway 36. Rather, the transfer is performed based on the previously performed negotiation (402) and/or predetermined rules set before the connection was established. Thus, the mode transfer may be performed fast enough to adhere to the time constraints of the protocol governing the connection. Alternatively, the formation of a control IP connection is used to determine whether the remote gateway 36 supports MoIP. If the remote gateway 36 accepts the establishment of the connection, it supports MoIP, otherwise it is known that the remote gateway 36 does not support MoIP.

Referring in more detail to performing the negotiation (402), gateway 36 optionally transmits to the remote gateway a list of the protocols it supports and the MoIP methods it may use with each protocol. In some embodiments of the invention, gateway 36 receives a similar list from the remote gateway 36. Each of the gateways 36 optionally generates a connection list which includes the common elements of the lists. When the common list includes more than one MoIP method for a protocol, the method to be used is selected according to predetermined rules. For example, the different MoIP methods may be ordered in a preference order, e.g., always prefer MoIP in which gateways 36 perform EC over MoIP in which gateways 36 perform ECDC. The preference order may be general for all protocols or may be different for different protocols. Alternatively or additionally, the predetermined rules for selecting the MoIP method may depend on one or more parameters of the connection, such as the bit rate. For example, for slow bit rates a first MoIP method may be preferred while for fast bit rates a second MoIP method is preferred.

In some embodiments of the invention, the lists transmitted during the negotiation (402) include, for each protocol, one or more suitable transfer points. Optionally, a predetermined rule is used to determine which transfer point to use when there are a plurality of possible transfer points. The rule for determining the transfer point optionally chooses the earliest or latest possible transfer point or sets a preference order.

Alternatively to negotiation (402) including transmission of a list, negotiation (402) includes transmission, by each of gateways 36 to the other gateway 36, of a gateway type message. Optionally, each gateway 36 includes a list of the capabilities of each type of gateway, such that according to the gateway type message the types of protocols supported by the remote gateway 36 are known. The type message may include a model type, a model date which indicates operation with all model types from before the date and/or a simple message of MoIP support.

In some embodiments of the invention, the negotiation (402) includes a handshake procedure, optionally a double handshake procedure, which ensures that both gateways 36 receive the list from the other gateway 36. In some embodiments of the invention, if the handshake is not completed within a predetermined amount of time from the beginning of the connection or until a predetermined decision point which depends on the signals passing on the connection, VoIP state (404) is used. Optionally, the predetermined amount of time or the predetermined decision point are selected such that the decision as to whether the handshake was successful occurs before the first possible transfer point. Alternatively, the predetermined amount of time or the predetermined decision point are selected such that the decision of whether the handshake was successful occurs before the last possible transfer point. In some embodiments of the invention, the selection of the transfer point depends on the time at which the handshake was completed.

In some embodiments of the invention, as shown in FIG. 10, negotiation (402) is performed before gateway 36 knows whether the connection is a data connection. Alternatively, negotiation (402) begins only after the data identification signal is identified. Further alternatively, the negotiation (402) begins only after the specific protocol passing over the connection is identified. In some embodiments of the invention, if the negotiation (402) does not end successfully on time, gateway 36 uses spoofing methods in order to stall the connection until the negotiation is completed.

In some embodiments of the invention, negotiation (402) is not performed, for example when it is clear that the remote gateway 36 has substantially the same capabilities as the determining gateway 36 or when there is substantially no chance of successful transmission if the remote gateway 36 does not support MoIP.

Alternatively or additionally to using the method of FIG. 10, different data identification signals are used by end users for different types of data connections. For example, slow Fax data connections, and other data connections which do not require MoIP handling, may use a first identification signal and additional unique signals are used by other protocols according to the type of MoIP they are to use. Responsive to the data identification signal transmitted on the connection, gateway 36 optionally selects the MoIP method to be used (if at all). Thus, gateway 36 may operate for a plurality of different types of connections and still begin its MoIP handling before V.8 negotiation, for example, begins.

Further alternatively or additionally, other identification methods may be used, such as separate telephone numbers for different types of connections and/or any of the methods described in PCT application PCT/IL00/00288 titled "Back to Back Modem Repeater", the disclosure of which is incorporated herein by reference.

Further alternatively or additionally, when gateway 36 identifies the beginning of a V.8 procedure, i.e., an ANSam signal, gateway 36 moves to a MoIP method, as described above with reference to FIG. 4. If during the MoIP handling of the V.8 procedure it is determined that the data protocol is not supported by gateway 36 or by remote gateway 36, gateway 36 moves back to VoIP state 404 at the end of the V.8 procedure. In some embodiments of the invention, provisions are taken as described above, to ensure that both of the connections on switched links 34 move back to VoIP state 404 at substantially the same time.

In some embodiments of the invention, the MoIP connections described above are implemented by a telephone service provider with or without the knowledge of the users. It is noted that the total delay of MoIP connections is accordance with the present invention are between about 100-300 msec, and therefore the delay is not generally identified by users of modems. In some embodiments of the invention, gateways 36A and 36B are included in central offices (COs), digital loop carriers (DLC) and/or any other elements of a telephone network. Optionally, gateways 36A and 36B are in the COs which generally service the telephone lines to which the modems 32A and 32B are connected. Alternatively or additionally, gateways 36 are included in remote access servers (RASs) and/or Remote access communicators (RACs) of an Internet service provider.

In some embodiments of the invention, the MoIP connections described above are managed by a packet based network maintainer in order to provide alternative communication services. For example, instead of calling a target modem in an expensive long distance call, a client may call a local gateway, which forms a packet base connection with a remote gateway in the vicinity of the target modem and a modem connection from the remote gateway to the target modem. In some embodiments of the invention, Internet service providers (ISPs) may provide in addition to standard Internet access, modem access services, which allow secure transmission of signals to a remote modem.

Although in the above description gateways 36A and 36B are connected through a packet based connection, the present invention is not limited to transmission of VBM signals over packet based networks. Rather, the methods described above may be employed when gateways 36A and 36B are connected through other types of network paths, including analog lines, digital paths (e.g., digital circuit multiplication equipment (DCME), SONET) and combinations thereof. It is noted, however, that such other types of network paths may have shorter round trip delays and shorter or no jitter and therefore may not require some of the above described methods in order to allow transmission of modem signals on the network paths between gateways 36A and 36B.

In some embodiments of the invention, the network path between gateways 36A and 36B is part of a multi-point network which connects a plurality of gateways and/or other communication units. Optionally, the network to which the path between gateways 36A and 36B belongs is an addressable network (i.e., a non-dedicated network) in which signals may be sent from a source to one or more of a plurality of destinations. Alternatively, the network path between gateways 36A and 36B is a dedicated link. Optionally, when a dedicated link is used, addressing headers are not required and/or some or all of the negotiation procedures are not required as the parties to the connection are predetermined.

In some embodiments of the invention, gateways 36A and 36B or variants thereof are used for other purposes than the formation of a MoIP connection. For example, as is now described with reference to FIGS. 11-13, a pair of interconnected modems are used, in some embodiments of the invention, as a repeater which allows use of high-speed modem connections over a pair-gain system. In other embodiments of the invention, as described for example with reference to FIGS. 14-16 below and/or in Israel patent application 141,753 filed Mar. 1, 2001, the disclosure of which is incorporated herein by reference, a distributed remote access (RAS) comprises two or more parts, optionally in different locations, one of which parts is similar to gateway 36.

Figure 11:
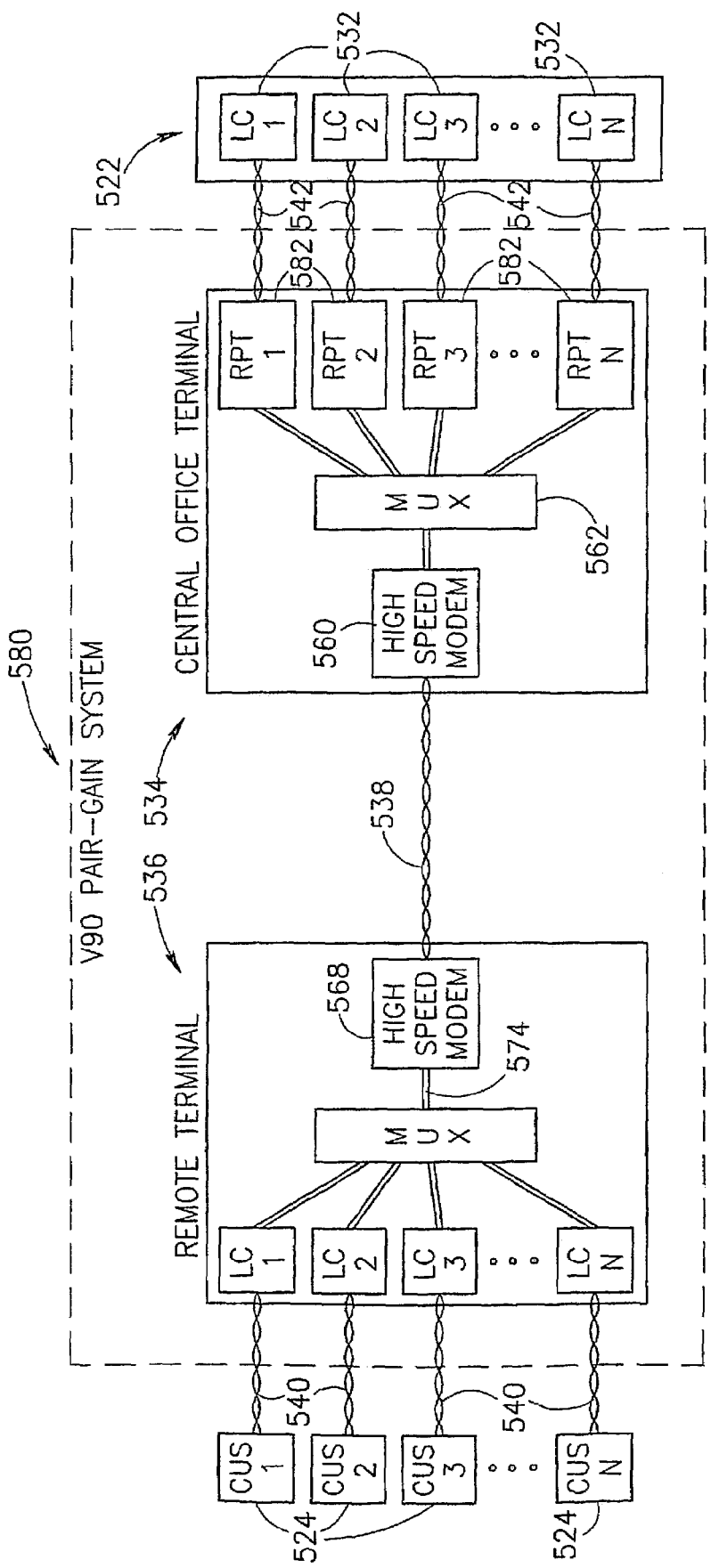
FIG. 11 is a block diagram of a pair-gain system, in accordance with an embodiment of the present invention.

FIG. 11 schematically shows a pair-gain system 580 that can support fast modem transmissions (e.g., according to V.90, V.91, V.92), in accordance with an embodiment of the present invention. Pair gain system 580 comprises a central office terminal 534 which connects to a central office (CO) 522 over a plurality of twisted pairs 542, and a remote terminal 536 which connects to a plurality of customers (e.g., hand-sets, modems) 524 over twisted pairs 540. Central office terminal 534 and remote terminal 536 are connected through a twisted pair 538 on which high speed modems 560 and 568 of terminals 534 and 536, respectively, transmit to each other signals they receive on their twisted pairs 540 and 542. Thus, a single twisted pair 538 is used instead of a plurality of twisted pairs, due to the high transmission speeds of modems 560 and 568.

In some embodiments of the invention, in order to prevent quality degradation of signals transmitted from CO 522 to customers 524 repeaters 582, as described hereinbelow, are included in pair-gain system 580. It is noted that substantially all the other elements of pair gain system 580 are as is known in the art, such that, in some embodiments of the invention, upgrading a pair gain system to support fast modem transmissions (e.g., above 33,600 bps), requires only the addition of repeaters 582. Optionally, repeaters 582 connect to high speed modem 560 through a multiplexer 562.

Figure 12:
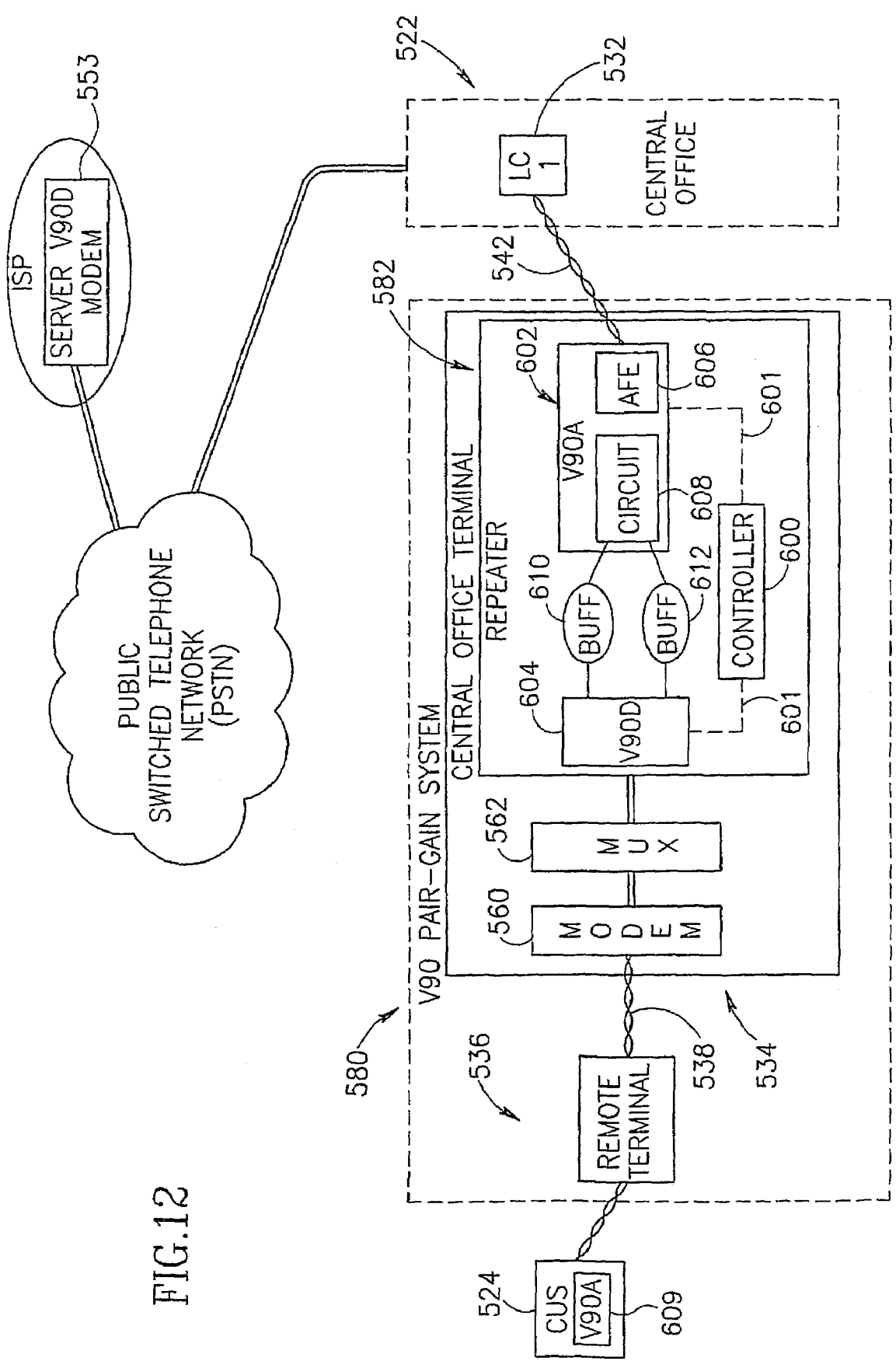
FIG. 12 is a block diagram of the pair-gain system of FIG. 11 including details of a repeater thereof, in accordance with an embodiment of the present invention.

FIG. 12 schematically shows pair-gain system 580 and details of one repeater 582, for servicing V.90 fast modem calls, comprised in its central office terminal 534, in accordance with an embodiment of the present invention. Features not germane to the discussion of the repeater 582 and its operation are not shown in FIG. 12. Repeater 582 receives analogue signals from a line card 532 that services a customer 524 via the line card's twisted pair 542.

In some embodiments of the present invention repeater 582 comprises a controller 600, a V.90A modem 602 and a V.90D modem 604. Functions performed by controller 600 may be executed by hardware or software or a combination of hardware and software comprised in the controller or accessed by the controller. Controller 600 is connected via control and data lines 601 to V.90A modem 602 and V.90D modem 604. V.90A modem 602 comprises an analogue front end (AFE) 606 and modem processing circuitry 608. AFE 606 is connected to twisted pair 542. V.90D modem 604 is connected to multiplexer 562 and therethrough via high-speed modem 560 and twisted pair 538 to remote terminal 536 and to customer 524. It is assumed that customer 524 is connected to V.90 pair-gain system 580 by a V.90A modem 609.

In some embodiments of the present invention, controller 600 of repeater 582 is designed to determine whether a call routed to or from a customer 524 by central office 522 is a voice call (including herein any fax or non-high speed modem call), or a fast modem call.

If a repeater 582 determines that a call between central office 522 and a customer 524 serviced by the repeater is a voice call, the repeater performs similarly to a conventional analog front end (AFE) of pair-gain systems known in the art. Optionally, the signals passing from line card 532 through repeater 582 are passed only through AFE 606 directly to multiplexer 562. In some embodiments of the invention, in instances for which the call is a voice call, repeater 584 codes and decodes signals using a compounding algorithm, 8 bit resolution and a sampling rate of 8000 samples per second.

Alternatively, repeater 582 is placed in parallel to a conventional AFE. In cases for which controller 600 determines that a voice call is being established with customer 524, the controller "disengages" repeater 582 and routes signals from and to the customer's line card 532 via the conventional AFE.

If, however, repeater 582 determines that the call is a fast modem call, repeater 582 digitizes downstream signals from central office 522 to generate a DS0 data stream of PCM octets, which are not degraded by the pair gain system.

When repeater 582 is operating in V.90 call mode, analog data signals received by V.90A modem 602 for customer 524 from central office 522 are digitized by AFE 606 and demodulated into a bit stream by modem circuitry 608 which is transmitted to V.90D modem 604. V.90D modem 604 processes the bits it receives and converts them into PCM octets according to the V.90 protocol and transmits the octets in a DS0 data stream to multiplexer 562. Multiplexer 562 multiplexes the DS0 stream with DS0 data streams from other repeaters and/or conventional analogue front ends and transmits the multiplexed data streams to remote terminal 536.

In some embodiments of the present invention, data bits transmitted downstream to V.90D modem 604 are buffered by a "downstream" buffer 610. V.90A modem 602 "writes" data bits that it generates on downstream cyclic buffer 610 and V.90D modem 604 "reads" the bits from the buffer. Buffer 610 cushions temporary differences between a rate at which V.90A modem 602 transmits data bits to modem V.90D and a rate at which V.90D modem is able to receive the data bits. Optionally buffer 610 is a cyclic buffer.

PCM upstream data from V.90A modem 609 of customer 524 to central office 522, which V.90D modem 604 receives via multiplexer 562, is processed into a bit stream by V.90D modem 604 and transmitted to V.90A modem 602. V.90A modem 602 parses the bits that it receives into PCM octets according to the V.90 protocol and transmits the octets as a V.90 PCM data stream to line card 532. In some embodiments of the present invention, data bits transmitted upstream by V.90D modem 604 to V.90A modem 602 are buffered by an "upstream" buffer 612. Optionally, buffer 612 comprises a cyclic buffer.

In some embodiments of the present invention, AFE 606 has a resolution greater than or equal to 15 bits and converts analogue signals that it receives from line card 532 to digital signals at a sampling rate equal to or greater than 8,000 samples per second. In some embodiments of the present invention, the sampling rate is greater than or equal to 9,600 samples per second. In some embodiments of the present invention, the sampling rate is greater than or equal to 16,000 samples per second. In embodiments of the present invention for which AFE 606 operates at a sampling rate of 8000 samples per second, in order for AFE 606 to generate an accurate digital data stream from analog input signals, sampling times at which signals from line card 532 are sampled are synchronized, using methods known in the art, with times at which the signals are transmitted.

As a result of the enhanced resolution and sampling quantization error of the digital output signals from AFE 606 is substantially smaller than the quantization error in output signals of conventional analogue front ends. Therefore, when central office 522 receives V.90 data addressed to customer 524 a DS0 data stream generated by V.90D modem 604 responsive thereto reproduces the V.90 data accurately and the data can be transmitted to V.90A modem 609 of customer 524 at transmission rates up to 56 Kbps. As a result of the operation of repeater 582 in V.90 call mode, in accordance with an embodiment of the present invention, pair-gain system 580 supports transmission of V.90 data to customer 524 at transmission rates up to 56 Kbps.

In some embodiments of the invention, modems 604 and 602 are connected, respectively, to a customer modem 609 and a server modem 553 forming a composite modem connection. The composite connection includes a customer loop between customer modem 609 and modem 604 and a server loop between server modem 553 and modem 602. In some embodiments of the invention, modems 602 and 604 perform similarly to gateways 36A and 36B according to any of the above described embodiments. For example, modems 602 and 604 may perform only data pump (DP) tasks, DP tasks and some or all of the EC tasks or DP tasks and ECDC tasks. The establishment of the connection, between modems 602 and modem 553 and between modems 604 and 609 may be performed independent of each other or may be correlated using any of the methods described above for gateways 36A and 36B. It is noted, however, that the time required to pass information between modems 602 and 604 is generally much shorter than required to communicate between gateways 36A and 36B. Thus, for example, controller 600 may more readily provide for concurrent entrance to a data transmission stage on the connections between modems 604 and 609 and between modems 553 and 602.

In some embodiments of the invention, controller 600 determines whether a current call is a voice call or a fast modem call using any of the methods described above, such as the method described with reference to FIG. 10.

Figure 13A:
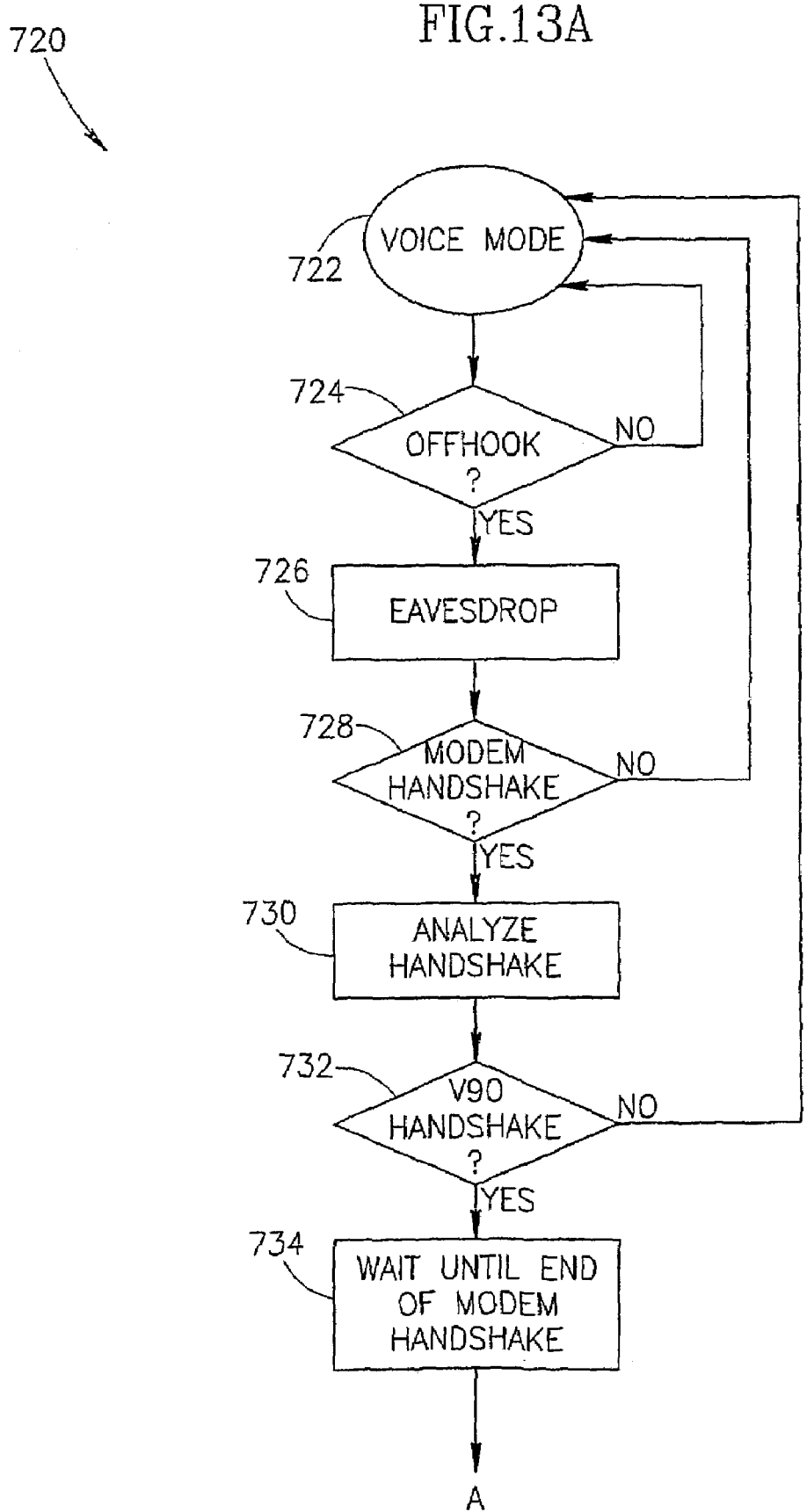
FIGS. 13A-13C are a flowchart of the acts performed by a repeater in a pair-gain system, in accordance with an embodiment of the present invention.
Figure 13B:
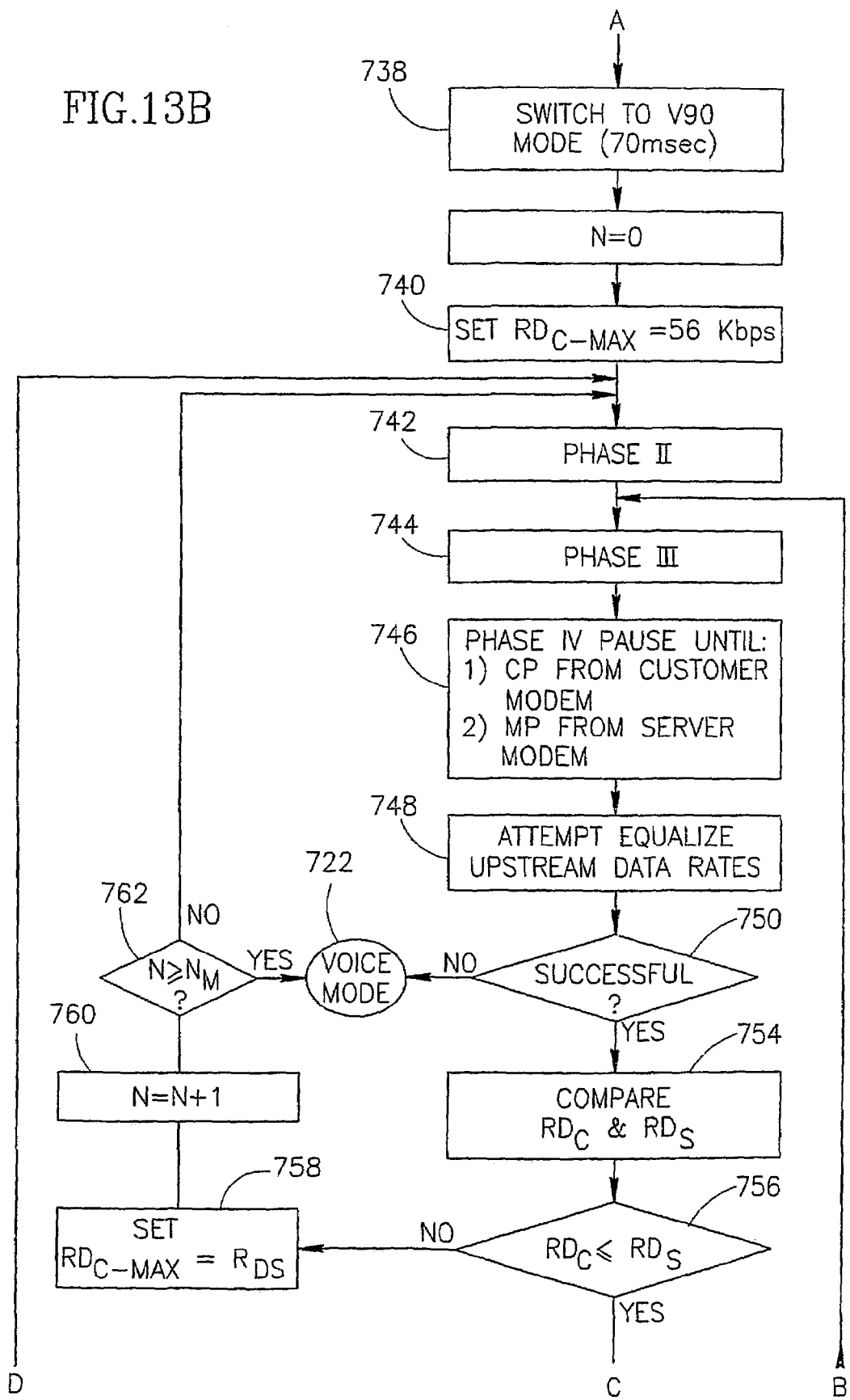
Figure 13C:
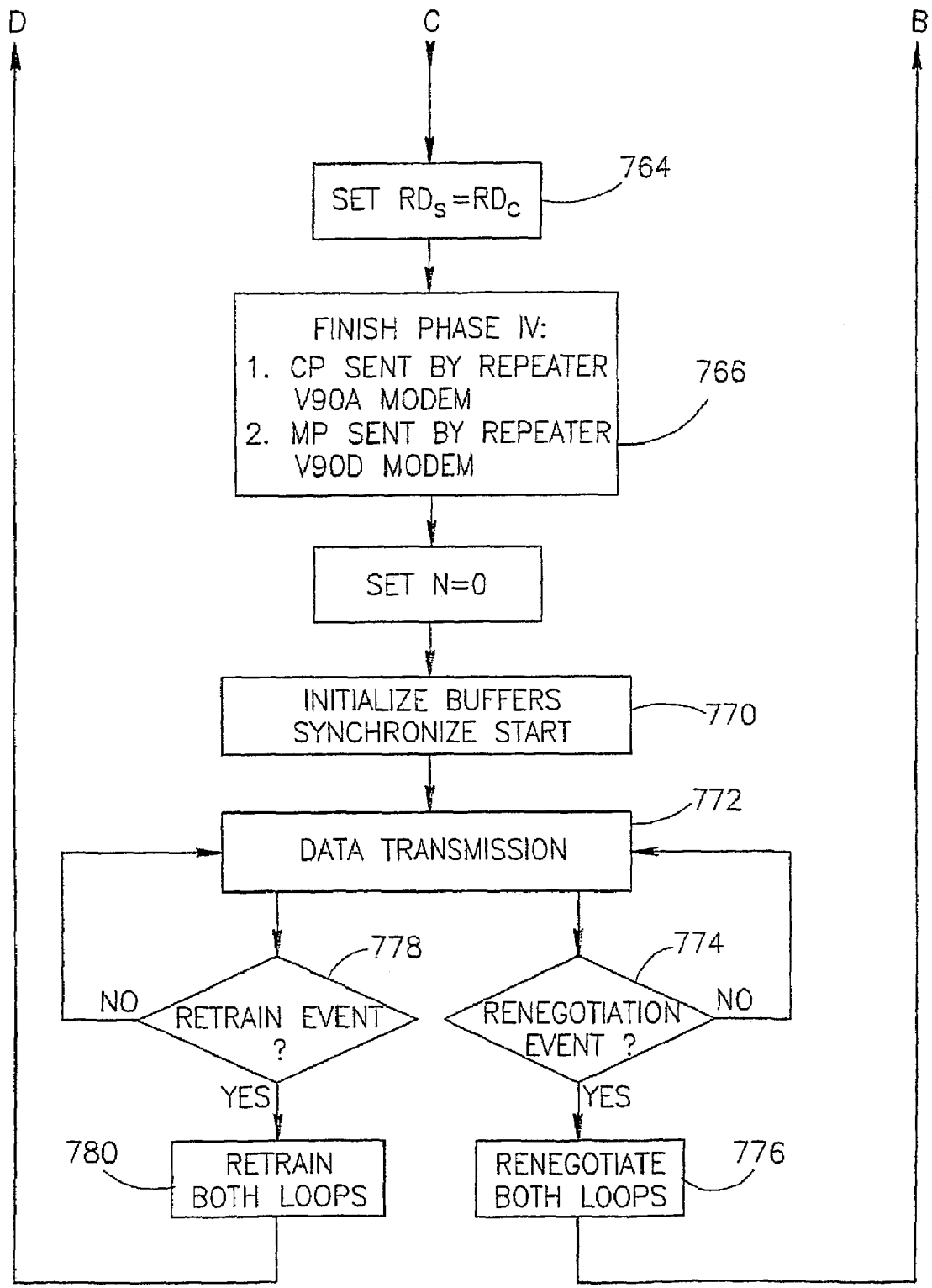

FIGS. 13A-C are a flowchart of the acts performed by controller 600 in establishing a connection, in accordance with an embodiment of the present invention. FIGS. 13A-C shows only acts required to understand the operation of repeater 582. Acts that relate to determining upstream transmission rates, which are shown occurring before determination of downstream rates are, in practice, generally temporally interleaved with acts executed in determining downstream data transmission rates. The acts are shown sequentially for convenience of presentation.

At the establishment of a connection, repeater 582 operates in a voice call mode (722). Upon detection of an off-hook state (724), repeater 582 eavesdrops (726) on communication between central office 522 and customer 524. If (728) signals of a modem protocol handshake (e.g., the V.8 protocol) are determined, the handshake signals are analyzed (730), otherwise repeater 582 remains in voice mode (722). If (732) the handshake signals represent agreement on a V.90 protocol, repeater 582 waits (734) until the end of the modem protocol handshake is reached and switches to a V.90 state, optionally within the 70 msec period between phase 1 and phase 2 of modem data pump negotiations (handshake).

Controller 600 controls (740) repeater V.90D modem 604 to set a maximum supported downstream transmission rate, "$RD_{C\text{-}MAX}$" on the customer loop equal to 56 Kbps, which is the maximum rate of the V.90 protocol. At 742, modems on both communication loops then start Phase II of the V.90 handshake.

At 744, the modems of both of the loops perform Phase III of the V.90 handshake in which the digital modems announce transmission rates that they can support. At 746 modems in both loops enter Phase IV of the handshake. In Phase IV controller 600 pauses the handshake procedure, using for example any of the stalling and/or spoofing methods described above, until a "CP" sequence (defined in ITU-T V.90 9/98) is received from customer V.90A modem 609 and an "MP" sequence (ITU-T V.90 9/98) is received from server V.90D modem 553). The CP sequence defines a downstream data rate "$RD_C$" for the customer loop and comprises a transmit data signaling rate capability mask for the customer V.90A modem 609. The MP sequence defines a maximum data receive rate for server V.90D modem 553 and comprises a receive data signaling rate capability mask for server V90.D modem 553.

At 748, controller 600 attempts to equalize the upstream rates on both communication loops. To accomplish this, in some embodiments of the present invention, controller 600 determines a possible maximum upstream rate for the customer loop from the transmission mask received in the CP sequence from customer V.90A modem 609 and receive rates supported by repeater V.90D modem 604. Controller 600 compares the possible maximum customer loop upstream rate to the maximum server upstream rate received in the MP sequence from server V.90D modem 553. Controller 600 then controls repeater V.90D modem to set a maximum upstream rate for the customer loop equal to the minimum of the compared upstream rates.

Following setting of the maximum upstream rate on the customer loop, controller 600 sets the receive mask of repeater V.90D modem 604 equal to the receive mask of server V.90D modem 553. Repeater 600 also sets the transmission mask of repeater V.90A modem 602 equal to the transmission mask of customer V.90A modem 609. However, if the transmission mask supports upstream rates greater than the maximum customer loop upstream rate, the controller adjusts the transmission mask of repeater V.90A modem 602 so that the maximum upstream rate of the transmission mask is equal to the maximum upstream rate of the customer loop.

It is to be noted that controller 600 will, in general, be able to control the rate negotiations by controlling repeater modems 602 and 604 so that the upstream rates on the customer and server loops are the same. Equalization of the upstream rates is only impossible if a bit rate on one of the loops is equal or less than 2,600 bps and a symbol rate on the other loop is greater than or equal to 2,743 symbols per second.

In a decision 750, if controller 600 determines it cannot establish a same upstream data transmission rate for both loops, repeater 582 abandons attempts to set up a V.90 call between customer 524 and modem 553 and controller 600 terminates the V.90 handshake and switches repeater 582 to voice mode (722). If on the other hand controller 600 is successful in establishing equal upstream rates for both loops, controller 600 compares (754) downstream rate $RD_C$ negotiated on the customer loop by V.90A customer modem 609 and V.90D repeater modem 604 to a downstream rate $RD_S$ on the server loop negotiated by repeater V90A modem 602 and server V90D modem 553. If (756) $RD_C > RD_S$, controller 600 controls (758) repeater modem V.90D to set $RD_{C-MAX} = RD_S$. Thereafter, a cycle counter "N" is incremented (760) by 1 and if (762) $N \geq N_M$, repeater 582 reverts to voice mode (722). If, on the other hand, $N < N_M$, controller 600 attempts another attempt to achieve equal rates on both loops by returning to Phase II (742) with a newly determined $RD_{C-MAX}$.

If (756) $RD_C \leq RD_S$, $RD_S$ is set (764) equal to $RD_C$ and repeater modem 602 chooses a "downstream" constellation that supports the downstream rate $RD_C$. At 766, both communication loops complete Phase IV of the handshake, i.e., modem 602 transmits a CP sequence to server modem 553 and repeater modem 604 transmits an MP sequence to customer modem 609.

At 770, controller 600 initializes upstream and downstream buffers 610 and 612 and synchronizes repeater modems 602 and 604 so that they initiate data transmission at a substantially same time. Data transmission between customer V.90A modem 609 and server modem 553 takes place thereafter in accordance with the V.90 protocol in a step 772.

In some embodiments of the invention, initializing cyclic buffers 610 and 612 comprises writing a block of binary ones in each buffer so as to separate the read pointer from the write pointer. The block of binary ones will not generate transmission errors at onset of data transmission since binary ones at the beginning of data transmission is considered part of training by the V.90 protocol. Thereafter, inequalities in transmission rates between the customer loop and the server loop may be generated that cause the read pointer to reach the write pointer, or the write pointer to reach the read pointer from behind on a buffer 610 or 612. When this occurs on a buffer, controller 600 writes a block of binary ones to the buffer. The block of ones generates a transmission error that causes the ECDC protocol deployed by modems 609 and 553 to initiate retransmission of data in the buffer. Optionally, the buffer size is such that it can contain more than one modem frame of data and less than two modem frames of data. As a result, a temporary mismatch in transmission rates that results in a block of ones being written to a buffer during data transmission will cause retransmission of at most two data frames.

If (774) during data transmission an event occurs that triggers rate renegotiation on one of the loops, controller 600 controls (776) repeater modems 602 and 604 so that rate renegotiation begins on both loops and the controller returns to step 744. Similarly, if (778) during data transmission an event occurs that triggers retraining on one of the loops, controller 600 controls (780) the repeater modems so that retraining begins on both loops and the controller returns to step 742.

It should be noted that whereas repeater 582 has been described for adapting a communication channel for data transmission according to the V.90 protocol, repeaters similar in construction and concept can be constructed to adapt communication channels for transmission of data according to other fast modem protocols.

Furthermore, pairs of modems, similar to modems 602 and 604 may be used to prevent signal degradation on communication channels other than pair-gain channels in which a plurality of digital to analog conversions are performed.

It is noted that although the above description relates to connections which include two modem connection segments and a packet based segment, some embodiments of the invention pertain to connections which have more or fewer modem connection segments. For example, a connection may be formed of three modem connection segments connected through two packet-based segments. Such a connection may be formed, for example, when a call passes between a plurality of telephone and/or IP suppliers.

Figure 14:
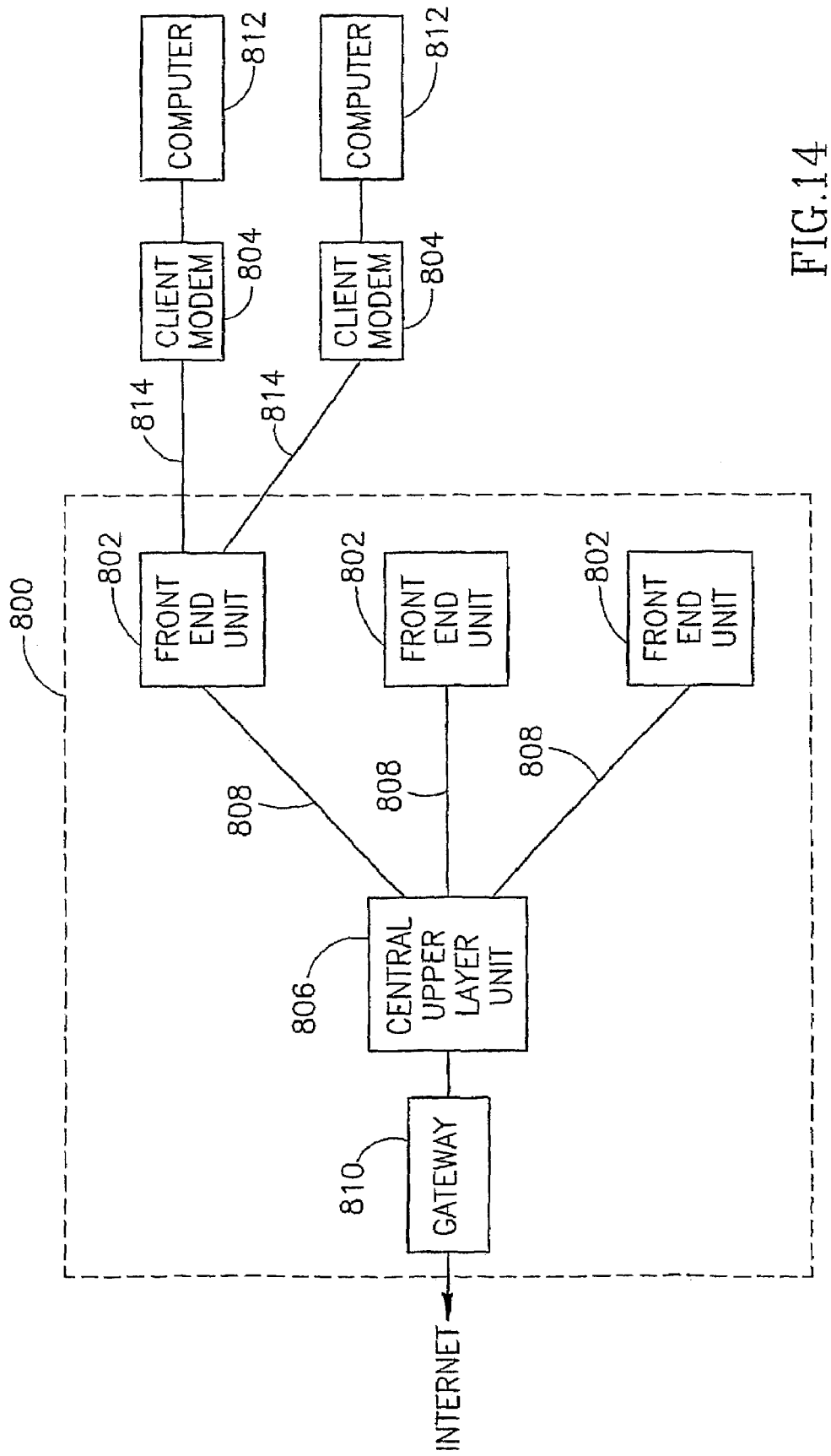
FIG. 14 is a schematic illustration of a distributed remote access server (RAS) system, in accordance with an embodiment of the present invention.

FIG. 14 is a schematic illustration of a distributed remote access server (RAS) system 800, in accordance with an embodiment of the present invention. System 800 comprises a plurality of front end units 802 located close to client modems 804, e.g., within the distance of a local area telephone call. Client modems 804 service, for example, computers 812 and/or other processors which connect through client modems 804 to a gateway 810 of RAS system 800. The connections between client modems 804 and front end units 802 generally pass over analog and/or digital telephone switched lines 814. A central upper layer unit 806 is connected to front end units 802 over communication links 808. Upper layer unit 806 is connected to gateway 810 which optionally leads to a public packet based network, e.g., the Internet.

Optionally, communication links 808 comprise packet based networks, e.g., IP, frame relay or ATM networks. Alternatively or additionally, one or more of communication links 808 comprises any other type of link, which is not a VBM link, for example a high bandwidth synchronous link. Communication links 808 may optionally be over physical wires, wireless links or a combination thereof. In some embodiments of the invention, one or more of communication links 808 comprises a multi-point network which connects a plurality of different units and/or an addressable network in which signals may be transmitted from a source to a plurality of destinations. Alternatively or additionally, one or more of communication links 808 comprises a dedicated link for connecting between front end unit 802 and upper layer unit 806. Communication links 808 may be of substantially any length including long lengths of tens, hundreds thousands or tens of thousands of kilometers.

In some embodiments of the invention, client modem 804 comprises a standard modem which is not altered in order to perform the present invention. Furthermore, in some embodiments, client modem 804 does not know whether it is connected to a distributed RAS or to a regular, prior art, RAS.

As is known in the art, the signals transmitted between client modems 804 and front end units 802 may represent data bits to, or from, computer 812, or may comprise control signals of one of the layers of the VBM connection, i.e., data pump (DP), error correction (EC) or data compression (DC).

In some embodiments of the invention, front end unit 802 performs data pump (DP) tasks and upper layer unit 806 performs error correction (EC) and data compression (DC) tasks. Signals transmitted from client modem 804 which represent data bits are demodulated by front end unit 802 into data bits. The demodulated data bits are optionally encapsulated into packets and/or into any other format required by the communication link 808 connecting the front end unit 802 to upper layer unit 806. The encapsulated packets are optionally transmitted on a packet connection (e.g., UDP or TCP) on communication link 808 to upper layer unit 806. Upper layer unit 806 removes the encapsulation from the packets it receives and performs EC and DC tasks on the bits extracted from the packets.

Data bits transmitted to computer 812 are received by upper layer unit 806 through gateway 810. The received data bits are compressed by upper layer unit 806 in accordance with the DC layer tasks and error correction (EC) bits are annexed to the bits in accordance with the EC layer tasks. The compressed bits, along with the annexed EC bits, are then encapsulated into packets and transmitted over communication link 808 to front end unit 802. Front end unit 802 removes the encapsulation, modulates the bits and transmits the modulated data signals to client modem 804.

In some embodiments of the invention, front end unit 802 examines the contents of the signals passed to upper layer unit 806 to determine whether the signals include information. Alternatively or additionally, upper layer unit 806 examines the contents of the signals passed to front end unit 802. Signals which do not include information, i.e., signals which include padding sequences defined by modem recommendations, such as long sequences of '1' bits or idle ECDC 7E signals, are optionally discarded. Optionally, all padding flags are discarded. Alternatively, only padding sequences beyond a predetermined length, are discarded.

In some embodiments of the invention, the discarded padding flags are replaced by control packets, transmitted, for example, on a separate connection, which state the number and/or nature of the discarded bits so that the discarded signals are easily filled in by the receiving unit. Alternatively, control signals are not transmitted instead of the discarded signals and the missing signals are filled in based on the transmission rate on the VBM connection. By discarding signals which do not carry information, the load on link 808 is reduced allowing higher utilization rates of the link.

Front end unit 802 and client modem 804 exchange DP control signals as required by the standard governing the VBM connection. DP control signals transmitted to client modem 804 are generated by front end unit 802 and DP control signals from client modem 804 are handled by front end unit 802. In some embodiments of the invention, the DP control signals are generated by front end unit 802, independently, without receiving instructions and/or information from upper layer unit 806. Alternatively, upper layer unit 806 instructs front end unit 802 on the DP control signals it should transmit and/or provides front end unit 802 with information used in generating the DP signals.

In an exemplary embodiment of the invention, during a stage used to determine the round trip delay of the connection, e.g., the second stage of the V.34 negotiation, front end unit 802 does not respond at the prescribed time (e.g., after the prescribed 40 msec) to the signals it receives. Instead, front end unit 802 waits an additional time which represents the round trip delay period of signals on link 808 between front end unit 802 and upper layer unit 806 which calculates timeouts. Optionally, the additional wait time is a predetermined estimate of the delay of link 808. Alternatively, front end unit transmits a time measuring signal to upper layer unit 806 and the time between the transmission and receiving the response is used as the additional wait time. The time measuring signal may be transmitted before or after the signal to which front end unit 802 must respond, is received. Alternatively or additionally, the changes during the stage of determining the round trip delay are performed as described in Israel patent application 140,952, filed Jan. 17, 2001, the disclosure of which is incorporated herein by reference.

Optionally, EC and DC control signals are forwarded by front end unit 802 as if they are data bits, without front end unit 802 differentiating between data bits and the bits of EC and DC control signals. Alternatively, front end unit 802 recognizes EC and DC control signals received from client modem 804 and transmits their bits to upper layer unit 806 separately from the data bits, on the same connection used for data bits or on a different connection. Similarly, front end unit 802 optionally receives EC and DC control signals from upper layer unit 806 (for transmission to client modem 804), separately from data bits.

In some embodiments of the invention, the packet connections on link 808 are in accordance with a delivery confirming protocol (e.g., TCP or a proprietary protocol above UDP), so that signals are generally not lost on their way between front end unit 802 and upper layer unit 806. Alternatively, the packet connections on link 808 are in accordance with a non-confining protocol (e.g., UDP) which generally incurs less delay on the transmitted signals. Generally, mistakes which occur in the transmission will be corrected by the EC tasks performed by upper layer unit 806 and client modem 804. Further alternatively or additionally, a redundancy method, for example double transmission, is used for the exchange of data bits on link 808. Optionally, different redundancy methods are used for data bits and for control bits according to their importance. Alternatively, redundancy is used only for control signals or only for data bits. In some embodiments of the invention, additional protocols are applied to the signals transmitted on link 808. For example, the signals transmitted on link 808 may be encrypted, e.g., in accordance with the IPsec protocol, before they are transmitted, in order to prevent eavesdropping to the VBM connection.

Optionally, the RAS control signals exchanged between front end unit 802 and upper layer unit 806 are transmitted on the same packet connection as the data bits and/or EC and/or DC control signals. Alternatively or additionally, a separate control connection on communication link 808 or on a separate link is used to exchange RAS control signals and/or EC and/or DC control signals between front end unit 802 and upper layer unit 806. Substantially any agreed format may be used for the control signals exchanged between front end unit 802 and upper layer unit 806, for example a format similar to that described in the ITU T.38 recommendation. The separate control connection may be a delivery confirming connection or a non-confirming connection, with or without redundancy.

In some embodiments of the invention, front end unit 802 performs data pump (DP) and error correction (EC) tasks while upper layer unit 806 performs data compression (DC) tasks.

Signals, transmitted from client modem 804, which represent data, are demodulated by front end unit 802 into data bits. The demodulated data bits are then checked for errors according to error correction bits annexed thereto. If an error occurred, front end unit 802 requests a retransmission of the erroneous data from client modem 804. The error free data bits in their compressed form are encapsulated and forwarded to upper layer unit 806, using any of the encapsulation methods described above. In addition, any of the types of connections described above may be used for transmission of the data bits on link 808. It is noted, however, that the consequences of transmission errors on link 808 which are not handled by the connection on link 808, are less severe when the EC tasks are performed by upper layer unit 806. This is because the transmission errors on link 808 will be identified and handled by the EC tasks of the modem. Conversely, when the EC tasks are performed by front end unit 802, uncompensated errors on link 808 will only be identified, if at all, by an application or transport layer above the modem.

Data bits transmitted to computer 812 are received by upper layer unit 806 through gateway 810. The received data bits are compressed by upper layer unit 806 and are then encapsulated and transmitted to front end unit 802. Front end unit 802 removes the encapsulation, annexes error correction (EC) bits to the data bits in accordance with the EC layer tasks, modulates the bits and transmits the modulated data signals to client modem 804.

Front end unit 802 and client modem 804 exchange DP control signals as described above. In addition, EC control signals are generated and handled by front end unit 802. On the other hand, DC control signals are forwarded by front end unit 802, with or without being aware of their being DC control signals.

In some embodiments of the invention, front end unit 802 and upper layer unit 806 handle their control signals independently, without receiving information and/or instructions from the other unit. Alternatively or additionally, one or more of units 802 and 806 receives information and/or instructions from the other unit and accordingly generates at least one of its control signals.

In some embodiments of the invention, front end unit 802 performs data pump (DP) and HDLC tasks while upper layer unit 806 performs LAPM and data compression (DC) tasks.

Signals transmitted from client modem 804 which represent data are demodulated by front end unit 802 into data bits. Padding flags and the CRC field are removed from the demodulated data bits, and erroneous frames are discarded. The resulting frames are encapsulated and forwarded to upper layer unit 806, using any of the encapsulation methods described above. Upper layer unit 806 acknowledges the receipt of the frames and exchanges flow control commands (e.g., retransmission requests, buffer full notices) with client modem 804. Upper layer unit 806 also decompresses the data bits extracted from the frames.

Data bits transmitted to computer 812 are received by upper layer unit 806 through gateway 810. The received data bits are compressed by upper layer unit 806 and are broken into frames to which flow control commands are annexed. The frames are encapsulated and transmitted to front end unit 802. Front end unit 802 removes the encapsulation, performs flag padding and adds a CRC field to the frames in accordance with the HDLC layer tasks. Front end unit 802 then modulates the bits and transmits the modulated data signals to client modem 804.

Front end unit 802 and client modem 804 exchange DP control signals as described above. Optionally, delay procedures as described above are used during the stage in which the round trip delay is measured. In addition, HDLC control signals are generated and handled by front end unit 802. On the other hand, LAPM and DC control signals are forwarded by front end unit 802, with or without being aware of their being DC control signals.

In some embodiments of the invention, front end unit 802 and upper layer unit 806 do not exchange any RAS control signals (i.e., signals used to coordinate the operations of the RAS between front end unit 802 and upper layer unit 806) except for signals for establishment and closing of packet connections. Alternatively, front end unit 802 and upper layer unit 806 exchange RAS control signals, for example to provide information and/or instructions from upper layer unit 806 to front end unit 802 regarding the generation of DP signals. Alternatively or additionally, the RAS control signals are used by front end unit 802 to indicate to upper layer unit 806 entering and/or exiting a data transmission mode and/or the transmission rate of signals in the DP layer. Further alternatively or additionally, the RAS control signals are used to notify front end unit in disconnect events and/or for flow control purposes between the units.

In some embodiments of the invention, a division of the tasks of RAS system 800 between front end unit 802 and upper layer unit 806 is performed dynamically. Optionally, upper layer unit 806 may operate with a plurality of front end units 802 which perform different tasks. At formation of a connection with a front end unit 802, upper layer unit 806 determines the tasks performed by the front end unit 802 and accordingly adjusts the tasks it is to perform. Alternatively or additionally, a front end unit 802 may operate with a plurality of different upper layer units 806 which perform different tasks. The tasks performed by front end unit 802 are adjusted according to the tasks performed by the upper layer unit 806.

Alternatively or additionally, the task division between front end unit 802 and upper layer unit 806 is chosen responsive to the load on front end unit 802 and/or on upper layer unit 806. In some embodiments of the invention, at formation of a connection between front end unit 802 and upper layer unit 806, the units exchange indications of their load and accordingly choose the task division to be used on the connection.

In an exemplary embodiment of the invention, front end unit 802 generally performs tasks having a maximal load, leaving upper layer unit 806 with a minimal processing load. Thus, upper layer unit 806, which services a larger number of potential users, is left with as much as possible free processing power. When front end unit 802 is close to its maximal power consumption, the front end unit 802 performs, optionally only on newly accepted connections, only a minimal set of tasks (e.g., only DP tasks).

In some embodiments of the invention, front end unit 802 manages a set of thresholds to which the processing load of front end unit 802 is compared. For example, if the load of front end unit 802 is above 50% of its processing power, front end unit 802 performs on a newly accepted connection only part of the EC tasks. If the load of front end unit 802 is above 75% of its processing power, front end unit 802 performs on the new connection only DP tasks. In some embodiments of the invention, at some load rates and/or for some connections, front end unit 802 may perform all the modem tasks for a connection, including the DC tasks.

It is noted that front end unit 802 and/or upper layer unit 806 may allow overbooking of connections beyond their processing power based on statistical measures. The scheduling in overbooked connections may be performed, for example, as described in U.S. patent application Ser. No. 08/969,981 filed Nov. 13, 1997, PCT application PCT/IL00/00733 filed Nov. 9, 2000 or in PCT application PCT/IL01/00132 filed Feb. 8, 2001, the disclosures of which are incorporated herein by reference. Specifically, by performing all the DC tasks in upper layer unit 806, rather than in a plurality of front end units 852, the overbooking rate which can be used is greater, as the variance decreases with the increase in the number of connections handled.

Alternatively or additionally to determining the task division responsive to the load on front end unit 802, the task division is determined responsive to the load on upper layer unit 806. The determination of the task division may be performed by a single unit (i.e., front end unit 802, upper layer unit 806, or a different unit) which then transmits instructions to the other unit(s) on the tasks they are to perform. Alternatively, the information on the load of the front end unit 802 and/or upper layer unit 806 is distributed between the units which determine the task distribution according to a predetermined protocol.

Alternatively or additionally to determining the task distribution responsive to the load on front end unit 802 and/or upper layer unit 806, the task distribution is determined responsive to the line quality of the connection on link 808, e.g., the jitter and/or delay of the link. For example, when the line quality of link 808 is high, preference is given to front end unit 802 performing EC tasks, while when the quality of link 808 is low preference is given to upper layer unit 806 performing the EC tasks. In some embodiments of the invention, the selection of whether to use a delivery confirming protocol is performed responsive to the quality of link 808.

Further alternatively or additionally, the distribution of the tasks is determined responsive to the quality of service (QoS) of the new connection. For example, high QoS connections may have the EC tasks performed at front end unit 802, closer to client modem 804, to allow faster retransmission of erroneous signals.

Further alternatively or additionally, the distribution of the tasks is performed responsive to user settings and/or responsive to one or more external attributes, such as the time of day, date, weather, etc. For example, statistics may be gathered on the use of client modems 804 in different areas at different times or seasons. Front end units 802 will optionally be set to perform minimal tasks at times in which peak usage is expected in their area. Possibly, when peak usage is expected throughout a region of an upper later unit 806, the distribution is planned to achieve a maximal total number of connections.

In some embodiments of the invention, when a client modem 804 requests establishment of a modem connection while front end unit 802 is entirely loaded, front end unit 802 negotiates with upper layer unit 806 the transfer of some of the tasks (e.g., EC tasks) of one or more of the handled connections to upper layer unit 806, to allow the connection of the new client modem.

In an exemplary embodiment of the invention, in the transfer of one or more tasks between the units, the EC flow control is used to stop the transmission of data on the connection for a short period. The handling of the data currently accumulated is completed and the handling of the one more tasks is transferred between front end unit 802 and upper layer unit 806. The EC flow control then resumes the data transmission. Alternatively or additionally, the transfer of one or more tasks is performed without stopping the transmission of data. Optionally, in transferring the handling of a task, a state record of the task is transmitted from the unit stopping to handle the task to the unit taking over the handling of the task.

Allowing dynamic distribution of the tasks between upper layer unit 806 and front end unit 802 allows achieving a higher utilization of the apparatus of system 800. On the other hand, using a fixed distribution of tasks may allow use of cheaper hardware and/or software for the apparatus of system 800.

Figure 15:
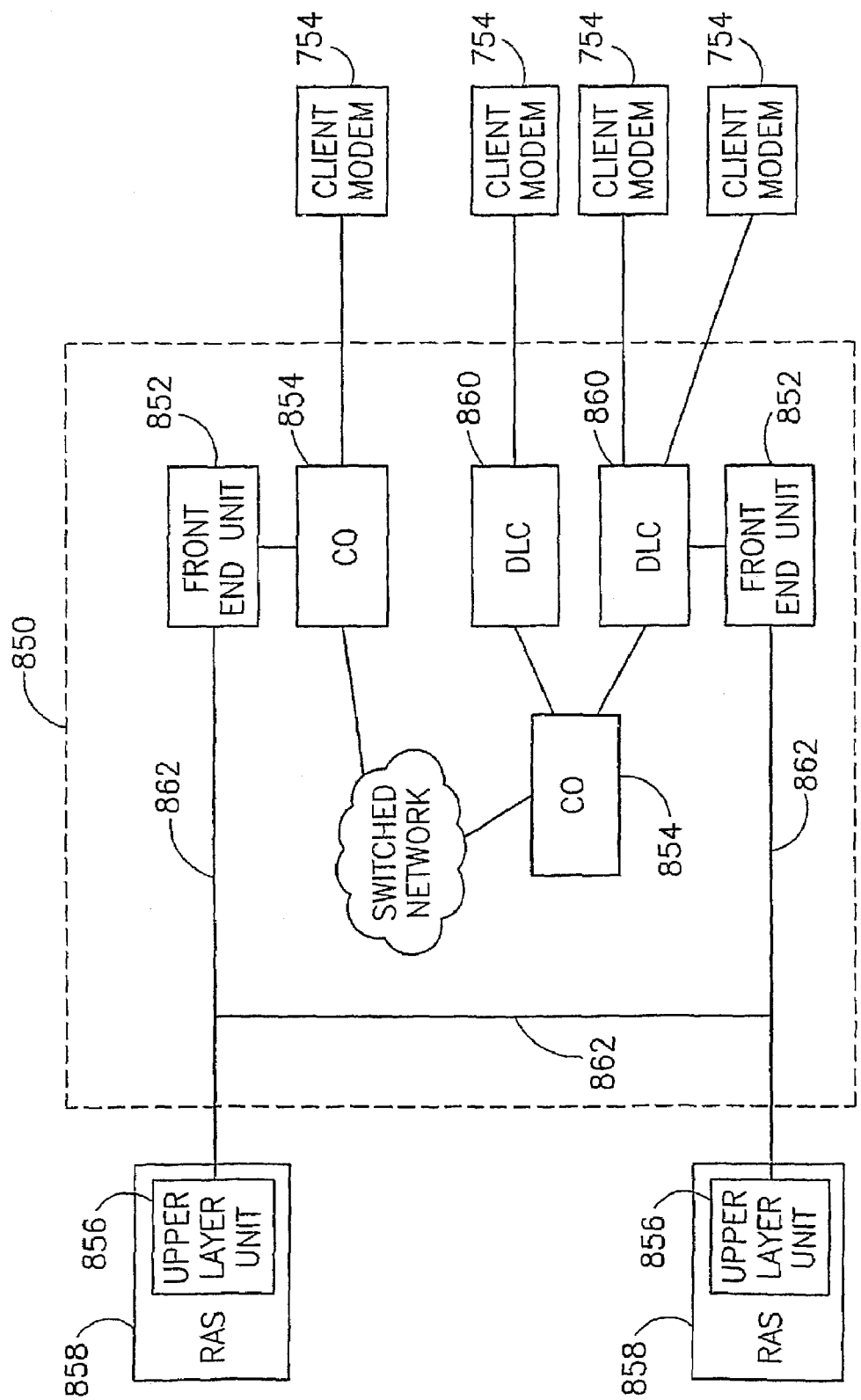
FIG. 15 is a schematic block diagram of a public switching telephone network (PSTN) with off-loading capabilities, in accordance with an embodiment of the present invention.

FIG. 15 is a schematic block diagram of a public switching telephone network (PSTN) 850 with off-loading capabilities, in accordance with an embodiment of the present invention. PSTN 850 comprises a plurality of frond end units 852 which are located close to client modems 804, e.g., adjacent digital loop carriers (DLCs) 860 and/or central offices (COs) 854. When a client modem 804 requests to establish a call with a modem RAS 858, for example of an ISP which supports off-loading, the call is identified by PSTN 850, e.g., by an adjacent CO 854 or DLC 860, and the call is routed through an adjacent front end unit 852. From front end unit 852, the call is directed over an off loading network 862 to an upper layer unit 856 of RAS 858 to which the call is directed. The RAS 858 to which the call is directed is optionally determined according to the dialed telephone number. Alternatively or additionally, any other off-loading method is used to determine which RAS 858 is to handle the connection. In some embodiments of the invention, the VBM connections handled by a single front end unit 852 may receive upper layer handling from a plurality of different upper layer units 856. Similarly, a single upper layer unit 856 may handle VBM connections which received front end handling from a plurality of different front end units 852.

Optionally, off-loading network 862 comprises a non-switched network, for example, a packet based network. Alternatively or additionally, off-loading network 862 comprises any other data link, for example a high bandwidth synchronous link.

The VBM tasks, which are to be performed in handling the connection with client modem 804, are divided between front end unit 852 and upper layer unit 856 in accordance with any of the static or dynamic divisions described above with reference to FIG. 1.

It is noted that, in these divisions, upper layer unit 856 of RAS 858 performs the entire PPP handling and front end unit 852 does not need to handle tasks of the PPP protocol. This simplifies the apparatus of front end unit 852. Furthermore, as the DC tasks are performed by upper layer unit 856, the signals passing on the link between front end unit 852 and upper layer unit 856 are already compressed and additional compression is not required. Thus, there is no need for front end unit 852 to perform an additional compression (e.g., L2TP compression) which is generally computation intensive.

In some embodiments of the invention, front end unit 852 is used, in addition to its use in off-loading, for modem over IP connections as described above with reference to gateways 36. Optionally, when a CO 854 of network 850 identifies that a call is directed to a remote modem or modem RAS, for example, which does not support off-loading, the call is off-loaded through a pair of front end units 852, so as to form a modem over IP (MoIP) connection. Alternatively or additionally, the MoIP connection is routed through two front end units 852 which are not connected through a switched network or at a time at which no switched lines are available.

The two front end units 852 along the path of the MoIP connection perform the same modem tasks. Optionally, when front end units 852 support dynamic division of tasks, at the establishment of a connection and/or when a retrain occurs, front end units 852 negotiate between them which tasks they are to perform, for example as described above with reference to gateways 36A and 36B. Alternatively, as described above, tasks may be transferred between front end unit 852 and upper layer unit 856 during data transfer on the connection. In some embodiments of the invention, when front end units 852 participate in a MoIP connection they correlate between them the DP, EC and/or DC control signals which they transmit to their respective end modems. The control signal correlation may be performed as described above and/or in Israel patent applications 136,775, filed Jun. 14, 2000, 140,734, filed Jan. 4, 2001, or 140,952, filed Jan. 17, 2001, 142,379, filed Apr. 2, 2001 or in PCT application IL00/00492 filed Aug. 13, 2000, the disclosures of which are incorporated herein by reference. Other correlation procedures may be derived by altering fast fax correlation procedures, such as the procedures for the V.34 half duplex protocol described in PCT application PCT/IL00/00657, filed Oct. 17, 2000, the disclosure of which is incorporated herein by reference.

Optionally, when a connection is established through front end unit 852, front end unit 852 is notified the type of the connection (e.g., off-loading, MOIP) so that it determines whether control signal correlation is required for the connection and/or which type of correlation is required. Alternatively or additionally, front end unit 852 begins performing signal correlation for each established connection until or unless it is instructed otherwise by upper layer unit 856.

By using the same front end units 852 for both off-loading and MoIP connections, the costs of infrastructure required by network implementers are reduced.

Figure 16:
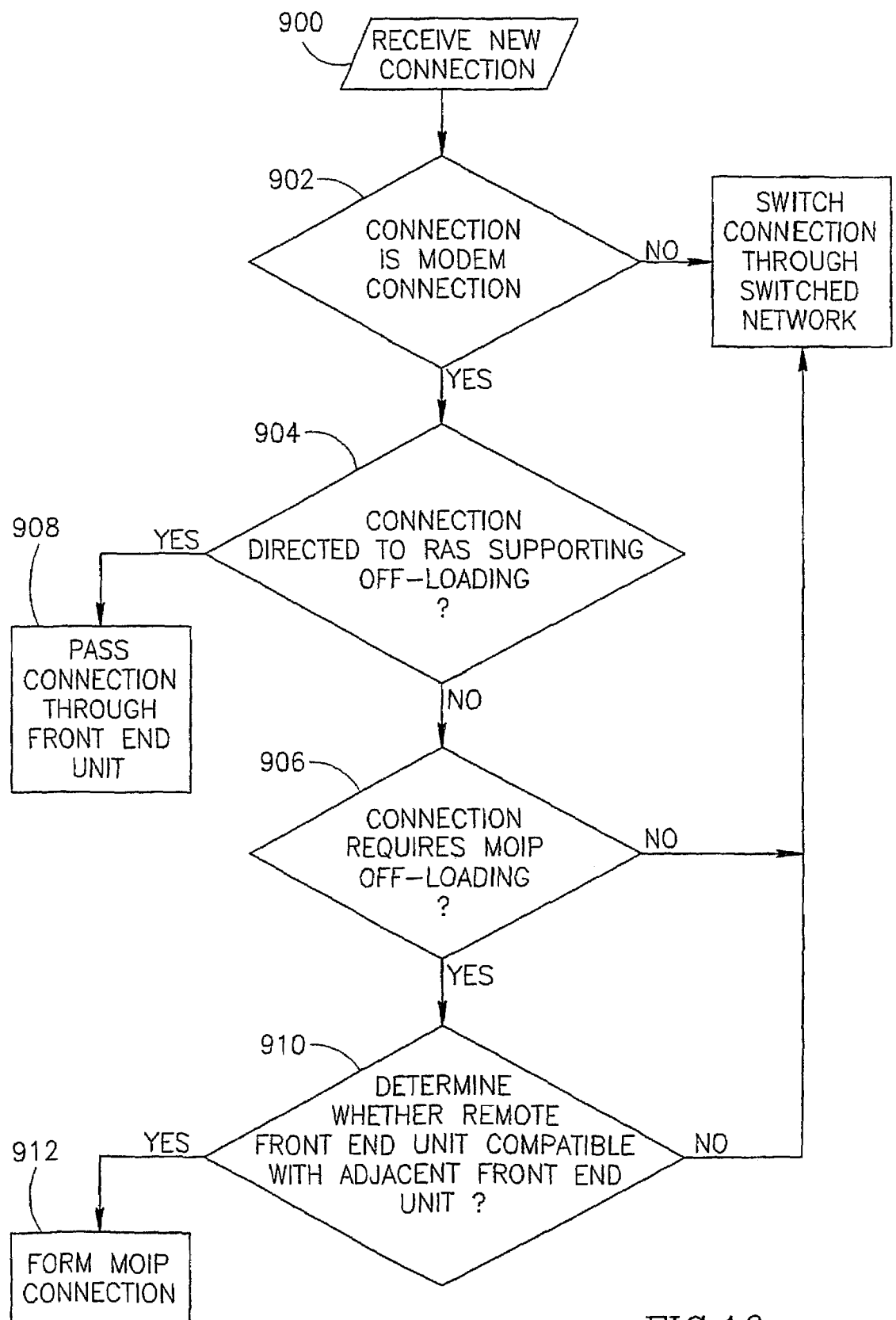
FIG. 16 is a flowchart of the acts performed by a central office (CO) in accepting a connection, in accordance with an embodiment of the present invention.

FIG. 16 is a flowchart of the acts performed by a CO 854 in accepting a connection, in accordance with an embodiment of the present invention. Upon receiving (900) a new connection, CO 854 determines (902) whether the connection is a modem connection. If the connection is a modem connection, CO 854 determines (904) whether the connection is directed to a RAS which supports off-loading, using any method known in the art, for example based on the phone number dialed. If the connection is directed to a RAS which supports off-loading, the connection is passed (908) through front end unit 852. If the connection is not directed to a RAS which supports off-loading, CO 854 determines (906) whether the connection is directed to a remote location which warrants the use of a MoIP connectional. For example, local calls may be considered not requiring MoIP off-loading, while long distance calls may be considered as requiring MoIP off-loading.

If the connection requires MoIP off-loading, CO 854 determines (910) whether a remote front end unit 852, adjacent to the recipient of the modem connection, is compatible with the front end unit 852 adjacent CO 854. If (910) the front end units are compatible, the connection is passed (912) through the adjacent front end unit 852 and the remote front end unit 852 to perform a MoIP connection.

Referring in more detail to determining (902) whether the connection is a modem connection, in some embodiments of the invention, in forming the connection, client modem 804 transmits a modem identification signal, e.g., a 2100 Hz signal, which notifies a modem on the other end that the connection is a modem connection. CO 854 identifies the modem identification signal and accordingly determines that the connection is a modem connection. Alternatively or additionally, the determination is based on the telephone number dialed which is included in a list of modem numbers.

In some embodiments of the invention, the connection is established using connection establishment procedures substantially as used for establishing voice over IP (VoIP) connections, for example, the procedures of the H.323 protocol and/or the session initiation protocol (SIP). In forming the connection, one or more packet connections are optionally established for communication between front end unit 852 and upper layer unit 856.

In some embodiments of the invention, front end units 852 handle all connections in substantially the same manner regardless of whether they are handling a MoIP connection or an off-loaded connection. Alternatively, the handling of at least some of the MoIP connections differs from the handling of off-loaded connections in the manner in which they generate control signals. For example, MoIP connections may correlate the rates of operation of the DP tasks of the connections from the front end units 852 to the end modems, while in off-loading connections such correlation is not performed.

It is noted that although the above description relates to distribution of the tasks of a RAS between two units, in some embodiments of the invention the tasks of the RAS are distributed between three or more units. For example, a front end unit performs DP tasks, a regional unit performs EC tasks and a central unit performs DC tasks.

Although the above description relates to communication with a client modem 804 which performs DC, EC and DP tasks, the present invention may be performed also with client modems which perform other sets of modem tasks, for example modems which perform only the EC and DP tasks. For example, a connection with a client modem 804 which performs only EC and DP tasks may be terminated by a front end unit which handles DP tasks and an upper layer unit which performs EC tasks.

It is noted that although some of the above exemplary embodiments relate to specific example protocols, such as the V.34 full duplex protocol, the present invention is not limited to any specific protocol and may be implemented with relation to substantially any other modem protocol (e.g., V.22, V.32, V.32bis, V.90, V.91, V.92). In addition, some of the principles of the present invention may be used with relation to other types of point to point modem connections (passing on segments which may be multi-point) and are not limited to VBM modem connections.

For example, in some embodiments of the invention, stalling or spoofing signals are used in order to stall the progression of the negotiations on one modem connection while waiting for information from another connection. For each specific protocol, a method in accordance with the protocol is used to stall the negotiation of a connection until information on the parameters of a peer connection are received. In some embodiments of the invention, the stalling includes transmitting signals beyond their usual transmission time, and/or transmitting guess values and initiating a retrain or a re-negotiation if the guess signals had incorrect values. Alternatively or additionally, the stalling includes transmitting corrupted signals which are recognized by the other end modem as belonging to the protocol but do not fit into the specific requirements from the signal which allow proceeding of the negotiation.

It is noted that in some of the modem protocols the required timing constraints are so tight during the negotiation procedure, such that in many cases the negotiation procedure for achieving equal upstream and/or downstream transmission rates on the modem connections requires a retrain procedure. In some embodiments of the invention, during a protocol negotiation procedure, e.g., the V.8 procedure, gateways 36A and/or 36B prevent the selection of these protocols to avoid the extra connection time required for the retrain. Alternatively, the user of call modem 32A may select whether or not to forego protocols that require a retrain. Further alternatively, gateways 36A forego a protocol that requires retrain only if another protocol having similar characteristics may be chosen.

Data and control signals transmitted between modems, gateways, and other communication units may appear in various forms. Some of the signals are modulated while others are demodulated. The bit content of some of the signals may be, for example, in frames, cells or in streams. The signals may be transmitted along with various header and/or tail fields which are specific to the medium on which the signals are transmitted.

It will be appreciated that the above-described methods may be varied in many ways, including, changing the order of steps, and the exact implementation used. It should also be appreciated that the above-described description of methods and apparatus are to be interpreted as including apparatus for carrying out the methods and methods of using the apparatus.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

The invention claimed is:

1. A method of performing a negotiation session on a modem connection, comprising:
    receiving in a negotiation session a plurality of negotiation signals, including a plurality of data pump negotiation signals and a plurality of signals having a bit content, from a source modem, by a first gateway;
    forwarding the content of at least one of the received data pump negotiation signals from the first gateway to a remote unit;
    receiving, by the first gateway, responses to at least one of the forwarded data pump negotiation signals from the remote unit;
    forwarding a response to at least one of the data pump negotiation signals received from the source modem, by the first gateway to the source modem, responsive to receiving a response from the remote unit; and
    transmitting from the first gateway to the source modem, response signals, that allow the proceeding of the negotiation session by the source modem, to at least one of the received negotiation signals having a bit content, regardless of whether a response to the at least one of the signals was sent or received from the remote unit.

2. A method according to claim 1, wherein forwarding a response by the first gateway to the source modem, responsive to receiving responses from the remote unit comprises forwarding at least some of the responses received from the remote unit without altering their information content.

3. A method according to claim 1, wherein forwarding a response by the first gateway to the source modem, responsive to receiving responses from the remote unit comprises forwarding at least some of the responses received from the remote unit with an altered information content.

4. A method according to claim 1, wherein transmitting response signals from the first gateway to the source modem comprises transmitting at least some of the response signals without forwarding the signals to which the response signals respond, to the remote unit.

5. A method according to claim 1, wherein, in response to at least some of the negotiation signals from the source modem, the first gateway both transmits response signals to the source modem and forwards the contents of the negotiation signals to the remote unit.

6. A method according to claim 5, wherein transmitting response signals from the first gateway to the source modem comprises transmitting at least some of the response signals after forwarding the signals to which the response signals respond to the remote unit but before receiving a response thereto.

7. A method according to claim 5, wherein in response to at least some of the negotiation signals from the source modem, the first gateway both transmits response signals to the source modem, which include guess values of one or more parameters and forwards response signals from the remote unit which include final values of the one or more parameters.

8. A method according to claim 7, comprising initiating a retrain by the first gateway between transmitting the response signals to the first modem and forwarding the response signals from the remote unit.

9. A method according to claim 5, wherein the first gateway both transmits response signals to the source modem and forwards the negotiation signals to the remote unit substantially concurrently.

10. A method according to claim 1, wherein transmitting from the first gateway to the source modem, response signals to at least one of the received negotiation signals comprises transmitting response signals to at least one data pump (DP) negotiation signal.

11. A method according to claim 1, wherein transmitting from the first gateway to the source modem, response signals to at least one of the received negotiation signals comprises transmitting response signals to at least one error correction (EC) negotiation signal.

12. A method according to claim 1, wherein the signals which the first gateway forwards to the remote unit comprise signals for calculation of the round trip delay of the modem connection.

13. A method according to claim 1, wherein forwarding the content of at least one of the received data pump negotiation signals to the remote unit comprises forwarding substantially the same bit content.

14. A method according to claim 1, wherein forwarding the content of at least one of the received data pump negotiation signals to the remote unit comprises forwarding only a partial portion of at least one of the received signals.

15. A method according to claim 1, wherein forwarding the content of at least one of the received data pump negotiation signals to the remote unit comprises forwarding over a network path which has a round trip delay greater than the maximal time defined for responding to at least one of the negotiation signals from the source modem.

16. A method according to claim 1, wherein the remote unit comprises a second gateway.

17. A method according to claim 1, wherein the remote unit is connected to the first gateway through an addressable network.

18. A method according to claim 17, wherein the remote unit is connected to the first gateway through a packet based network.

19. A method according to claim 1, wherein receiving a plurality of negotiation signals from the source modem comprises receiving negotiation signals of a plurality of negotiation stages.

20. A method according to claim 19, wherein the first gateway does not forward response signals from the remote unit for signals of a first group of one or more stages.

21. A method according to claim 20, wherein substantially all the response signals to signals of at least one of the stages are generated by the first gateway without relation to information received from units other than the source modem.

22. A method according to claim 19, wherein all the response signals transmitted by the first gateway in response to signals of a second group of one or more stages are based on responses received from the remote unit.

23. A method according to claim 22, wherein the response signals transmitted by the first gateway in response to signals of the second group of one or more stages are transmitted as if they are data signals.

24. A method according to claim 22, wherein the second group of stages comprises at least one ECDC negotiation stage.

25. A communication gateway, comprising:
a switched network interface adapted to receive a plurality of negotiation signals, having a bit content, from a source modem;
an addressable network interface adapted to forward negotiation signals to a remote gateway; and
a controller adapted to forward through the addressable network interface at least some of, but not all, the negotiation signals received through the switched network interface during a specific connection, including at least one data pump negotiation signal and which is adapted to generate a response, that allows the proceeding of the negotiation session by the source modem, transmitted through the switched network interface to at least some of, but not all, the negotiation signals received through the switched network interface during the specific connection.

26. A gateway according to claim 25, wherein the controller is adapted to forward through the addressable network interface substantially the entire bit content of at least some of the negotiation signals received through the switched network interface.

27. A gateway according to claim 25, wherein the controller is adapted to forward through the addressable network interface a portion including less than the entire bit content of at least some of the negotiation signals received through the switched network interface.

28. A gateway according to claim 25, wherein the addressable network interface comprises a packet based network interface.

29. A method according to claim 1, wherein receiving the plurality of negotiation signals comprises receiving signals of a full duplex negotiation session.

30. A method according to claim 1, wherein receiving the plurality of negotiation signals comprises receiving negotiation signals of a non-facsimile modem session.

31. A method of performing a negotiation session on a modem VBM connection, comprising:
receiving a plurality of negotiation signals, having a bit content, from a source modem, by a first gateway;
transmitting from the first gateway to the source modem, one or more first response signals, in response to at least one of the received signals from the source modem;
receiving, by the first gateway, at least one parameter of a remote modem connection from a remote unit, after transmitting the one or more first response signals;
initiating a retrain by the first gateway after transmitting the one or more first response signals, but before transmitting data signals on the modem connection; and
retransmitting from the first gateway to the source modem, the one or more first response signals, after initiating the retrain, wherein the retransmitted first response signals include one or more parameter values set according to the at least one parameter of the remote modem connection.

32. A method according to claim 31, wherein receiving at least one parameter of a remote modem connection comprises receiving an indication of a protocol governing the remote modem connection.

33. A method according to claim 31, wherein receiving at least one parameter of a remote modem connection comprises receiving an indication of a data rate of the remote modem connection.

34. A method according to claim 31, comprising determining, by the first gateway, whether the at least one parameter of the remote modem connection is compatible with values of the one or more first response signals and wherein initiating the retrain is performed only if they are determined not to be compatible.

* * * * *